United States Patent
Person

(10) Patent No.: US 6,400,270 B1
(45) Date of Patent: Jun. 4, 2002

(54) WALLET PROTECTION SYSTEM

(76) Inventor: Robert Person, 1692 Harbor Cir. East, Largo, FL (US) 33770

( * ) Notice: Subject to any disclaimer, the term of this patent is extended or adjusted under 35 U.S.C. 154(b) by 0 days.

(21) Appl. No.: 09/703,793

(22) Filed: Nov. 2, 2000

(51) Int. Cl.[7] .............................................. G08B 13/14
(52) U.S. Cl. .................... 340/568.7; 340/542; 340/531; 340/687; 340/541; 705/39; 705/44
(58) Field of Search ............................. 705/39, 44, 41, 705/18

(56) References Cited

U.S. PATENT DOCUMENTS

| | | | |
|---|---|---|---|
| 4,495,540 A | 1/1985 | Remington et al. | 340/542 |
| 4,853,676 A | 8/1989 | Kitts | 340/543 |
| 4,890,094 A | 12/1989 | Kopel | 340/571 |
| 5,021,776 A | 6/1991 | Anderson et al. | 340/825.31 |
| 5,396,218 A * | 3/1995 | Olah | 340/572 |
| 5,412,373 A | 5/1995 | Wajda | 340/571 |
| 5,416,826 A | 5/1995 | Butler | 340/571 |
| 5,418,520 A * | 5/1995 | Hirshberg | 340/568 |
| 5,583,918 A * | 12/1996 | Nakagawa | 455/409 |
| 5,748,737 A * | 5/1998 | Daggar | 705/41 |
| 5,790,027 A * | 8/1998 | Chern | 340/568 |
| 6,175,922 B1 * | 1/2001 | Wang | 713/182 |
| 6,184,788 B1 * | 2/2001 | Middlemiss et al. | 340/568.7 |

* cited by examiner

*Primary Examiner*—Jeffery Hofsass
*Assistant Examiner*—Daniel Previl

(57) ABSTRACT

A wallet protection system for protecting credit cards is disclosed. The system comprises a selectively openable casing having a thickness. The casing includes a sensor means disposed within the thickness of the casing. The sensor means senses a predetermined pressure applied to the casing. Electronic circuitry is operatively connected to the sensor means for transmitting an electrical charge. Holding means are disposed in the casing. A wireless communication device is operatively associated with the sensor means for sending a wireless disabling signal to a predetermined location for deactivating the cards when the predetermined pressure is sensed by the sensor means. The communication device includes a transmitter operatively connected to an antenna for transmitting the disabling signal to the predetermined location. A power source is operatively connected to the wireless communication device and sensor means for powering the sensor means and the wireless communication device.

33 Claims, 60 Drawing Sheets

Fig. 5
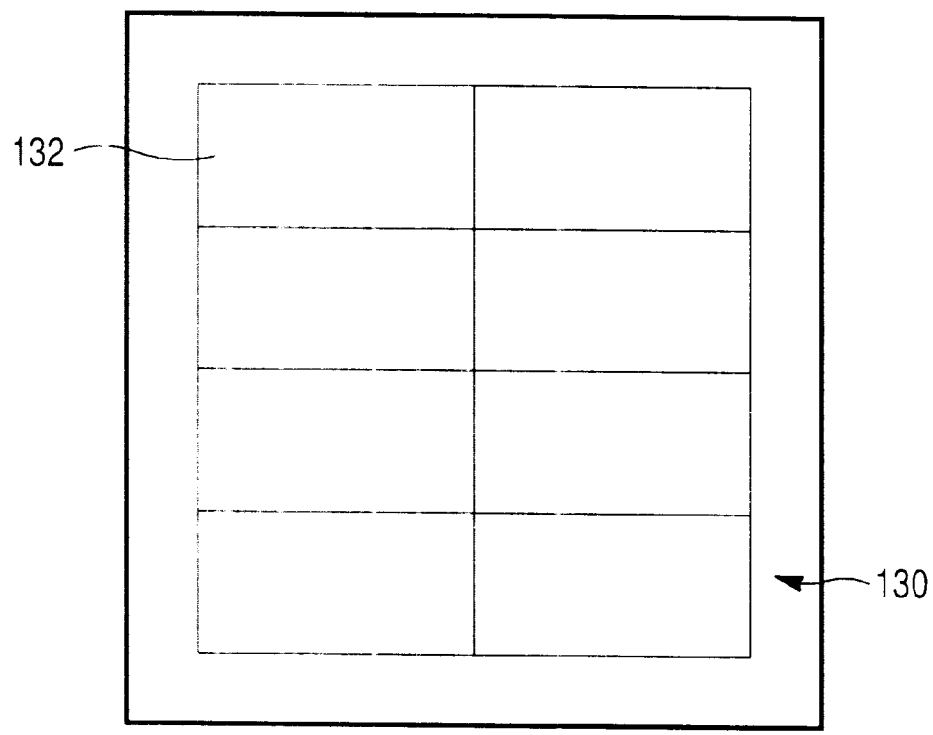
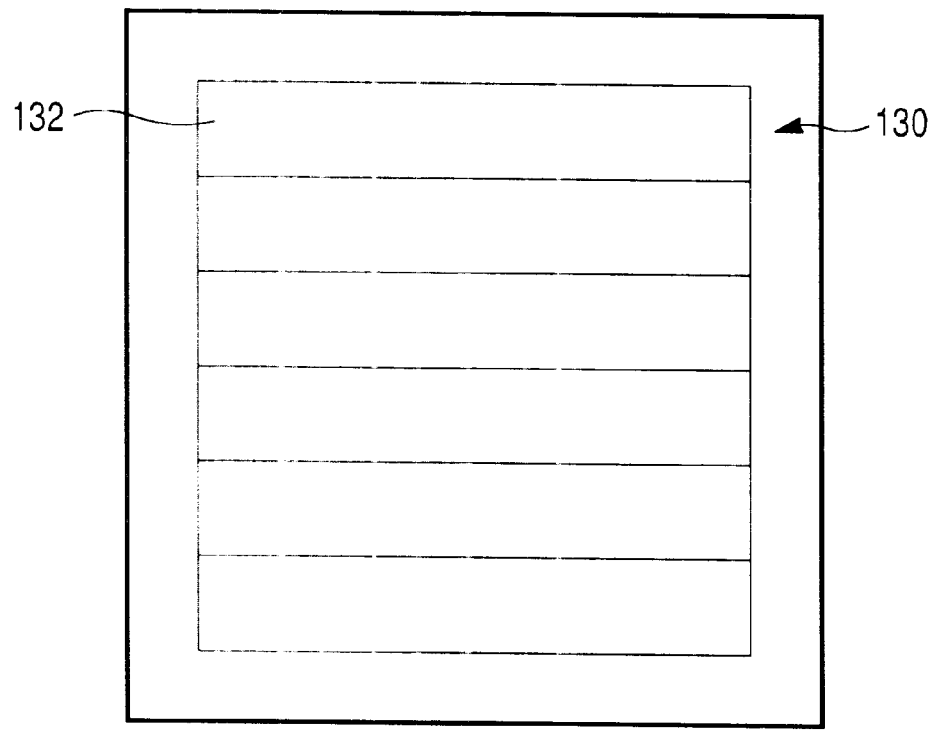

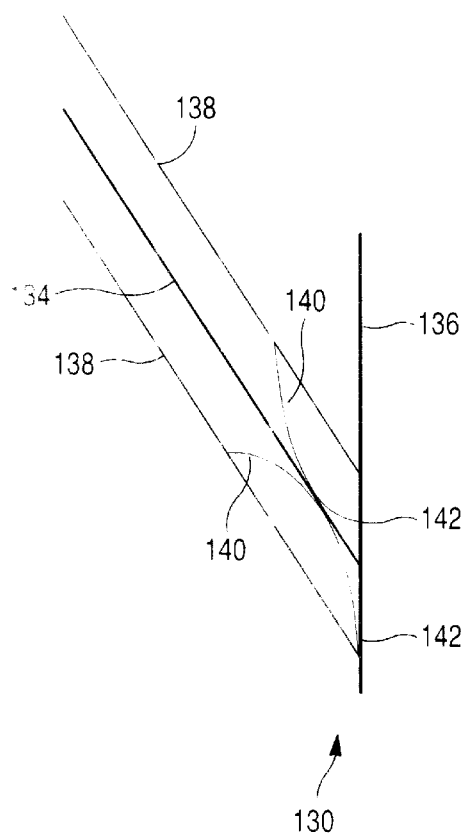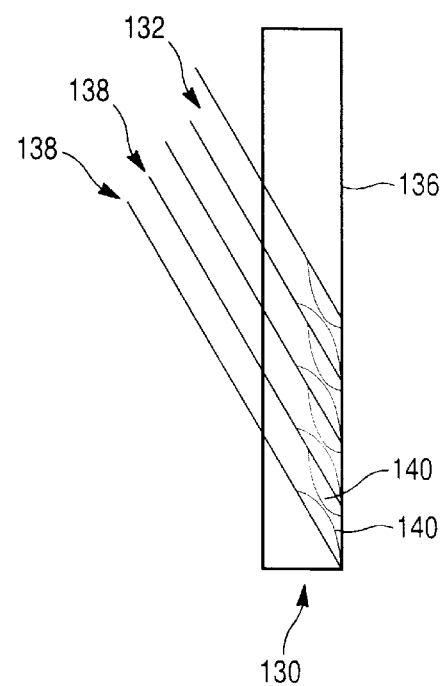

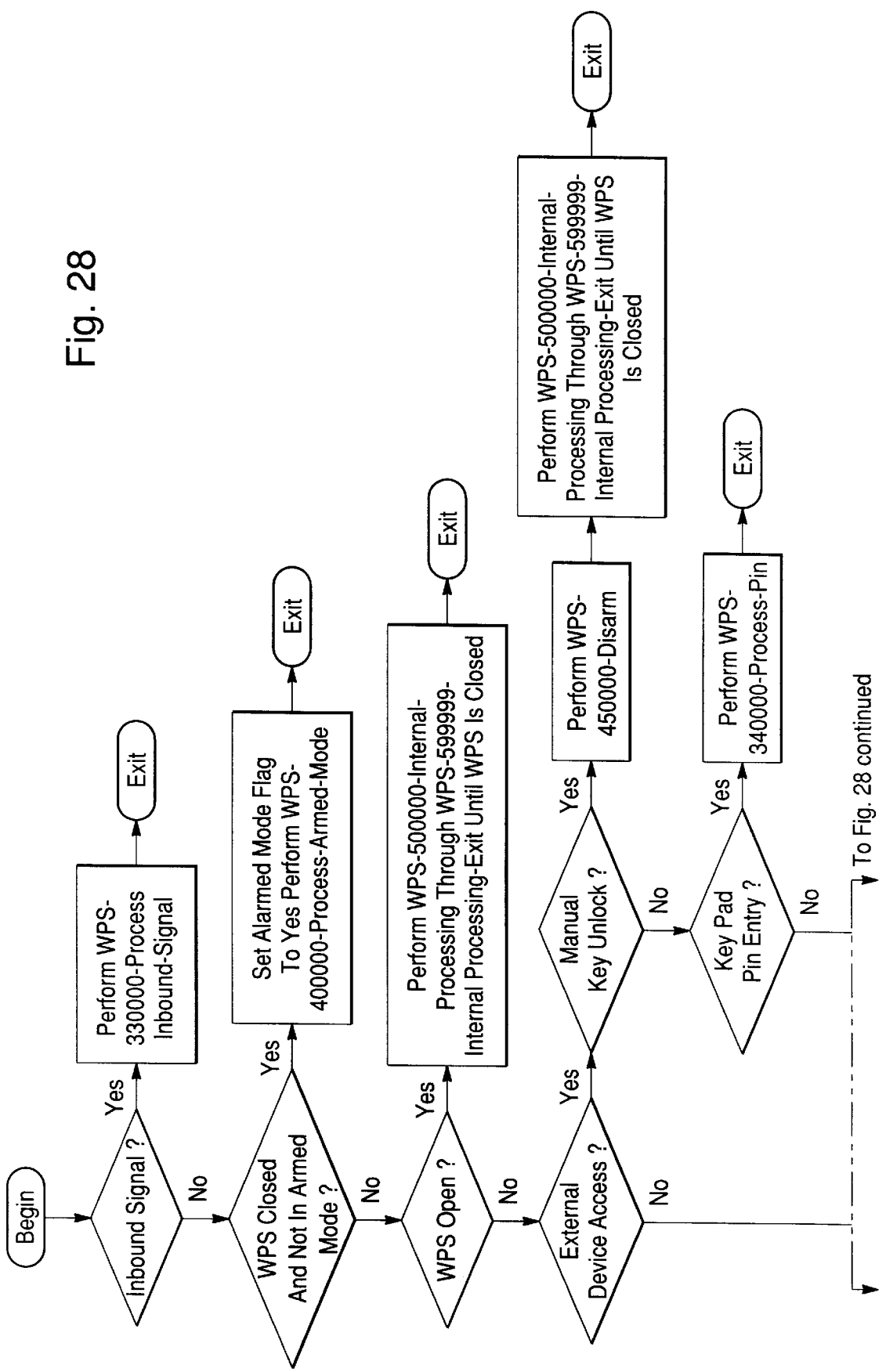

WALLET PROTECTION SYSTEM

FIELD OF THE INVENTION

The disclosed invention is to a wallet protection system for protecting personal belongings. More particularly, the invention is to a wallet protection system for protecting credit cards which uses wireless communication for sending a disabling signal to credit card deactivation companies when an intrusive force is sensed on the exterior of the wallet.

BACKGROUND OF THE INVENTION

Protection of personal belongings has been a significant concern for years. More recently, concern has increased over the protection of credit cards given the fact that credit cards are so easily used once in the possession of an unauthorized user. As a result, many systems have been developed to protect from unauthorized use of credit cards and other personal belongings.

U.S. Pat. No. 4,495,540 discloses an electronic combination lock for protecting personal belongings contained within luggage or the like. The lock includes an external numerical pad in which a predetermined code may be entered to open the lock. However, the lock may be destroyed by physical force or the exterior of the luggage may be torn to gain access to the contents within the luggage.

U.S. Pat. No. 5,396,218 discloses a portable security system in which wireless communication is maintained between two or more plastic cards within a predetermined range. One card is attached to a valuable object such as a wallet on the person and the other card is placed elsewhere on the person. If the cards become separated by a distance more than the defined range, an alarm circuit is activated alerting the owner of the theft of the object from the owner. This invention is particularly useful to prevent pick pocketing. The alarm functions to alert both the owner and/or surrounding people of the theft of the object, which is intended to surprise and prompt the thief to release the wallet or other personal item. However, while the alarm may be somewhat effective in prompting a thief to surrender the personal item, the thief may have removed the credit cards from the device. Thus, the credit cards may be used by the unauthorized user from the time the cards are stolen up until the time the owner locates and notifies the credit card company.

U.S. Pat. No. 5,412,373 discloses a wallet security device which detects when a wallet has been lifted from a user's pocket or purse. The device sounds an alarm after a predetermined period of time has elapsed after removal of the wallet from the pocket or purse of the user if a disarm code is not entered onto a keypad on the wallet. However, the thief may still remove the personal belongings or credit cards and use the same until proper credit card companies are notified. In addition, if a user of the wallet security device is coerced to deactivate the alarm of the wallet, there are no alternative features included to sound an alarm. Finally, if the user forgets the disarm code, the alarm will sound until the user can properly deactivate the system.

U.S. Pat. No. 4,853,676 discloses a security device for credit cards, charge cards, and the like. The device includes a container having a lid and a locking means which secures the lid to the container. A keypad is recessed at the top, and functions to release the locking means once the proper code is entered into the pad. Only two incorrect sequences are permitted to be entered. On the third incorrect sequence, a pyrotechnic solution is released in the container to destroy the cards within the device. In addition, a conductive inlay is provided around the inside of the device so that if the inlay is open circuited by an unauthorized attempt at entering the device by drilling or the like, the pyrotechnic solution will then be released to destroy the cards within the device. While this device is effective for destroying the credit cards and personal items held within the device, the release of a pyrotechnic solution may cause significant hazardous and environmental problems. If the solution is strong enough to destroy and disintegrate plastic cards held within the device, the solution could potentially cause serious injury to the user. In addition, the use of chemical solution may present serious environment problems. Finally, the security device does not provide protection from stealing personal items when the lid to the container is opened. Thus, the user has no way of knowing that a credit card of personal item is missing.

U.S. Pat. No. 4,890,094 discloses a nonrigid wallet structure which includes card accommodating compartments. The structure functions to monitor the cards contained within the system and sound an alarm should a card be missing from its designated location. However, this does not prevent the thief who is now in possession of a credit card from surrendering the card. At best, the thief will only surrender the wallet because of the loud audible noise emanating from it.

Accordingly, a need exists for a wallet protection system which functions to invalidate the credit cards within the system if the wallet is stolen or damages.

SUMMARY OF THE INVENTION

It is an object of the present invention to provide a wallet protection system for deactivating credit cards and the like upon the sensing of a predetermined pressure.

A wallet protection system for protecting credit cards is disclosed. The system comprises a selectively openable casing having a thickness. The casing includes a sensor means disposed within the thickness of the casing. The sensor means senses a predetermined pressure applied to the casing. Electronic circuitry is operatively connected to the sensor means for transmitting an electrical charge. Holding means are disposed in the casing. A wireless communication device is operatively associated with the sensor means for sending a wireless disabling signal to a predetermined location for deactivating the cards when the predetermined pressure is sensed by the sensor means. The communication device includes a transmitter operatively connected to an antenna for transmitting the disabling signal to the predetermined location. A power source is operatively connected to the wireless communication device and sensor means for powering the sensor means and the wireless communication device.

A method of protecting registered personal items is disclosed. The method includes the step of providing a wallet protection system for housing credit cards including a wireless communication device. The credit cards are registered in a database. The registered credit cards of the database are linked by wireless communication to the wireless communication device of the wallet protection system.

These and other objects and advantages of the invention will be readily apparent in view of the following description and drawings of the above-described invention.

BRIEF DESCRIPTION OF THE DRAWINGS

For a complete understanding of the nature and desired objects of this invention, reference should be made to the following detailed description taken in connection with the accompanying drawings, wherein like reference numbers refer to corresponding items throughout the several illustrations of the preferred embodiments of the present invention and wherein:

FIG. 5 are elevational views of the content holders of the wallet protection system.

FIGS. 6(a) and 6(b) are side elevational views of the content holders of the wallet protection system.

DETAILED DESCRIPTION OF THE PREFERRED EMBODIMENT

A preferred embodiment of the wallet protection system 10 will now be described. This embodiment is intended to be exemplary, rather than limiting. Although the present invention is primarily described in connection with protecting personal belongings in a wallet, it can likewise function to protect belongings contained in items as large as a standard business briefcase.

Figure 1:
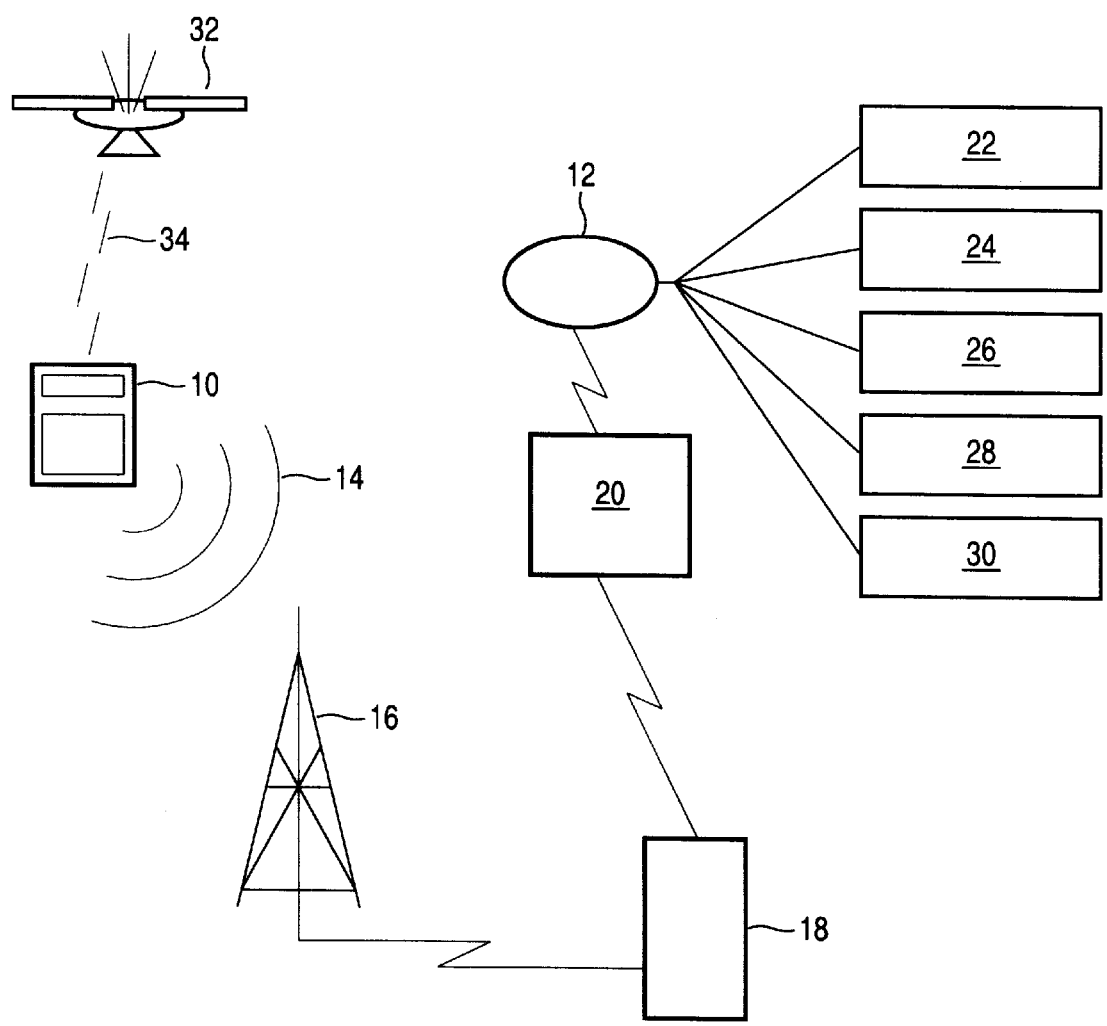
FIG. 1 is a schematic view of the communication networks as they are associated with the wallet protection system.

Referring generally to FIG. 1, wallet protection system 10 is a portable personal communication device which is linked to centralized database 12 accessible by a wireless communication protocol similar to those used by most pager and cellular telephone companies. The wallet protection system 10 includes a tamper resistant external protective casing which is coupled to a wireless communication device. The wallet protection system 10 is designed to provide protection against the fraudulent use of credit cards, checks, and other personal items contained within the wallet 10. If the wallet protection system 10 is tampered with or damaged, the wallet protection systems 10 will transmit a wireless account deactivation communication signal 14 to centralized database 12. After deactivation signal 14 is received by centralized database 12, centralized database 12 will deactivate the registered contents of the wallet protection system 10.

Specifically, disabling signal 14 will be received by a wireless communication base station 16 located throughout the United States. Signal 14 can also be received by any telecommunication satellites or telecommunication network base station. After base station 16 has received signal 14, base station 16 includes a network control program 18 which will send the signal 14 to a switch 20, which is linked to centralized database 12. After centralized database 12 receives signal 14, it will initiate all the necessary communication to invalidate the contents contained in wallet protection system 10. Centralized database 12 will send the disabling signal 14, for example, to a VISA company 22, a MasterCard company 24, an American Express company 26, a Discover company 28, or other similar financial institutions 30. In addition, wallet protection system 10 is linked to a global positioning satellite 32 which functions to track the wallet protection system 10 when a predetermined code 34 is transmitted by wallet protection system 10 as will be described in more detail below.

Referring now to FIGS. 2, 3, 4 and 5, the structural details of wallet protections system 10 will be described in more detail. Wallet protection system 10 includes a selectively openable external casing 40. Preferably, casing 40 is made from a high impact resistant material such as high impact plastic having a thickness 41, as shown specifically with reference to FIG. 3. The internal structure of the high impact resistant material is an X braced honey combed structure, similar to the appearance of a honey combed internal structure of a heavy-duty cardboard.

Figure 2:
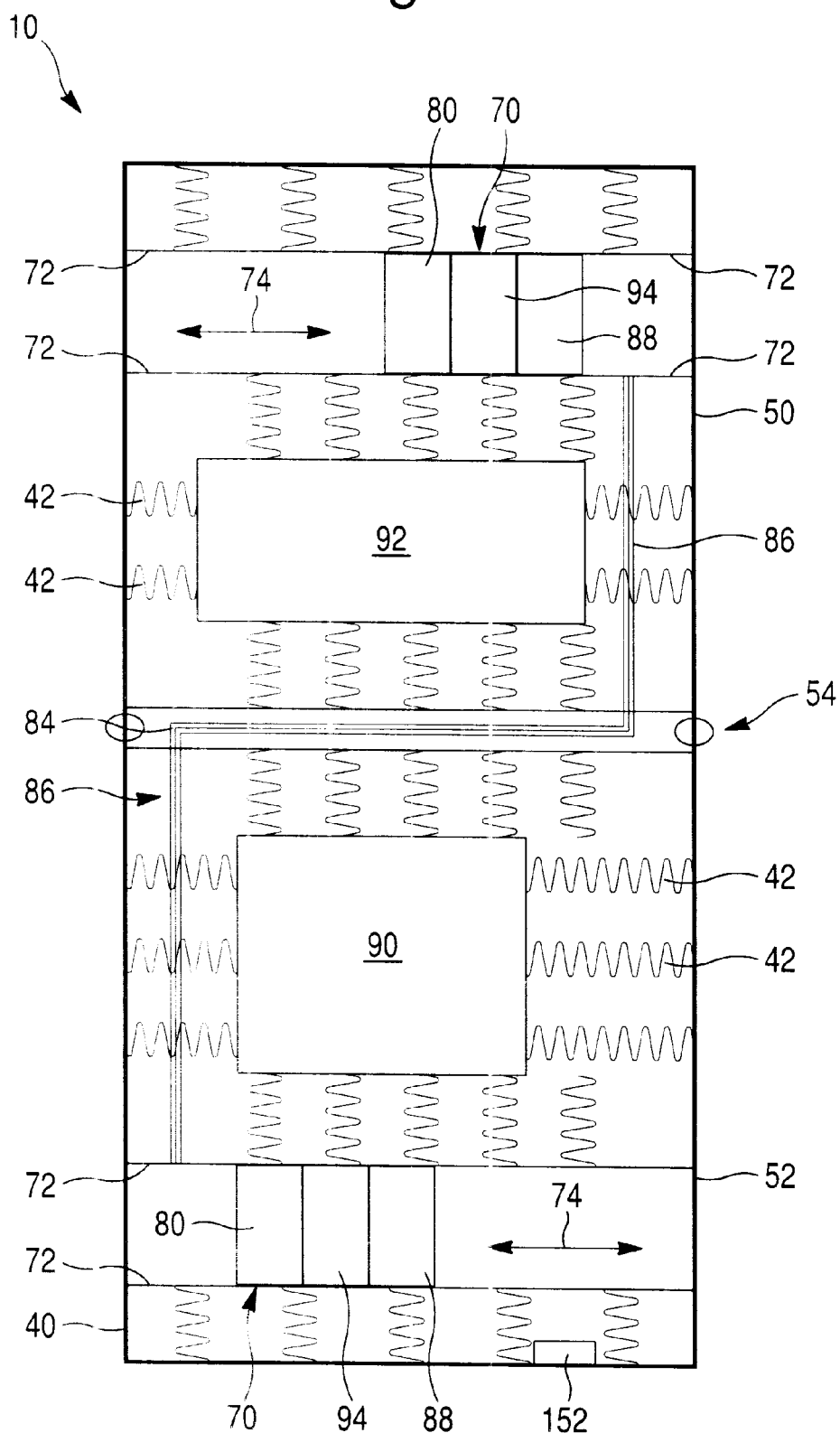
FIG. 2 is a top plan view of the internal structure of the wallet protection system in its open position.

Embedded within external casing 40 is electronic circuitry 42, as illustrated with specific reference to FIG. 2. Electronic circuitry 42 is disposed throughout casing 40 and is operatively connected to security sensor sheathing 44, as illustrated specifically in FIG. 3. Securing sensor sheathing 44 is comprised of two contact plates 46 and 48, capable of sensing high impact trauma, compression, drilling, grinding and any other significant intrusive disturbances. The security sensor sheathing 44 is operatively associated with electronic circuitry 42 so that when a predetermined pressure forces contact plate 46 onto contact plate 48, an electrical charge is distributed to electronic circuitry 42. While the preferred embodiment describes the use of two contact plates, it should be understood that pressure-sensitive devices known in the art may likewise be used using, for example, semi-fragile glass fiber optics.

Security sensor sheathing 44 extends throughout the external casing of wallet protection system 10. Preferably, external casing 40 includes an upper portion 50 and a lower portion 52 which are connected by a hinge 54, having a clam shell-like appearance. Sheathing 44 is disposed in each portion 50 and 52. Preferably, a thin lead material 60 is disposed adjacent security sheathing 44 to prevent x-ray views of the contents.

Electronic circuitry 42 transfers the electrical charge to wireless communication device 70. Preferably, there are two wireless communication devices 70, one disposed in the upper portion 50, and the other disposed in a lower portion 52 thereby ensuring that the disabling signal is sent in the event that one of the communication devices 70 is damaged. Each wireless communication device 70 is disposed and supported on a set of guide rails 72. Wireless communication devices 70 are moveably supported on guide rails 72, and move in a direction of arrows 74. Guide rails 72 serve as auxiliary antennas for enhanced signal clarity and strength. While the preferred embodiment illustrates two wireless communication devices 70, it should be understood that there may be only one wireless communication device or more than two wireless communication devices, depending on preference. It should also be understood that wireless communication devices 70 may be placed at any location within the wallet protection system 10, preferably in a location which prevents the communication device 70 from being readily damaged or destroyed.

Each wireless communication device 70 includes a transmitter 80. Once a sheathing 44 senses a predetermined pressure, an electrical current is sent through electronic circuitry 42 which activates transmitter 80. Transmitter 80 sends a disabling signal to the predetermined location to invalidate the contents within the wallet protection system 10. Wireless communication devices 70 are connected to a main antenna 84 by way of conductive wires 86. Guide rails 72 and main antenna 84 operate to transmit and receive wireless communication signals. In addition, wireless communication devices 70 include a receiver 88 which functions to receive wireless communications, as will be described in more detail below.

Wallet protection system 10 also includes a central processing unit 90 which controls the operational and communication ability of wallet protection system 10, and operations in a similar fashion to a beeper. In addition, wallet protection system includes an internal LCD display and keypad which is generally referred to by the numeral 92.

Figure 4:
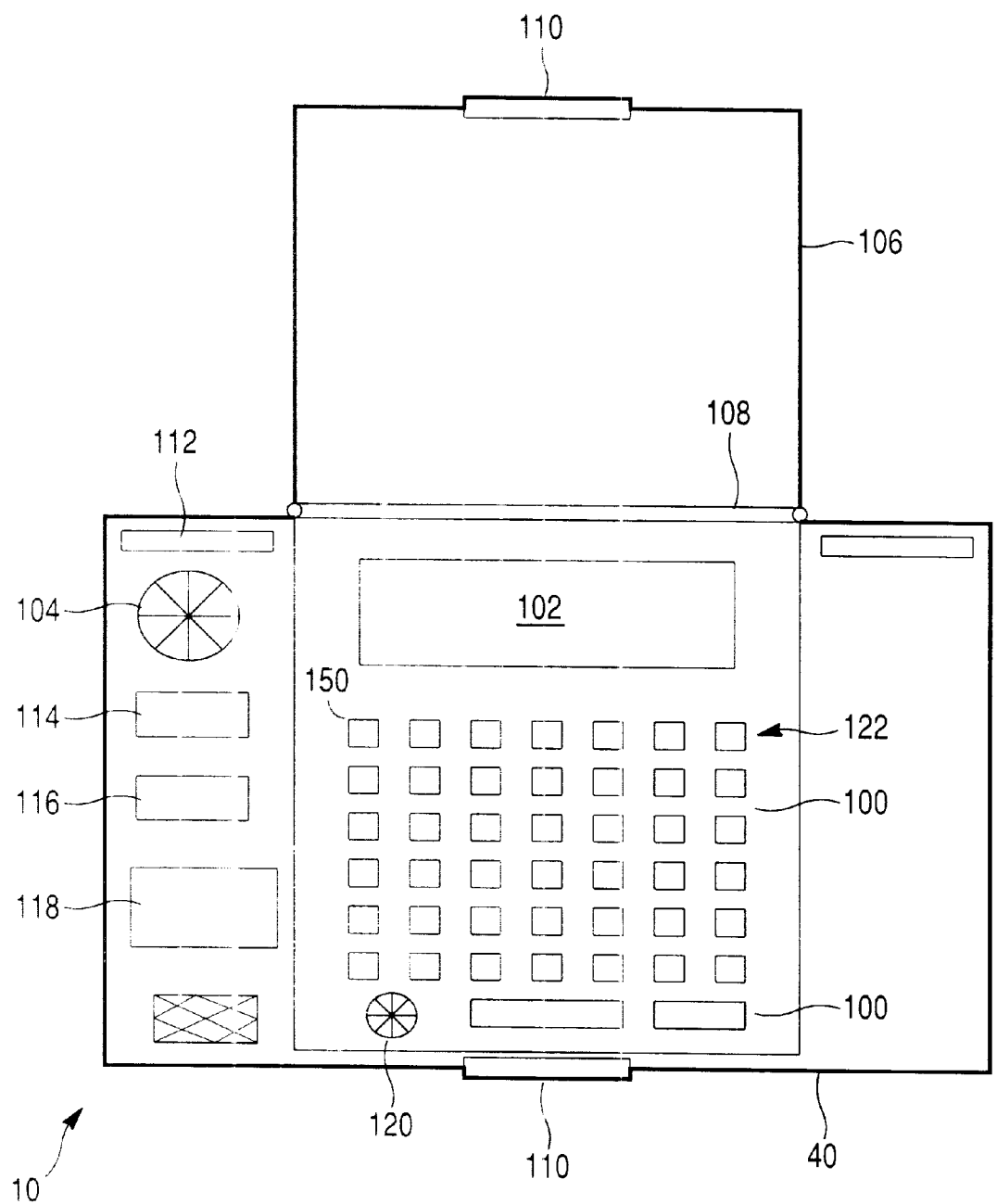
FIG. 4 is a top plan view of the external features of the wallet protection system in its closed position.

With reference now to FIG. 4, the external features of wallet protection system 10 will be discussed in more detail. As described above, external casing 40 is selectively openable. Disposed on the outer surface of external casing 40 is an electronic keypad 100. Keypad 100 operates in a similar fashion to a security keypad on a car door or office door. Once the predetermined combination is entered on to keypad 100 and shown on display screen 102, wallet protection system 10 is opened.

Wallet protection system 10 may also be opened by way of a manual keylock 104. In addition, manual keylock 104 can be used as a manual override if the keypad entry combination has been forgotten. A cover plate 106 is connected to external casing 40 by hinge 108 which functions to protect keypad 100. Cover place 106 is substantially the same size as keypad 100 and is secured on top of keypad 100 by way of cooperative locking portions 100. Wallet protection system 10 also includes a silent alarm panic button 112, a power meter display light 114, a security alarm display indicator 116, an LCD display indicator 118, and a silent alarm reset button 120, which will be described in more detail below.

Wallet protection system 10 is powered by power source 94. Preferably, power source 94 includes two AAA penlight carbon zinc, zinc chloride, or alkaline manganese dioxide batteries generating 3.0 olms, and a silver oxide button battery for backup. Alternatively, wallet protection system 10 can utilize rechargeable batteries. Each AAA battery will be located adjacent transmitters 80 located within guide rails 72. A miniature voltmeter (not shown) includes a fixed load resistor that measures terminal voltage of the batteries under a fixed load and serves as a battery tester and activates power meter display light 144 when the voltage percentage fall below 61%.

A silver oxide battery button serves as a backup power source that powers keypad 100. If all three batteries go dead, or the batteries are being replaced, the security software communication properties of wallet protection system 10 will become dormant. If wallet protection system 10 is dormant, manual keylock 104 can be used to unlock the device. The wallet protection system 10 can be reset by activating the system reinitializing function key 122 as illustrated with reference to FIG. 4.

Referring now to FIGS. 3, 5, 6(a) and 6(b), wallet protection system 10 includes content holders 130. Content holders 130 include a plurality of slots 132 sized to hold a standard credit card 134. Content holders 130 are hingedly secured to casing 40 by hinge 54, as shown with reference to FIG. 3. Preferably, there are two content holders 130, one disposed in the upper portion 50 and one disposed in a lower portion 52. However, it should be understood that there may be only one content holder 130 associated with wallet protection system 10.

With reference now to FIGS. 6(a) and 6(b), content holders 130 include a base support 136 which provides support for opposing credit card supports 138. Each support 138 includes a contact sensor 140. Contact sensors 140 sense the presence or absence of a credit card 134. If the credit card 134 is not returned to its designated slot and the user tries to close wallet protection system 10, an electrical charge is transmitted to contact relay 142. Contact relay 142 transmits an electrical charge to alarm 112 if casing 40 is closed without returning credit card 134 to its designated position. The user can either put the card back in the appropriate slot 132 and close the device 10 or the user can key in the override code using keypad 100. In addition, contact relay 142 is operably connected to the wireless communication device 70 for sending a wireless communication to the centralized database 12, as will be further described below.

Content holders 130 are operably connected to central processing unit 90 and corresponding LCD and keypad 92. This allows the user to program content holder 130. Wallet protection system 10 includes account maintenance software that enables the user to identify and differentiate the number of cards being carried within protection system 10, as will be described in more detail below.

Wallet protection system 10 also contains a water tamper sensor 152, as illustrated with reference to FIG. 2. Water tamper sensor 152 includes a pair of adjacent security sensors (not shown), which are activated upon being in fluid communication. Water tamper sensor 152 is operatively connected to wireless communication device 70 by circuitry 42 to send an electrical charge to wireless communication device 70 upon activation of sensor 152.

In addition, a secondary communication device is disclosed, which has the same capability of wallet protection system 10 and is the size and shape of a modem personal beeper. The additional device is intended to be stored in the secured secondary location. The additional device is intended to act as a secondary deactivation backup communication device, which is linked via wireless communication protocol to the individual's personal registered account in central database 12. This allows the user to invalidate the account under any circumstances.

Other features of wallet protection system 10 include association with a two-way pager. The two-way pager is intended to be attached to the individual's keychain or keyring. Wallet protection system 10 includes a preprogrammed function key 150 that will make the pager attached to the individual's keychain or keyring make a loud audible sound, as shown with reference to FIG. 4. This interactive paging feature is similar to the paging feature used in portable phones.

Wallet protection system 10 may be coupled with a computer, a cell phone, an interactive pager, or a combination of any of the above. The computer has the necessary communication capabilities for the user to update and modify the registered account with new document or delete or change current register information. The computer has the same functionality and operational capabilities in a modem laptop computer. The operating system of the wallet protection system 10 may be Windows CE, for example. In addition, the wallet protection system utilizes all modem cell phone and modern beeper technologies. These technologies include touch-screen technologies, voice recognition technologies, and all other interactive wireless communication technologies. Internet and smart capabilities are available which allows the user to update their account.

Preferably, wallet protection system 10 also includes an erasable programmable read-only memory (EPROM). Wallet protection system 10 includes a data kill switch which, when activated, erases all files upon triggering of the account invalidation wireless communication signal.

With reference back to FIG. 4, wallet protection system 10 includes a panic button 112. Upon pressing the panic button 112, a wireless silent 911-alarm signal that utilizes global positioning satellite communication infrastructure will transmit the signal to a telecommunication satellite or a telecommunications network base station. This signal may also be initiated when a fake access code is keyed into keypad 100. When the panic button 112 is activated, wallet protection system 10 sends a continuous tracking signal 34 to the GPS 32 in a similar fashion as the north star differential GPS navigation system (model 951 XD). That signal will be relayed back to the centralized database 12, as will be described in more detail below.

In addition, wallet protection system 10 will incorporate all other modern variations of personal communication service technologies and other modern variations of personal data assistance technologies in different models. A current example of such technology would be the Nokia 9000 communicator.

Now that the structural details have been described, a general overview of the process steps will be described with reference to FIGS. 1 and 7–52. The wallet protection system 10 is used in association with centralized database 12. First, the customer registers their credit cards, personal checks, important documents, personal identification cards, medical history information, and other miscellaneous items and information at a designated banking institution. The designated banking institution will incorporate all necessary computer communication hardware, data storage and retrieval hardware, systems software applications and security measures to facilitate communication with central database 12. The registration information is stored within the central database 12.

As described above, a centralized database 12 is needed for the registered accounts. Centralized database 12 represents a business institute that specializes in information services and has an established communication protocol with preexisting credit card companies like VISA, MasterCard, American Express and Discover. The customer must register its accounts and credit card with a banking service, which stores the information in the central database 12.

Specifically, the centralized database 12 is referred to in the Figures as a CENTRALIZED FINANCIAL WIDE AREA NETWORK and is represented by the acronym CFWAN. The CFWAN represents a global information security processing organization comprised of a network of designated national and international telecommunication sites that consist of all computer hardware and software applications necessary to provide the interactive communication capabilities between the CFWAN, FLANS, and the wallet protection system 10. The FINANCIAL LOCAL AREA NETWORKS (FLANS) represent all financial business entities that have business ties with the CFWAN customer. In addition, this acronym also refers to any law enforcement agency that may be called upon for assistance during certain wallet protection system 10 security violations.

The purpose of the CFWAN is to collect, maintain and protect the customer registered wallet protection system 10 information and financial transactions. The registered items can include any documents, personal checks, credit cards, ATM cards, demographic or medical information, or any other information that the customer would like to register.

After the registration process, CFWAN provides the customer with a personalized wallet protection system 10. The CFWAN utilizes an interactive wireless communication protocol assisted by global positioning satellite technology to monitor the wallet protection system 10 communication and security integrity. The CFWAN handles all wallet protection system 10 security violations by contacting all associated FLANS from the customers registered account to execute the appropriate security measures.

FIGS. 7–52 are logical flow diagrams which are written in PSEUDOCODE with implied references to the COBOL software application language. To repeat or iterate routines in COBOL, the PERFORM statement is executed until a condition is met. The PERFORM statement is used to pass control to a different logic module. After that module is executed, control returns to the statement following the PERFORM. The EXIT statement is a COBOL reserved word. When used, it must be the only entry within the paragraph. It is an instruction that performs no operation. It is used to allow execution simply to pass over other statements or to transfer control back to the statement following the original PERFORM. It is used, when necessary, as an endpoint in a paragraph being performed.

Figure 7:
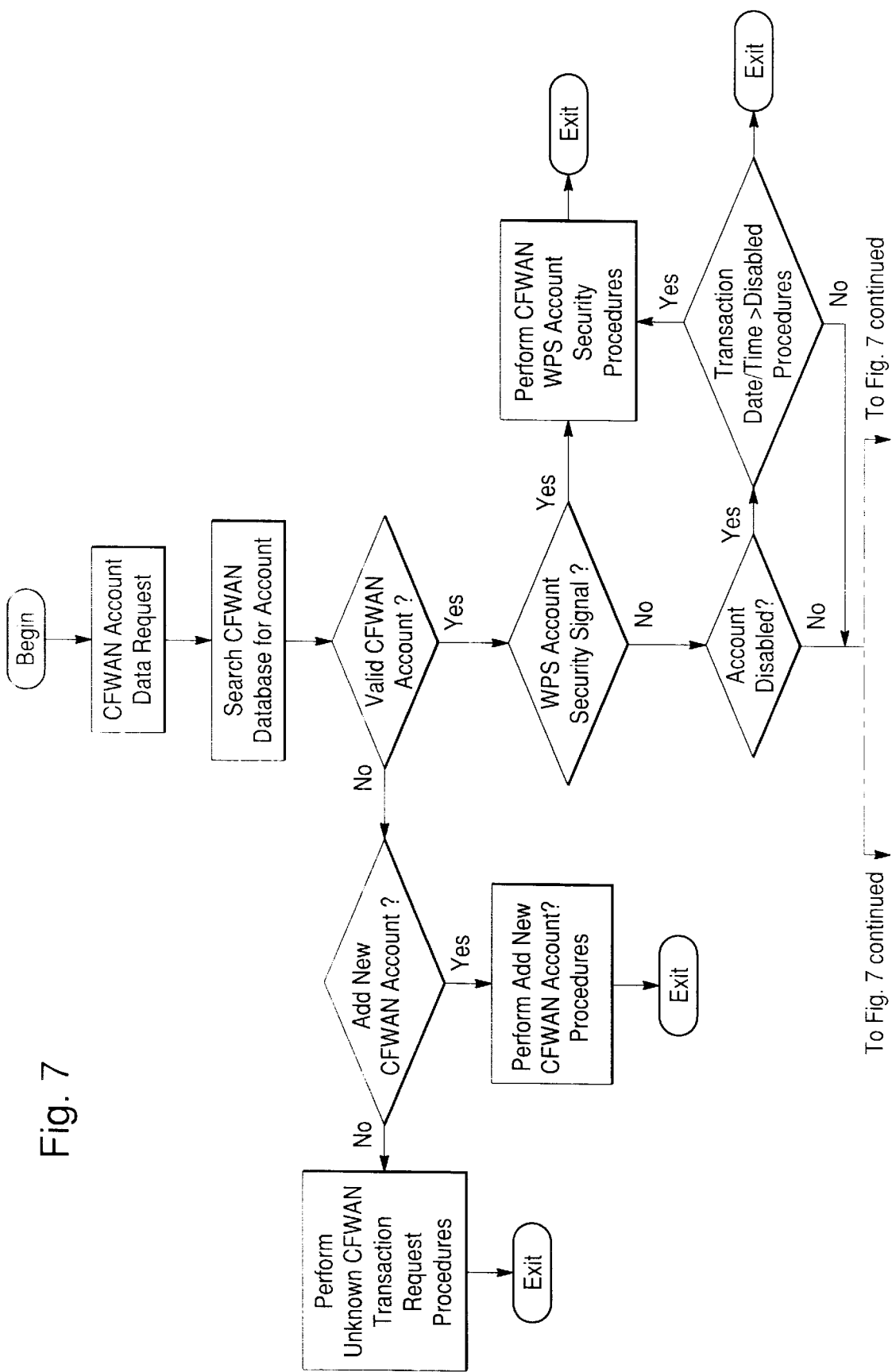
FIG. 7 is a block diagram of the CFWAN TRANSACTION PROCESS routine.
Figure 7:
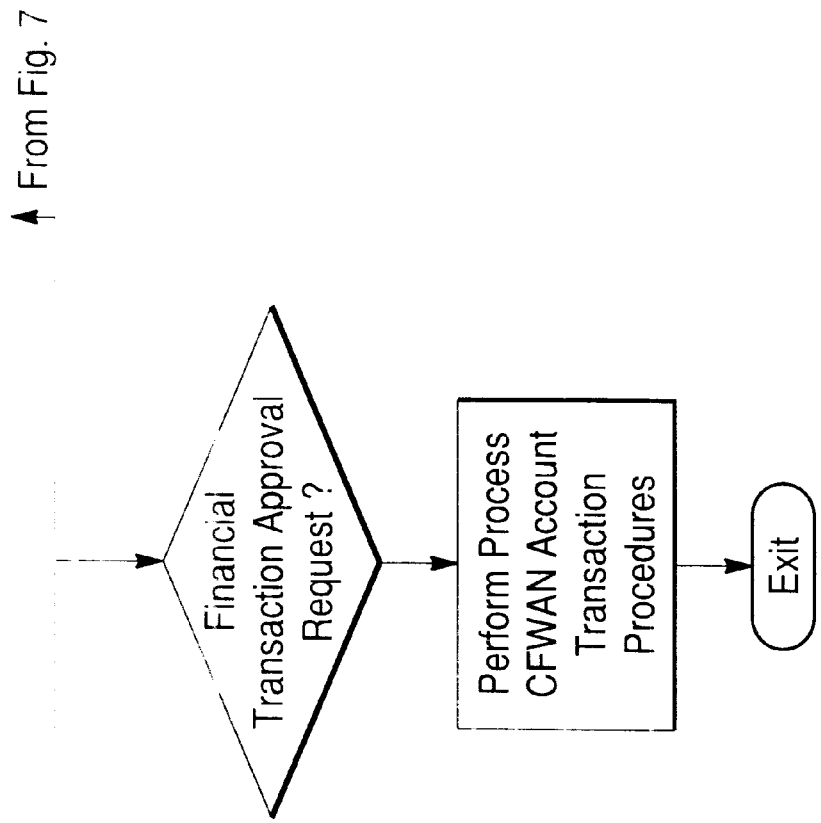

With reference to FIG. 7, this flowchart pictorial depicts the general overall operational structure and functionality of the CFWAN and its interaction between the wallet protection system 10 and associated FLANS. This is the primary routine that continuously cycles through five main operational control steps and are described below.

Figure 9:
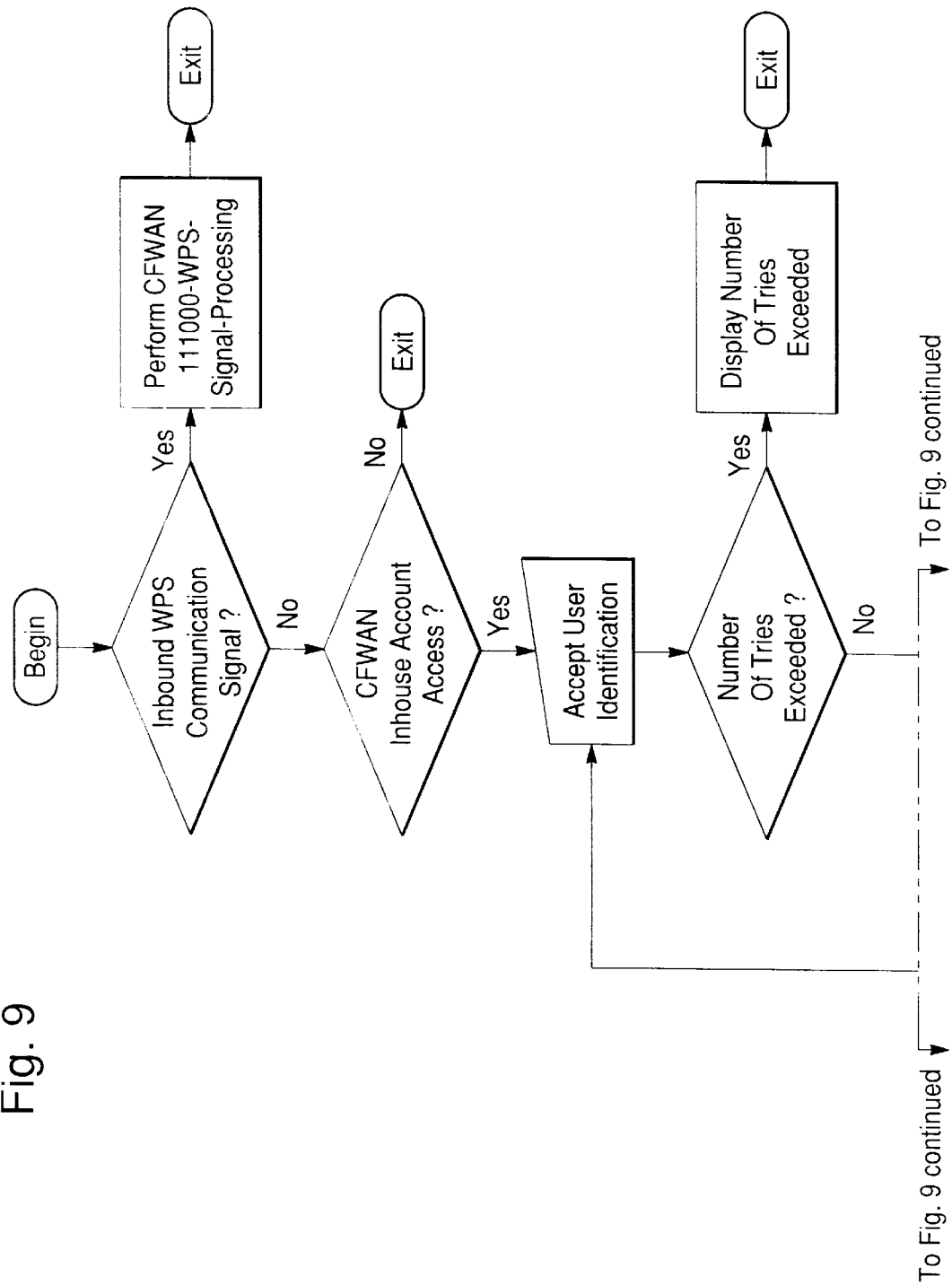
FIG. 9 is a block diagram of the CFWAN 110000-ACCOUNT-PROCESSING routine.
Figure 9:
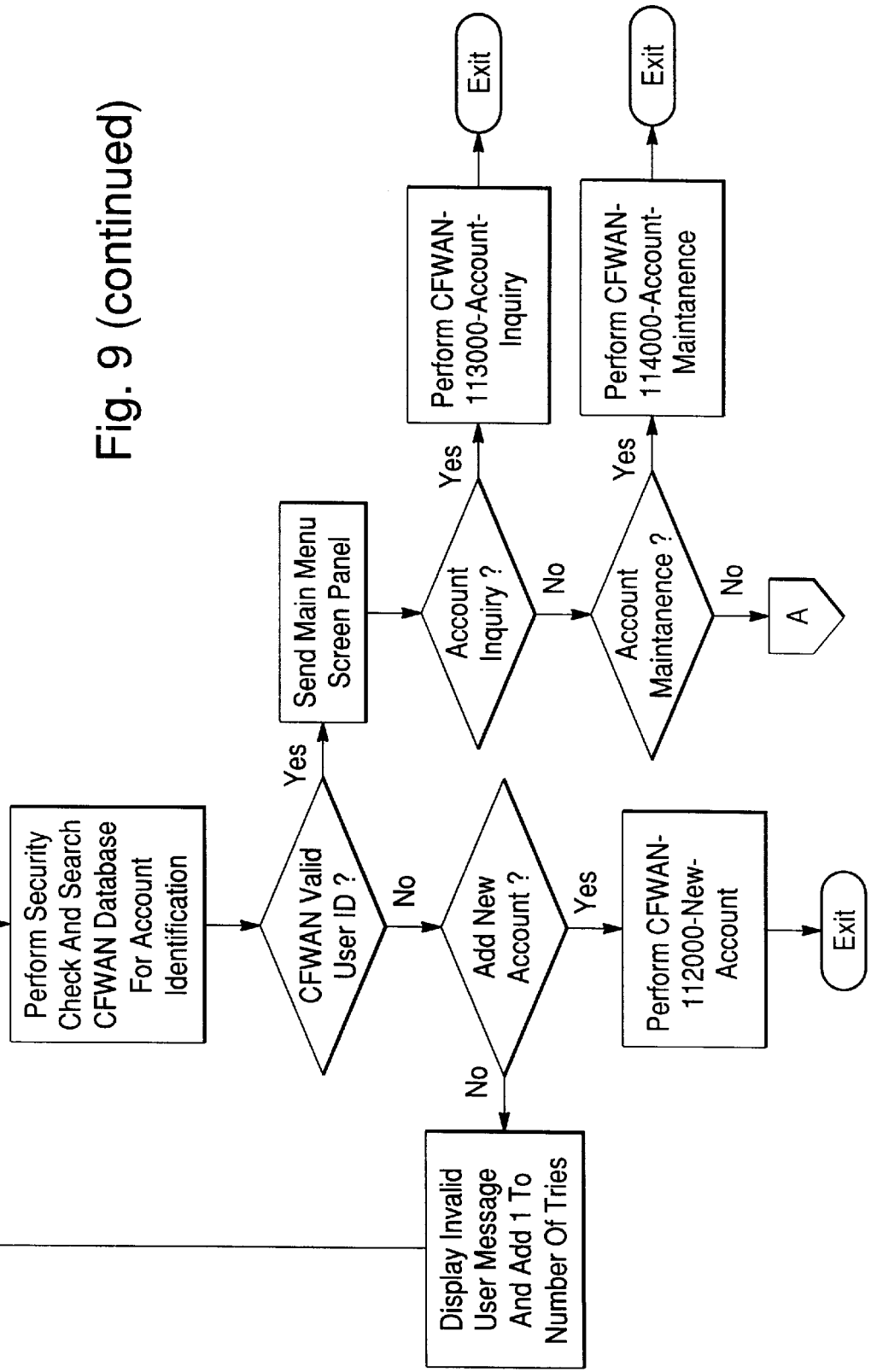
Figure 10:
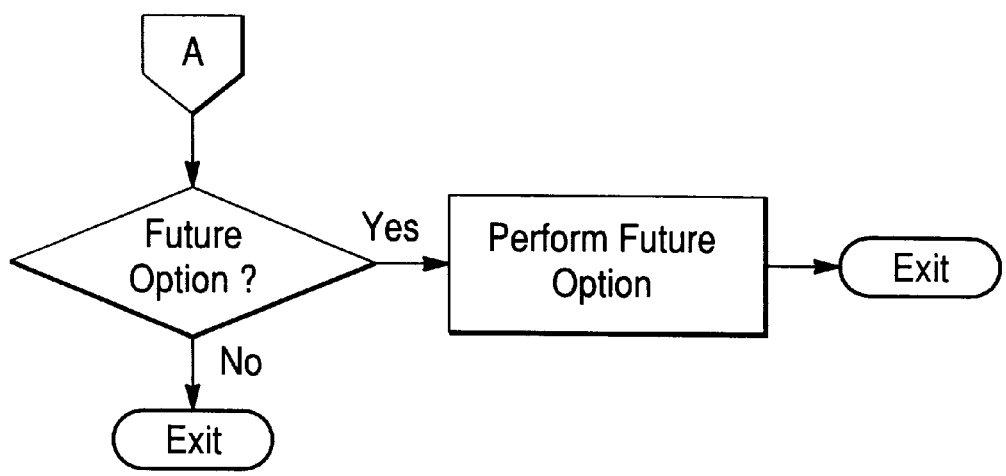
FIG. 10 is a continued block diagram of the CFWAN 110000-ACCOUNT-PROCESSING routine.
Figure 24:
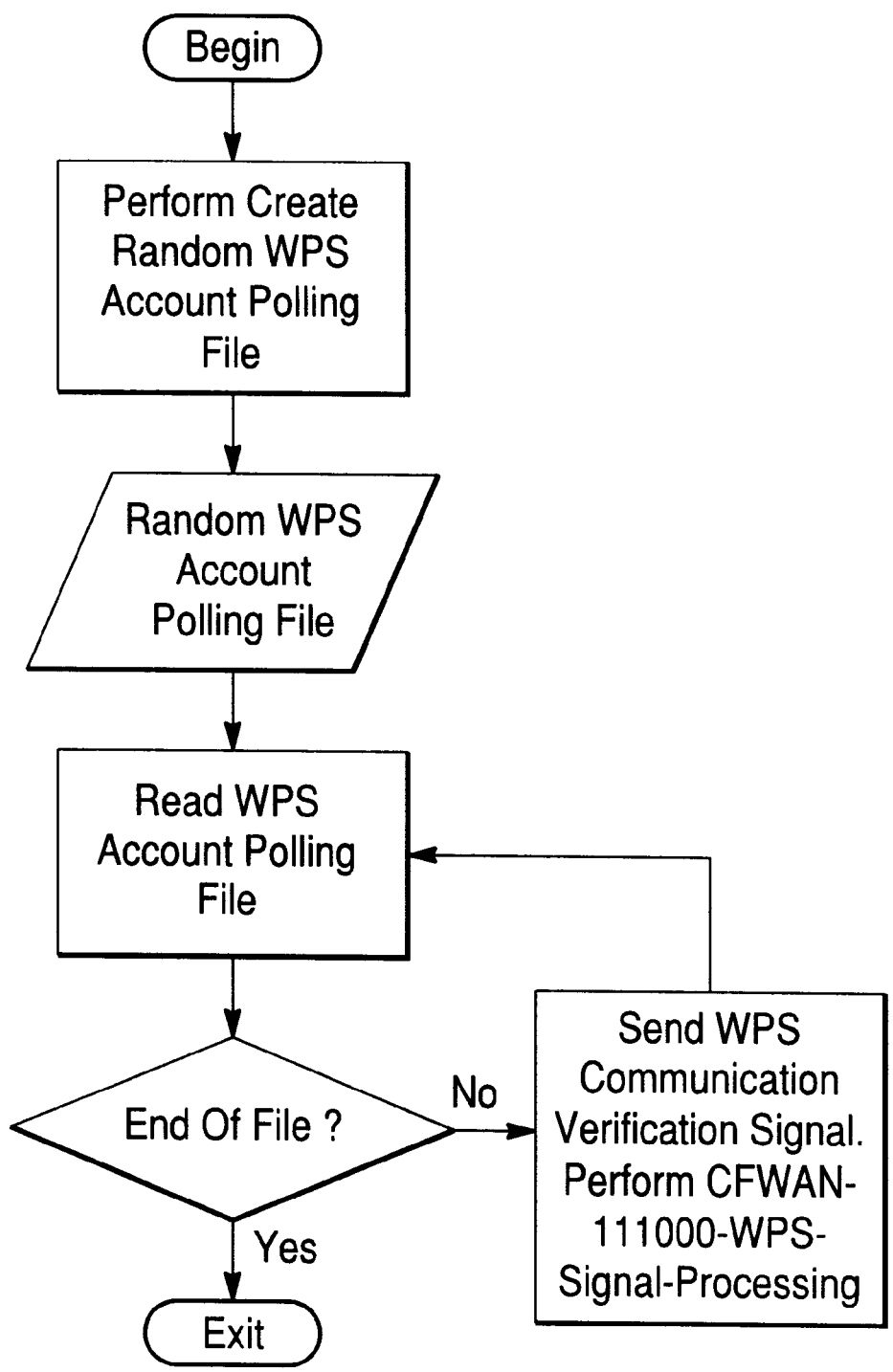
FIG. 24 is a block diagram of the CFWAN 120000-RANDOM-WPS-COMMUNICATION POLLING routine.

First, the system is initialized by synchronizing all system files and code modules and reestablishing communication with all FLANS and wallet protection system 10 devices. Second, the CFWAN-110000-ACCOUNT-PROCESSING routine of FIGS. 9 and 10 is performed, controlling all wallet protection system 10 communication maintenance and security processing. Third, the CFWAN-120000-RANDOM-WPS-COMMUNICATION-POLLING routine of FIG. 24 is performed, controlling all random periodic communication polling to all registered wallet protection systems 10. The purpose of this routine is to check to communication integrity of the wallet protection system 10. It can detect low battery power, communication malfunctions or irregularities, and any other device defects. If this routine detects something wrong, the CFWAN customer service will contact the user and execute the necessary corrective processes.

Figure 25:
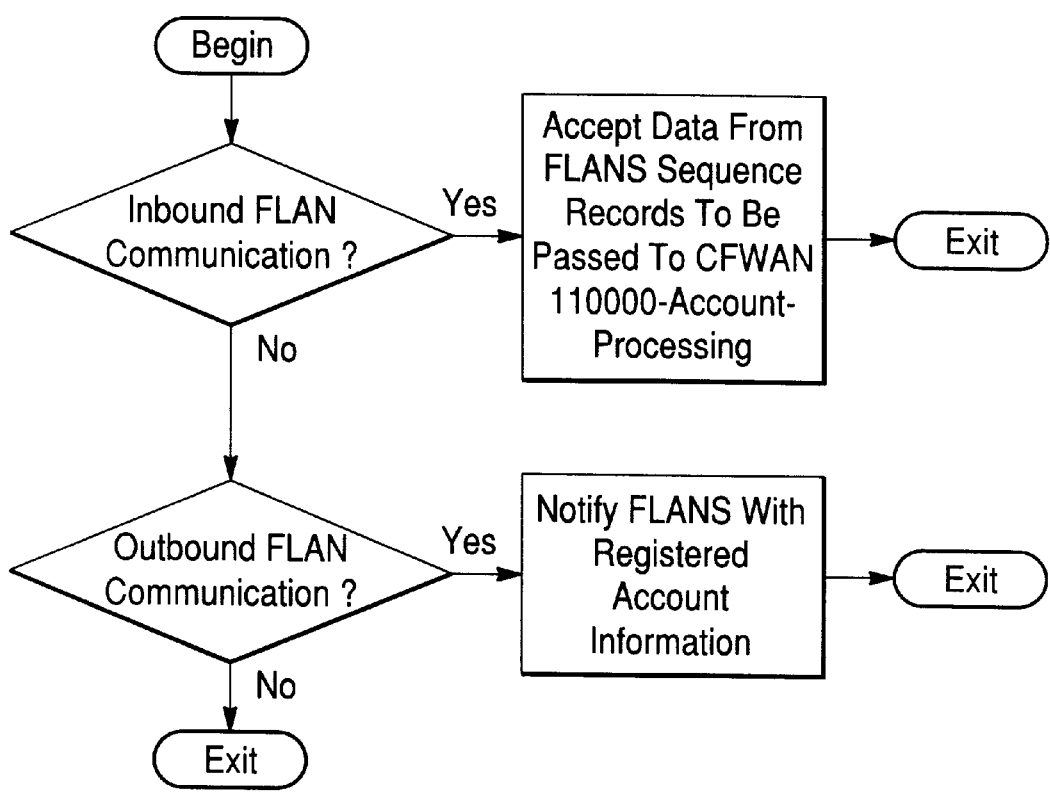
FIG. 25 is a block diagram of the FLAN COMMUNICATIONS routine.

Fourth, the CFWAN-130000-FLAN-COMMUNICATIONS routine of FIG. 25 is performed, controlling all inbound and outbound communications between the FLANS and the registered CFWAN account. Fifth and finally, CFWAN system checks are performed. This process represents an implied internal communication monitoring process that runs simultaneously during each of the major CFWAN processing steps. It is designed to detect and correct any identified system problems through predefined system recovery procedures.

Figure 8:
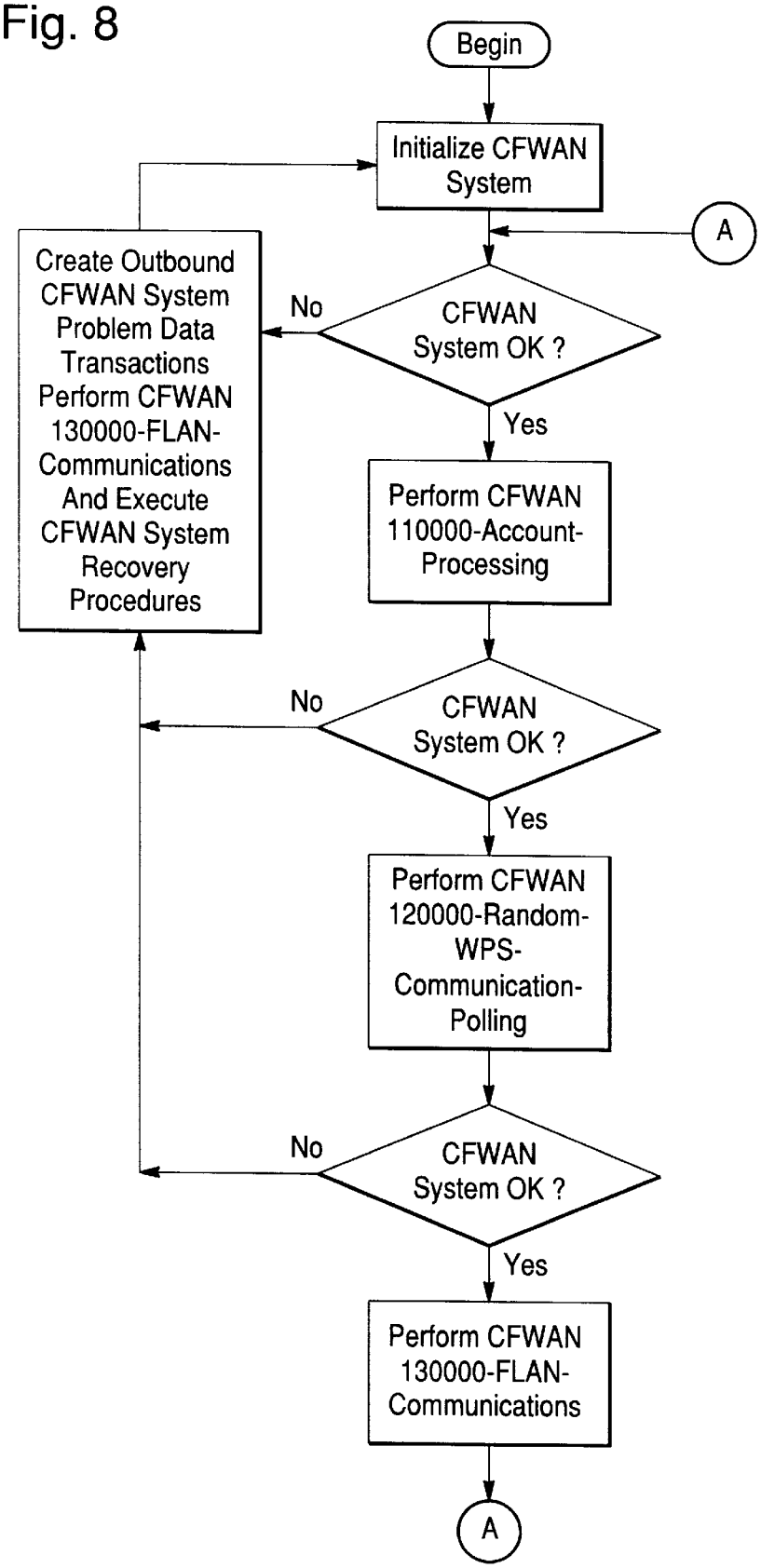
FIG. 8 is a block diagram of the CFWAN 100000-MAIN-LINE routine.

With reference to FIGS. 9 and 10, the CFWAN-110000-ACCOUNT-PROCESSING routine is called from the primary control processing routine CFWAN-100000-MAIN-LINE routine of FIG. 8. This routine controls all wallet protection system 10 communication maintenance and security processing.

Figure 11:
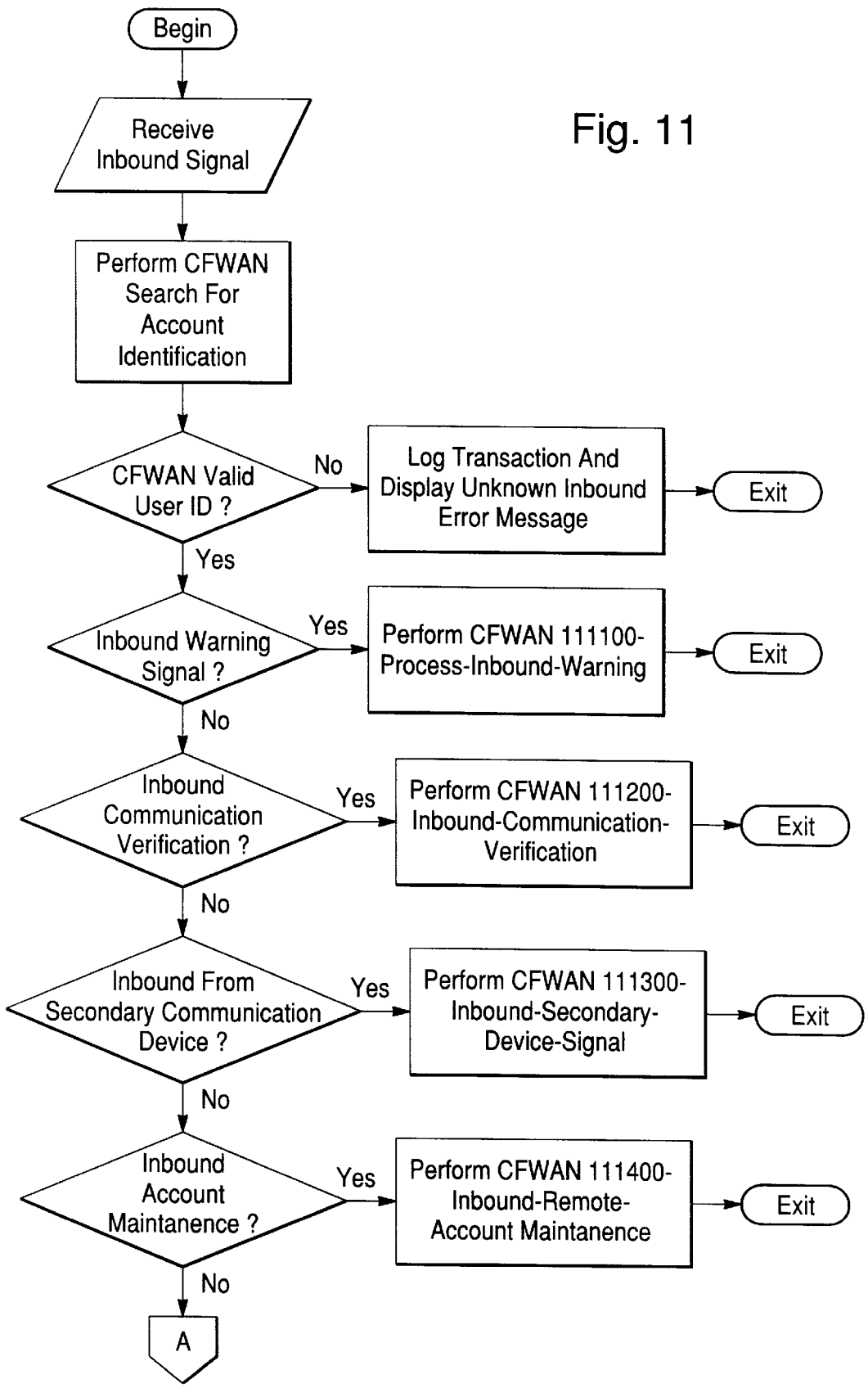
FIG. 11 is a block diagram of the CFWAN 111000-WPS-SIGNAL-PROCESSING routine.
Figure 12:
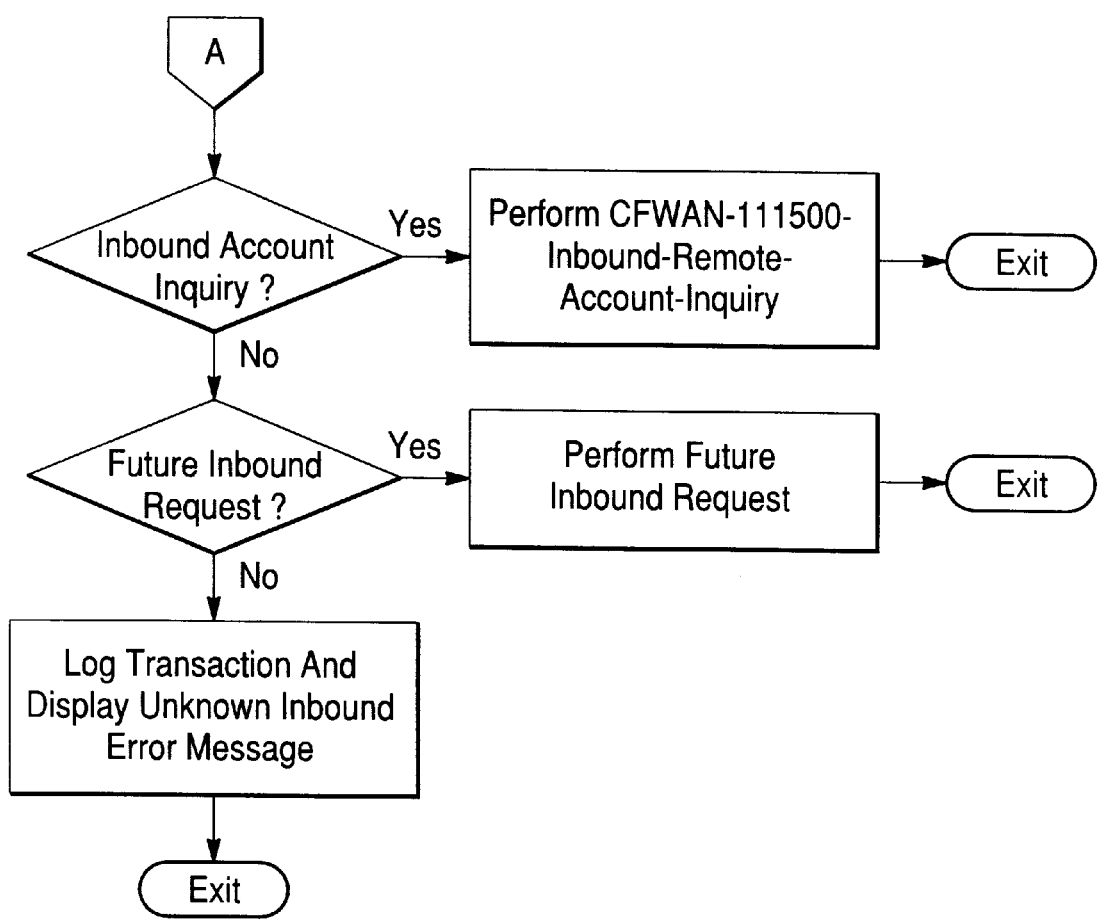
FIG. 12 is a continued block diagram of the CFWAN 111000-WPS-SIGNAL-PROCESSING routine.

With reference to FIGS. 11 and 12, the CFWAN-111000-WPS-SIGNAL-PROCESSING routine is designed to receive and identify all inbound wallet protection system 10 communication signals. Based upon the information contained within the coded signal, this routine will pass control to the appropriate subordinate routines described below.

Figure 13:
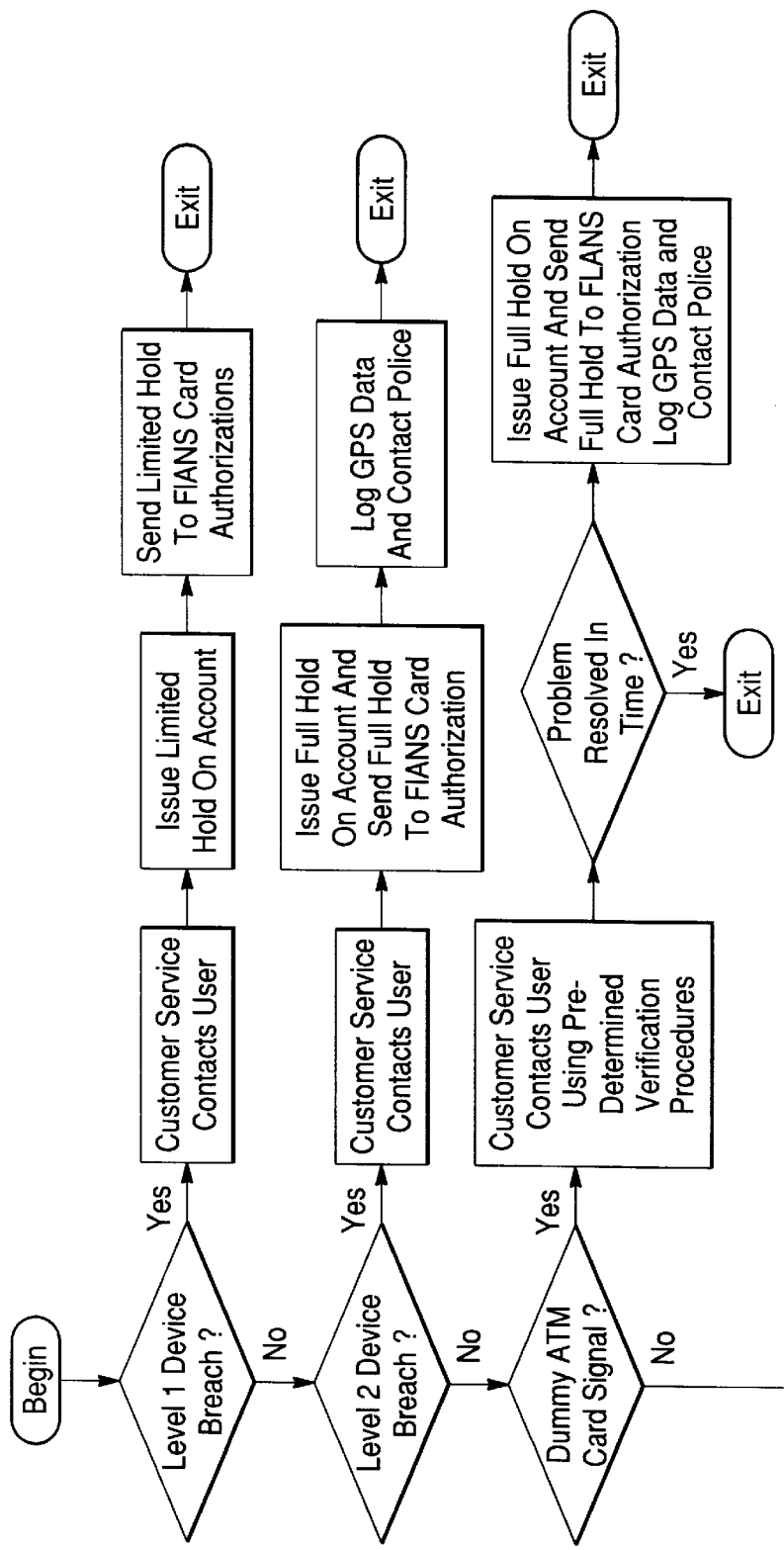
FIG. 13 is a block diagram of the CFWAN 111100-PROCESS-INBOUND-WARNING routine.
Figure 13:
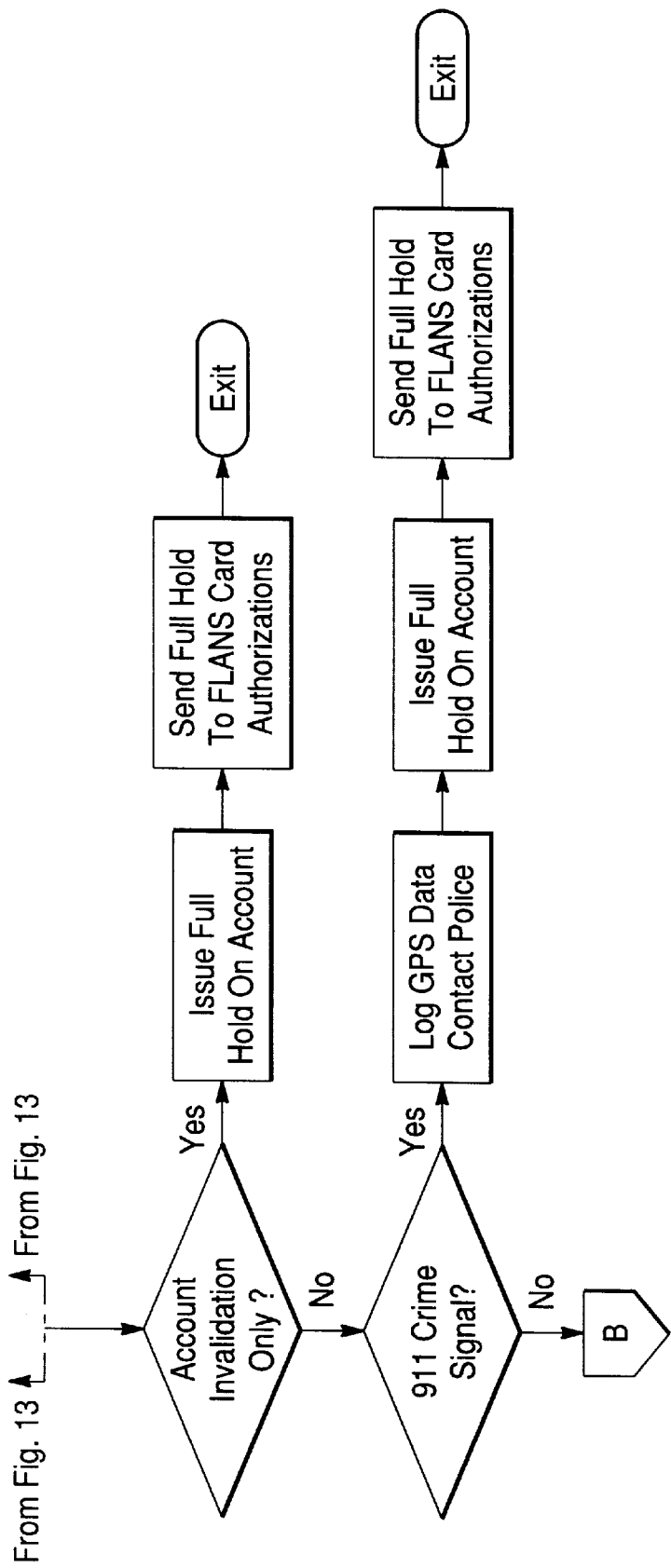
Figure 14:
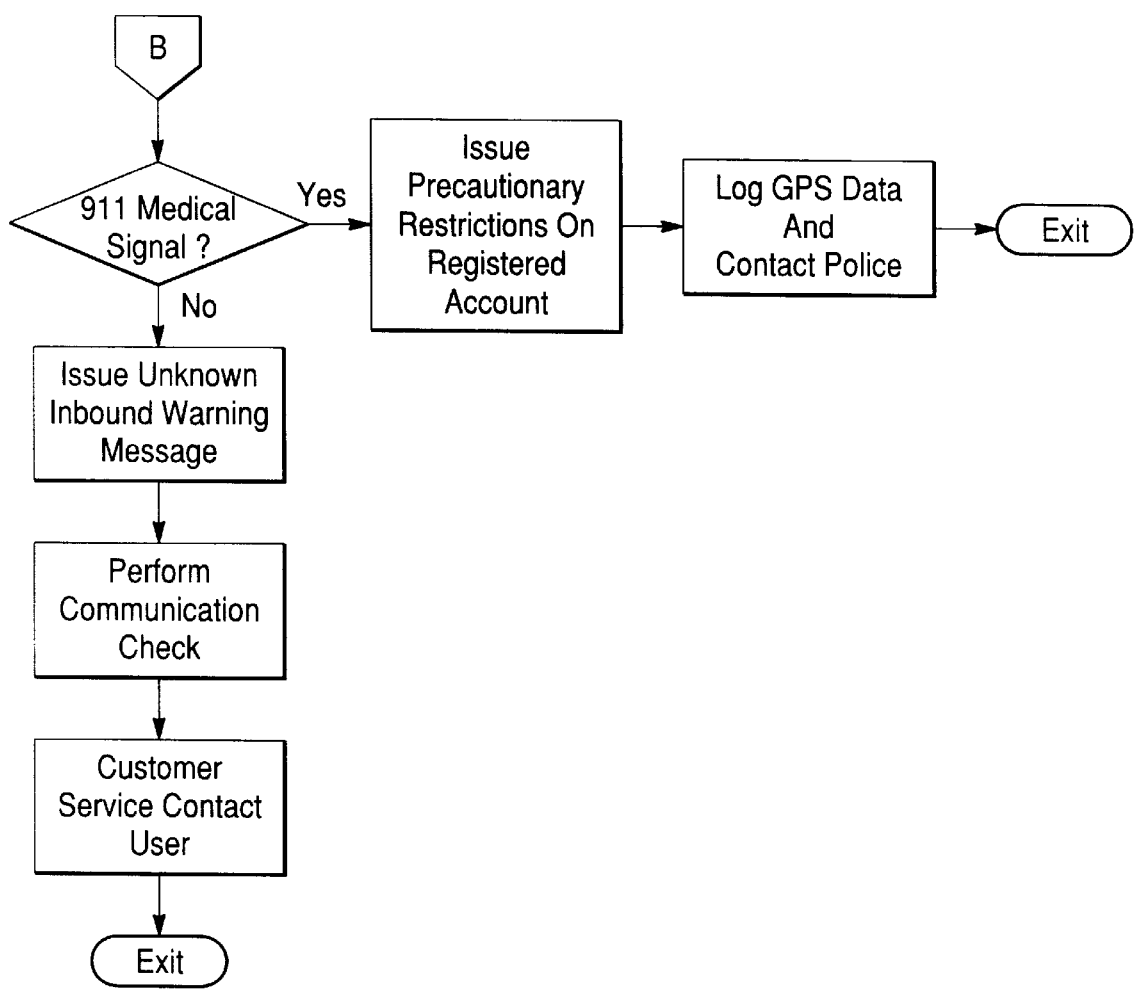
FIG. 14 is a continued block diagram of the CFWAN 111100-PROCESS-INBOUND-WARNING routine.

The CFWAN-111000-PROCESS-INBOUND-WARNING routine of FIGS. 13 and 14 identifies the type of WPS inbound warning and executes the appropriate security processes to handle the communication request. The warning signal types include a level 1 device breach, level 2 device breach, dummy ATM card, account invalidation only, 911 crime, 911 medical, and performs the CFWAN-111200-INBOUND-COMMUNICATION-VERIFICATION routine of FIG. 15 for any indecipherable communication signals. All account-warning signals initiate interactive communication protocols between the CFWAN and the signaling wallet protection system 10.

Specifically, the CFWAN-111100-PROCESS-INBOUND-WARNING routine of FIGS. 13 and 14 is designed to handle signal misfires and device malfunctions. The CFWAN-111100-PROCESS-INBOUND-WARNING routine of FIGS. 13 and 14 contacts and informs the user that there is a malfunction with the wallet protection system 10 and puts a precautionary monetary limit on registered cards. Also, this routine handles the dummy credit card or ATM card signal processing initiated from the wallet protection system 10 when the content holders 130 detect a problem. This would include possible account deactivation process if the warning has not been resolved over a predetermined amount of time or the precautionary monetary limits have been reached. The wallet protection system 10 internal circuitry diagnostic checks are designed to minimize any account deactivation signal misfires due to manufacturing defects.

A level 1 security breach occurs when just one of the wallet protection system 10 security parallel check processes malfunctions. When a level 1 security violation occurs, the wallet protection system 10 sends an account warning signal. In addition, GPS location data is logged and transmitted along with the appropriate security warning signal.

Figure 3:
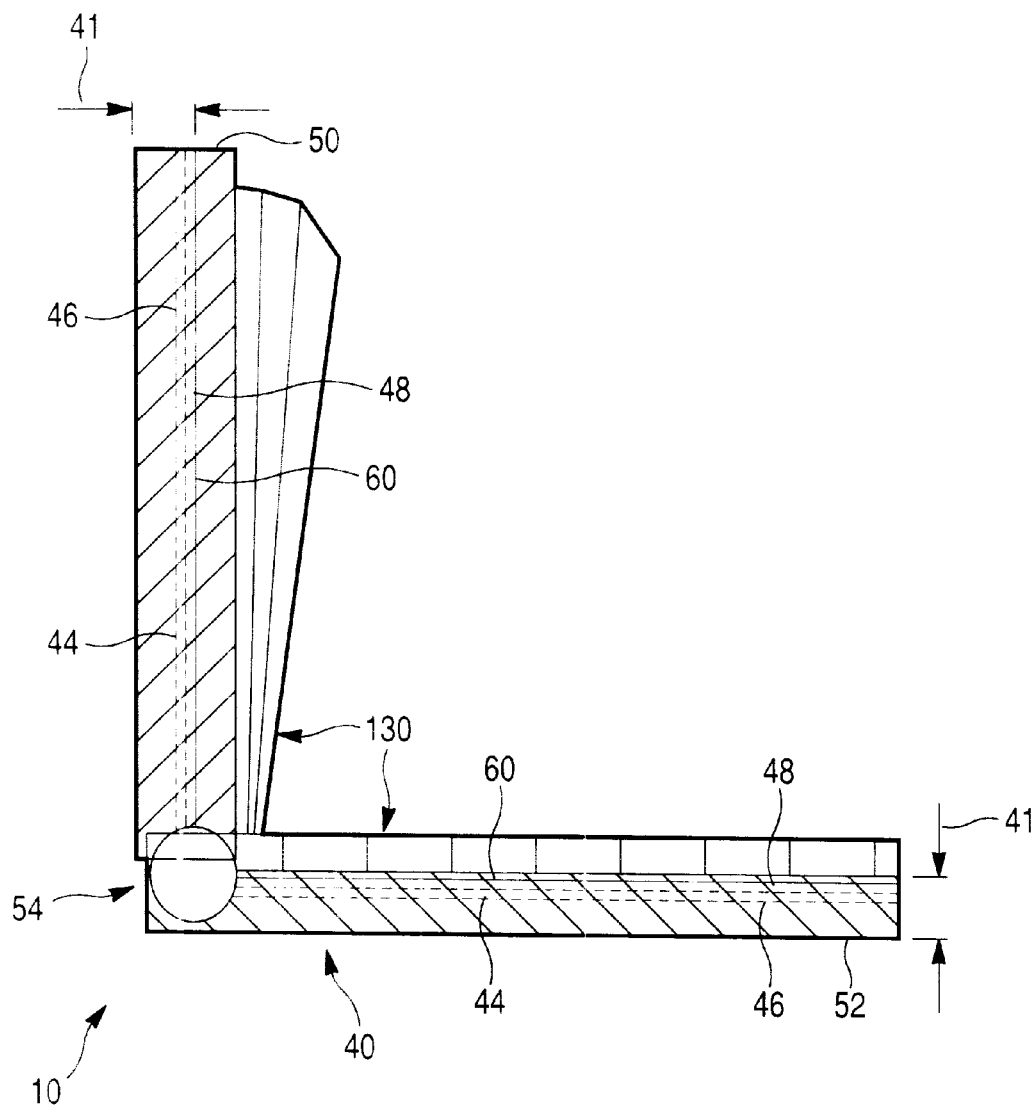
FIG. 3 is a side elevational view in section of the wallet protection system opened at a 90° angle.

For instance, sheathing 44 contained in upper portion 50, illustrated with reference to FIGS. 2 and 3, is damaged or malfunctions and the sheathing 44 in lower portion 52 is intact and operational, then a warning signal is sent to CFWAN communication site or centralized database 12. Likewise, if the wallet protection system 10 sheathing 44 in lower portion 52 is damaged or malfunctions, and the wallet protection system 10 sheathing 44 in upper portion 50 is intact and operational, then a warning signal is sent to CFWAN communication site.

A level 2 security breach occurs when both of the wallet protection system 10 security parallel check processes malfunction. When a level 2 security violation occurs, the wallet protection system 10 sends a full account deactivation signal. In addition, GPS location data is logged and transmitted along with the appropriate security warning signal. Listed below are examples of what constitutes a level 2 security violation.

If both sheathings 44 contained in upper and lower portions 50 and 52 of wallet protection system 10 are damaged or malfunction, an account deactivation signal is sent to CFWAN communication site. Likewise, if wallet protection system 10 is contaminated with water, then a warning signal and a freeze account signal are sent to CFWAN communication site.

In addition, this routine processes fake credit card or ATM card signals. The wallet protection system 10 employs the use of specially designed fake decoy credit cards or ATM cards for the individual to use in their wallet protection system 10. The designated financial organizations associated with the CFWAN will issue the fake user assigned decoy cards. The cards are placed in pre-designated card slots within content holders 130. The identification and location of the decoy cards is defined within the wallet protection system 10 card content holder EPROM memory. If one of the decoy cards have been removed from its designated slot, a warning signal is sent to a CFWAN communication site. After the warning signal has been received, the CFWAN will initiate verification procedures with the user. These procedures will include sending a mandatory reply message to the wallet protection system 10. The wallet protection system 10 will alert the user with the message and wait for a response from the user. The user can cancel the warning signal by either calling the CFWAN 1-800 number or by keying in the designated signal cancel code using the wallet protection system 10 keypad 100. This gives the user the ability to cancel the warning signal if they removed or misplaced the decoy credit card by accident. If the user doesn't properly contact the CFWAN over a predetermined period of time, the CFWAN will execute the appropriate signal tracking and account security processes.

Further, this routine also processes account deactivation signals. The user of the wallet protection system 10 device can initiate the account deactivation signal from keypad 100 of wallet protection system 10. For account invalidation signals, the CFWAN software control programs will initiate the necessary account invalidation processes to the user/customer account data within the CFWAN. In addition, the CFWAN software control programs will initiate all the necessary communication processes to the associated FLANS to flag the account as invalid. The invalidation process consists of flagging the individual CFWAN master account file and its linked contents as invalid and electronically contacting all associated organizations to flag their segments of the individual accounts as invalid.

For personal security 911 crime signals, the CFWAN software control programs will initiate the necessary account invalidation processes to the user/customer account data within the CFWAN. In addition, the CFWAN software control programs will initiate all the necessary communication processes to the associated FLANS to flag the account as invalid. Also, the CFWAN software control programs will initiate all the necessary communication and location tracking processes utilizing GPS technologies to notify and assist the nearest law enforcement agencies concerning the situation.

For personal security 911 help signals, the CFWAN software control programs will initiate the necessary account invalidation processes to the user/customer account data within the CFWAN. Depending on the type of personal security 911 help signal, the CFWAN software control programs will initiate all the necessary communication processes to the associated Financial Local Area Networks (FLANS) to flag the account as invalid or restricted. In addition, the CFWAN software control programs will initiate all the necessary communication and location tracking processes utilizing GPS technologies to notify and assist the nearest law enforcement agencies concerning the situation.

Figure 15:
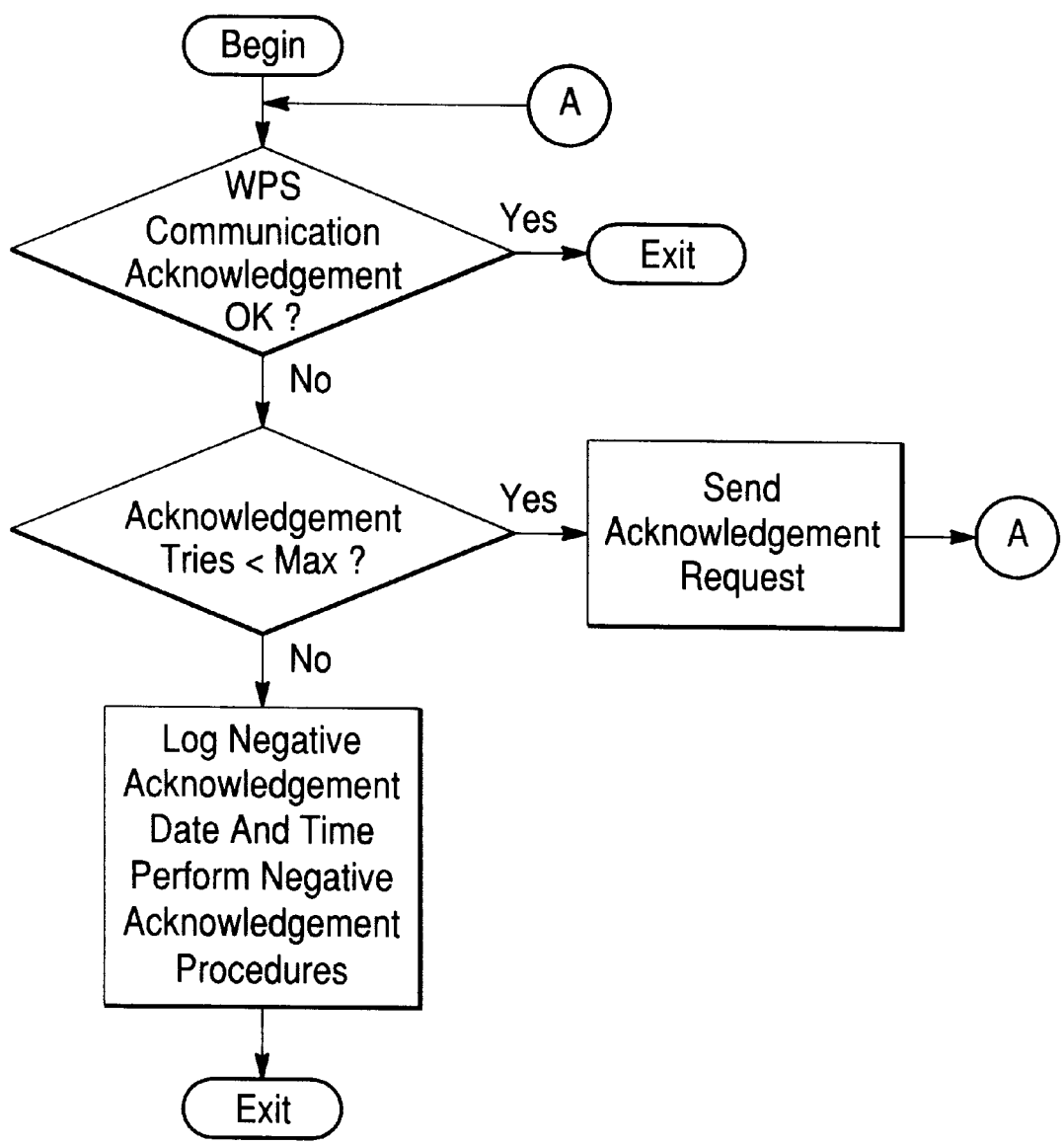
FIG. 15 is a block diagram of the CFWAN 111200-INBOUND-COMMUNICATION VERIFICATION routine.

With reference to FIG. 15, the CFWAN-111200-INBOUND-COMMUNICATION-VERIFICATION routine is an interactive communication diagnostic check protocol between the CFWAN and the signaling wallet protection system 10. It is designed to detect, identify and correct any communication problems between the CFWAN and the signaling wallet protection system 10. When the CFWAN receives a communication signal from the wallet protection system 10, it will process the signal request and send a communication acknowledgement signal back to the identified wallet protection system 10 and wait for a response from the identified wallet protection system 10. If the identified wallet protection system 10 does not respond properly, the CFWAN will execute the appropriate security communication measures.

Figure 16:
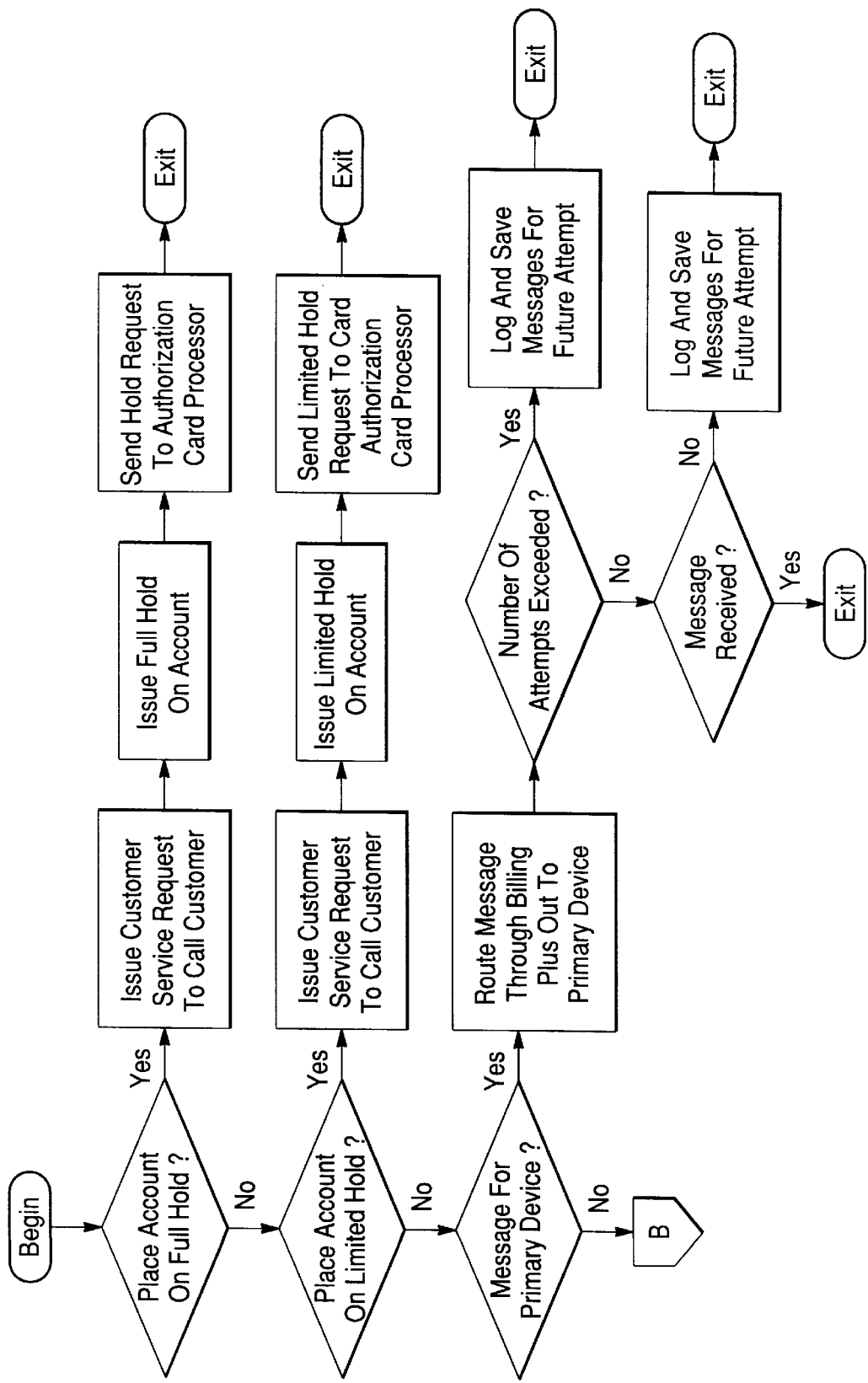
FIG. 16 is a block diagram of the CFWAN 111300-INBOUND-SECONDARY-DEVICE-SIGNALS routine.
Figure 17:
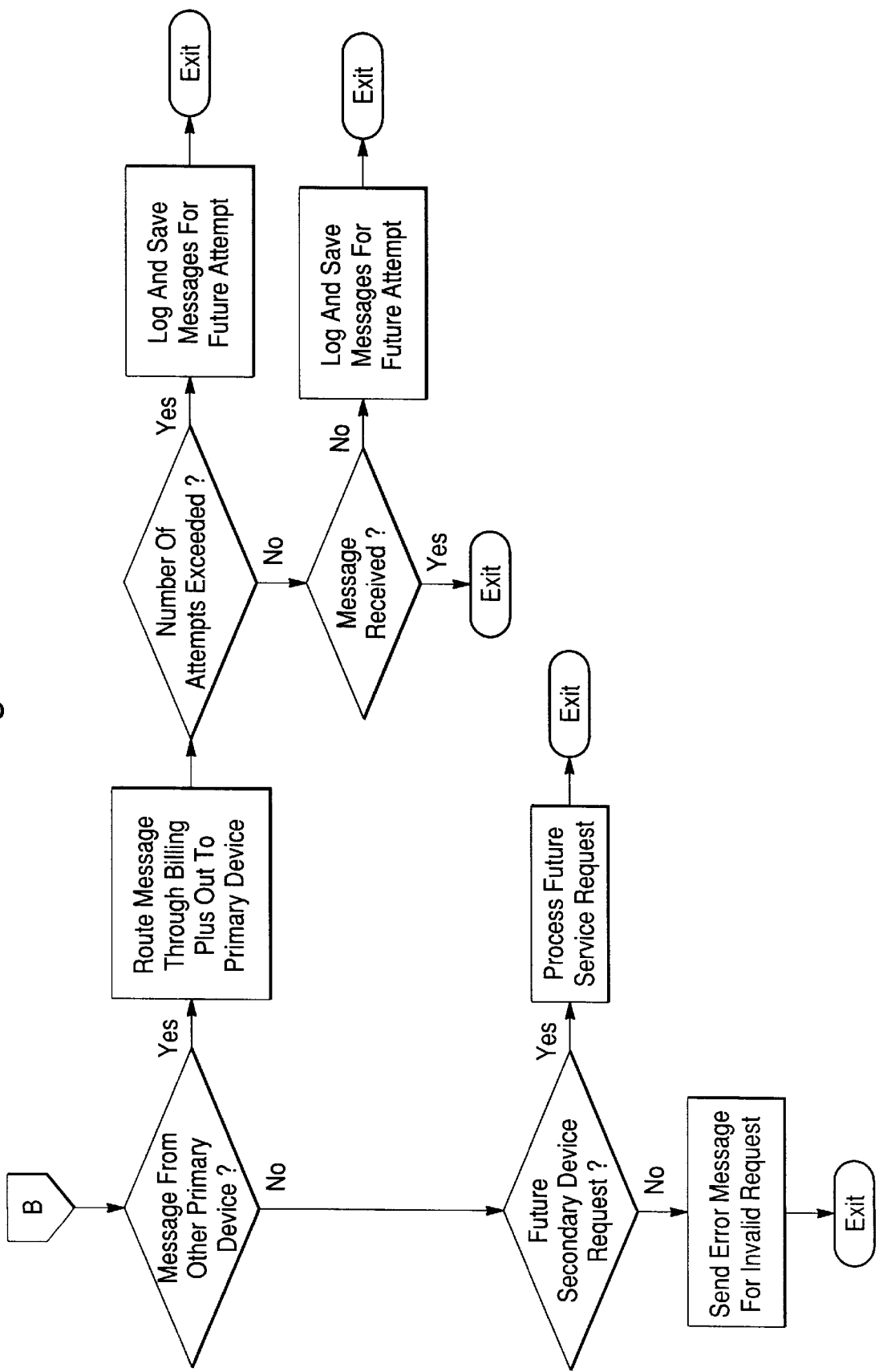
FIG. 17 is a continued block diagram of the CFWAN 111300-INBOUND-SECONDARY-DEVICE-SIGNALS routine.

As described above, the wallet protection system also includes a secondary device. The secondary device is intended to be stored in secure location for emergency use. If the customer loses their wallet protection system 10, they could use their secondary device to send an account deactivation signal to the CFWAN communication site. With reference to FIGS. 16 and 17, the CFWAN-111300-INBOUND-SECONDARY-DEVICE-SIGNAL routine consists of flagging the individuals CFWAN master account file and its linked contents as invalid and electronically contacting all associated organizations to flag their segments of the individual accounts as invalid. Also, the secondary device has the capability to send and receive messages to the wallet protection system 10. These messages are routed through the CFWAN for processing.

Figure 18:
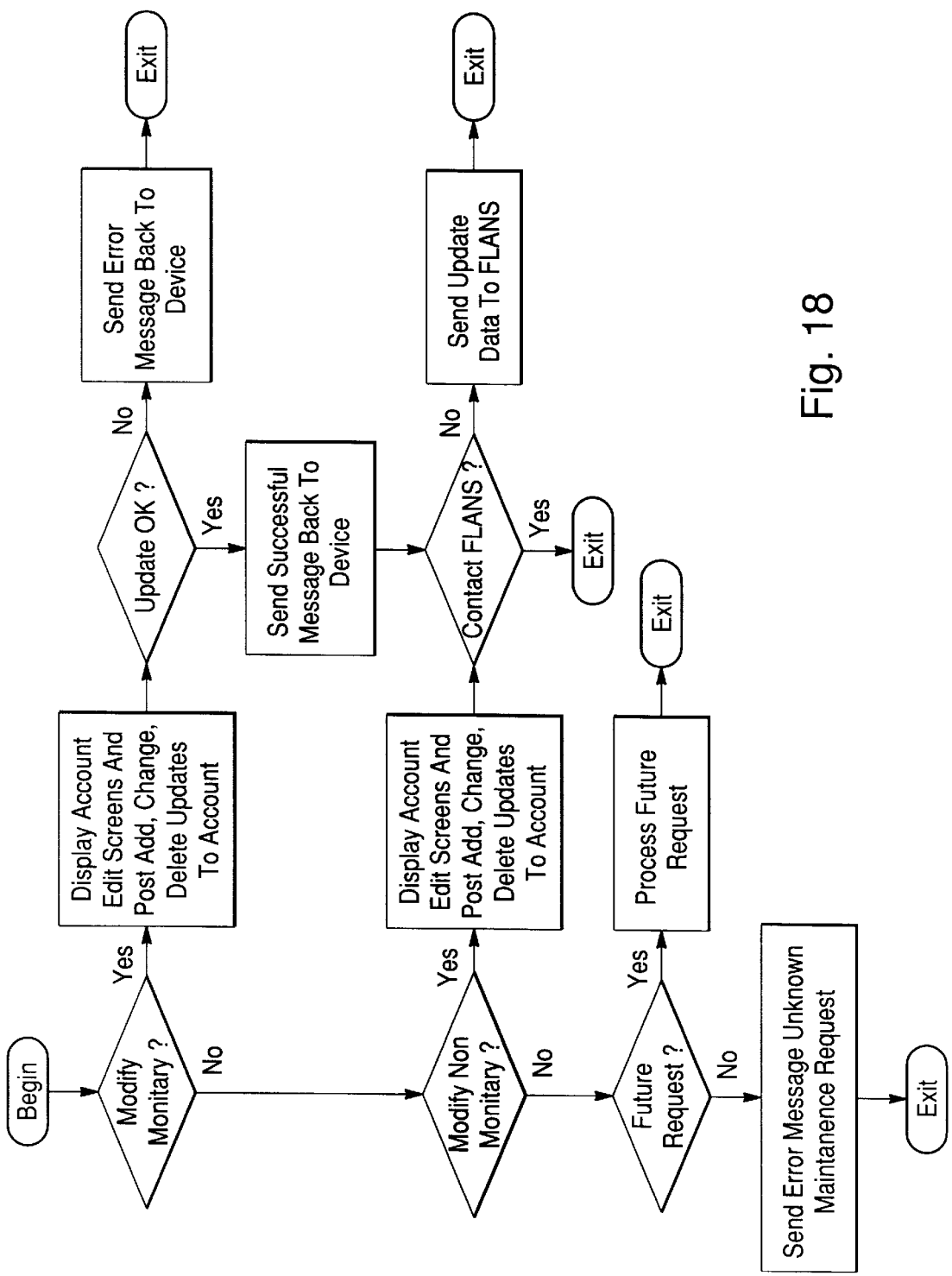
FIG. 18 is a block diagram of the CFWAN 111400-INBOUND-REMOTE-ACCOUNT-MAINTENANCE routine.

With reference to FIG. 18, CFWAN-111400-INBOUND-REMOTE-ACCOUNT-MAINTENANCE routine interprets the results from the previously executed security verification procedures to check the CFWAN database for an existing account record. After security verification, the system will display the authorized account information that is allowed for the specific authorized user. Using a remote Internet access protocol, the user can modify monetary data, non-monetary data, send and receive transactions to associated FLANS, and process future requests.

Figure 19:
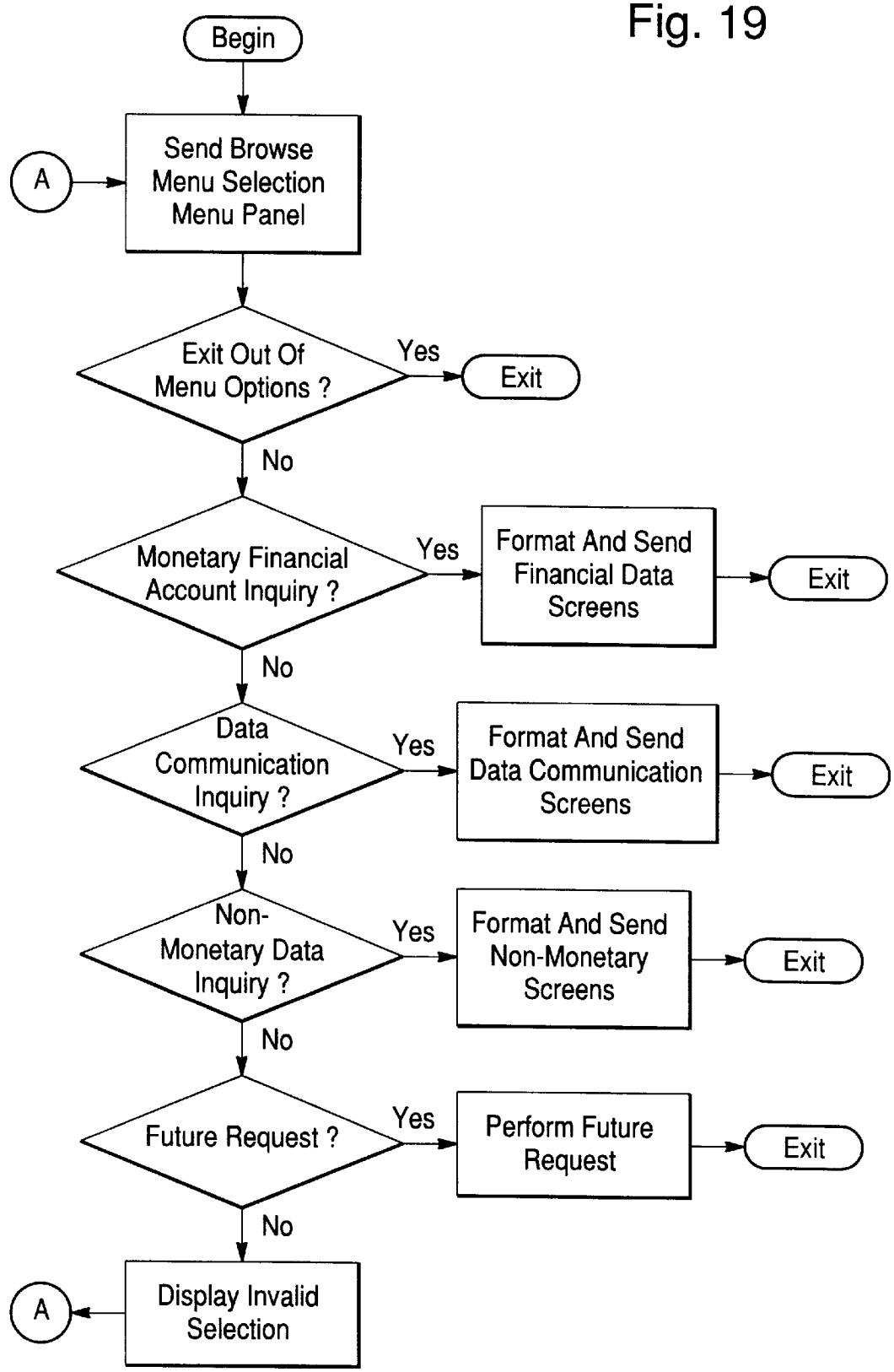
FIG. 19 is a block diagram of the CFWAN 111500-INBOUND-REMOTE-ACCOUNT-INQUIRY routine.

With references to FIG. 19, the CFWAN-111500-INBOUND-REMOTE-ACCOUNT-INQUIRY routine interprets the results from the previously executed security verification procedures to check the CFWAN database for an existing account record. After security verification, the system will display the authorized account inquiry information that is allowed for the specific authorized user.

Figure 20:
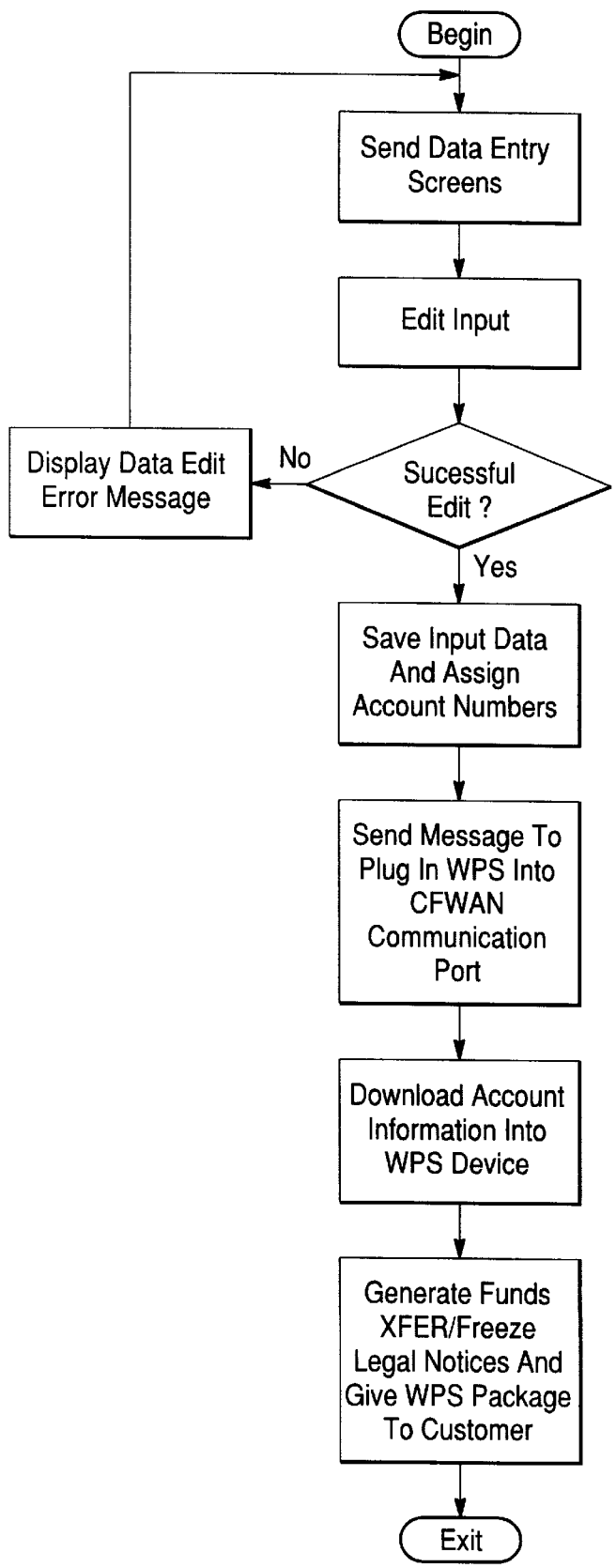
FIG. 20 is a block diagram of the CFWAN 112000-NEW-ACCOUNT routine.

With references to FIG. 20, the CFWAN-112000-NEW ACCOUNT routine interprets the results from the previously executed security verification procedures to check the CFWAN database for an existing account record. This security procedure is depicted within the CFWAN-110000-ACCOUNT-PROCESSING FLOWCHART. If no current account record was found, then the registration process can begin as outlined in the flowchart.

Figure 21:
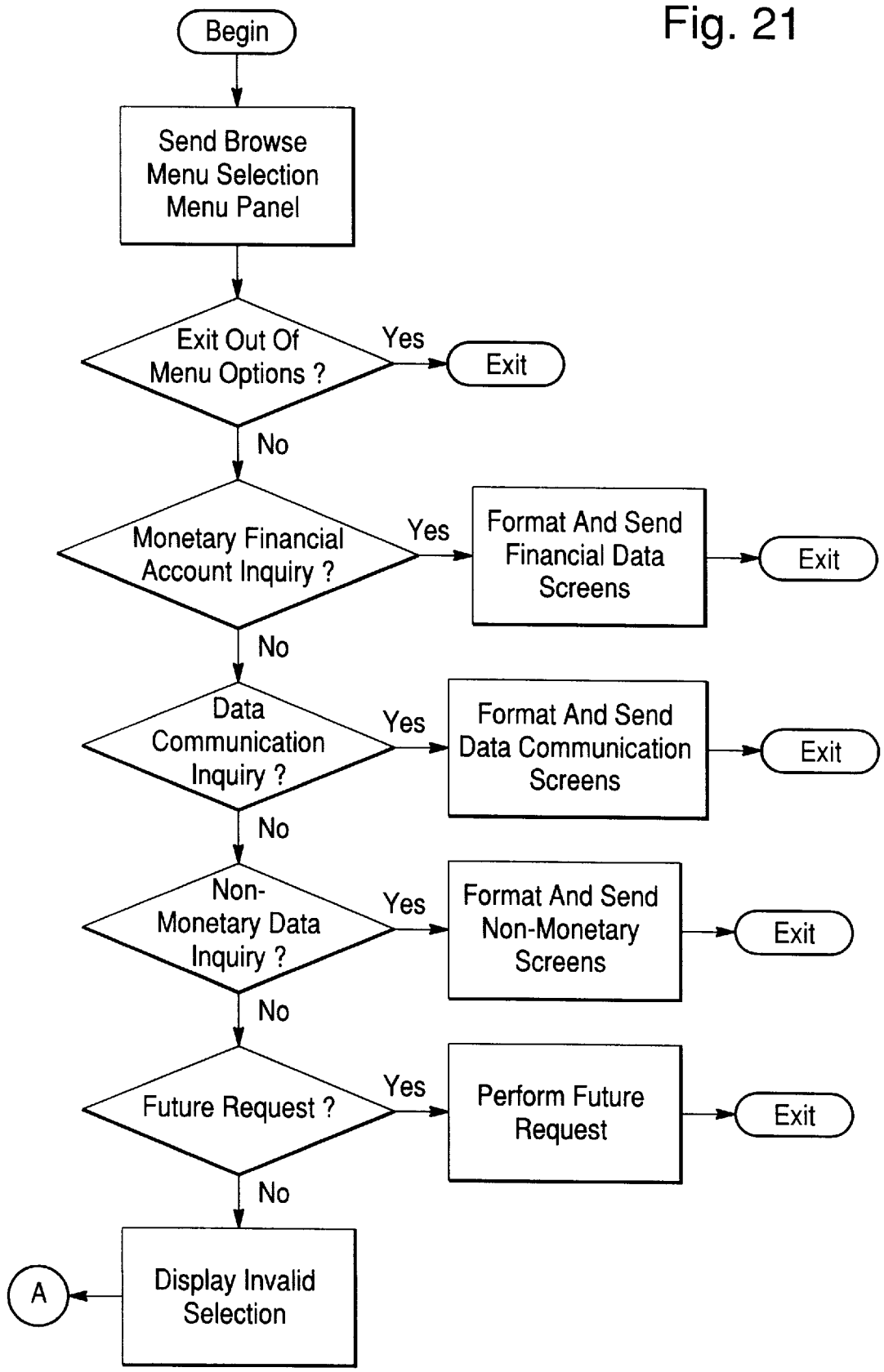
FIG. 21 is a block diagram of the CFWAN 113000-ACCOUNT-INQUIRY routine.

With reference to FIG. 21, the CFWAN-113000-ACCOUNT INQUIRY routine interprets the results from the previously executed security verification procedures to check the CFWAN database for an existing account record. The CFWAN security routine performs all necessary security verification procedures to control outside account inquiries from FLAN organizations and customers for accessing registered account information. After security verification, the system will display the necessary account information that is allowed for the specific authorized user. In addition, other financial businesses or organizations can utilize this electronic verification process to check the CFWAN for an individual's invalidated account. If the selected individual's account has been disabled and invalidated, the date and time stamp of the disabled account will be checked against the financial transactions in transit. If personal checks, traveler's checks, or other registered financial transactions in transit have an earlier initial date and time stamp than the disabled account date and time stamp, the transactions will be cleared. Any other transactions occurring after the disabled account date and time stamp are rejected.

Figure 22:
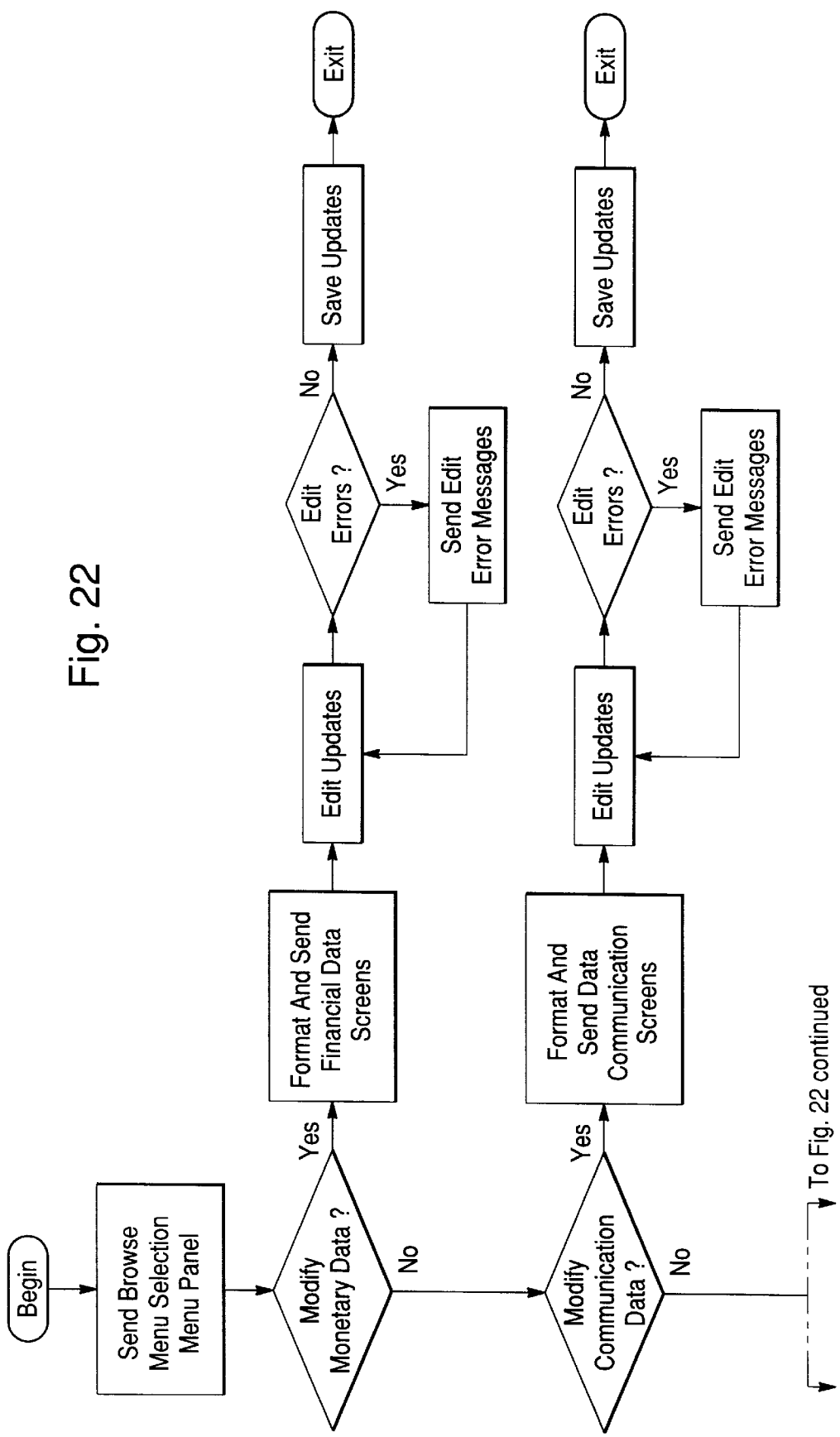
FIG. 22 is a block diagram of the CFWAN 114000-ACCOUNT-MAINTENANCE routine.
Figure 22:
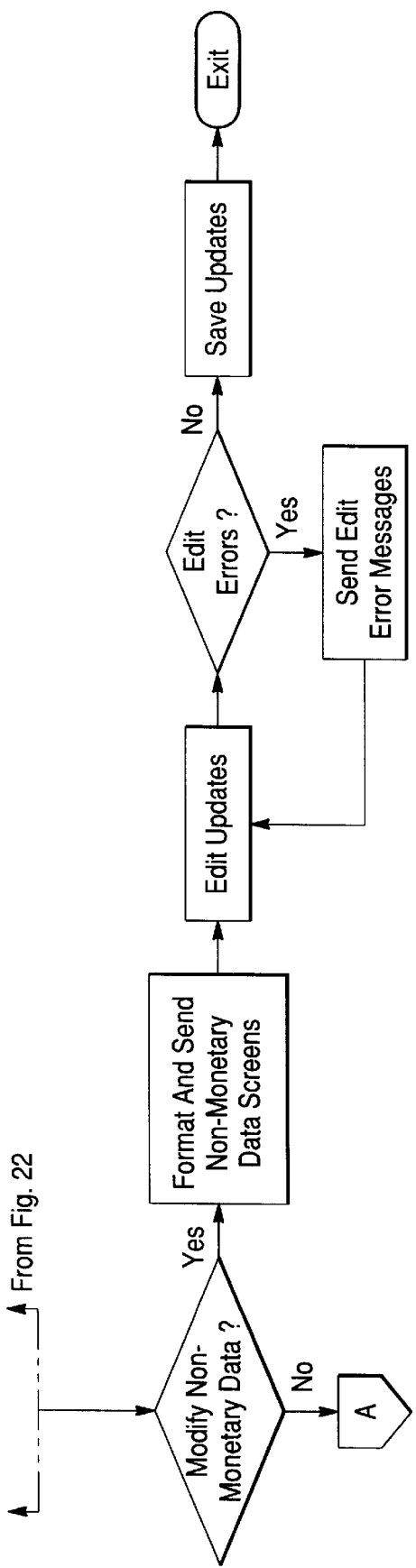
Figure 23:
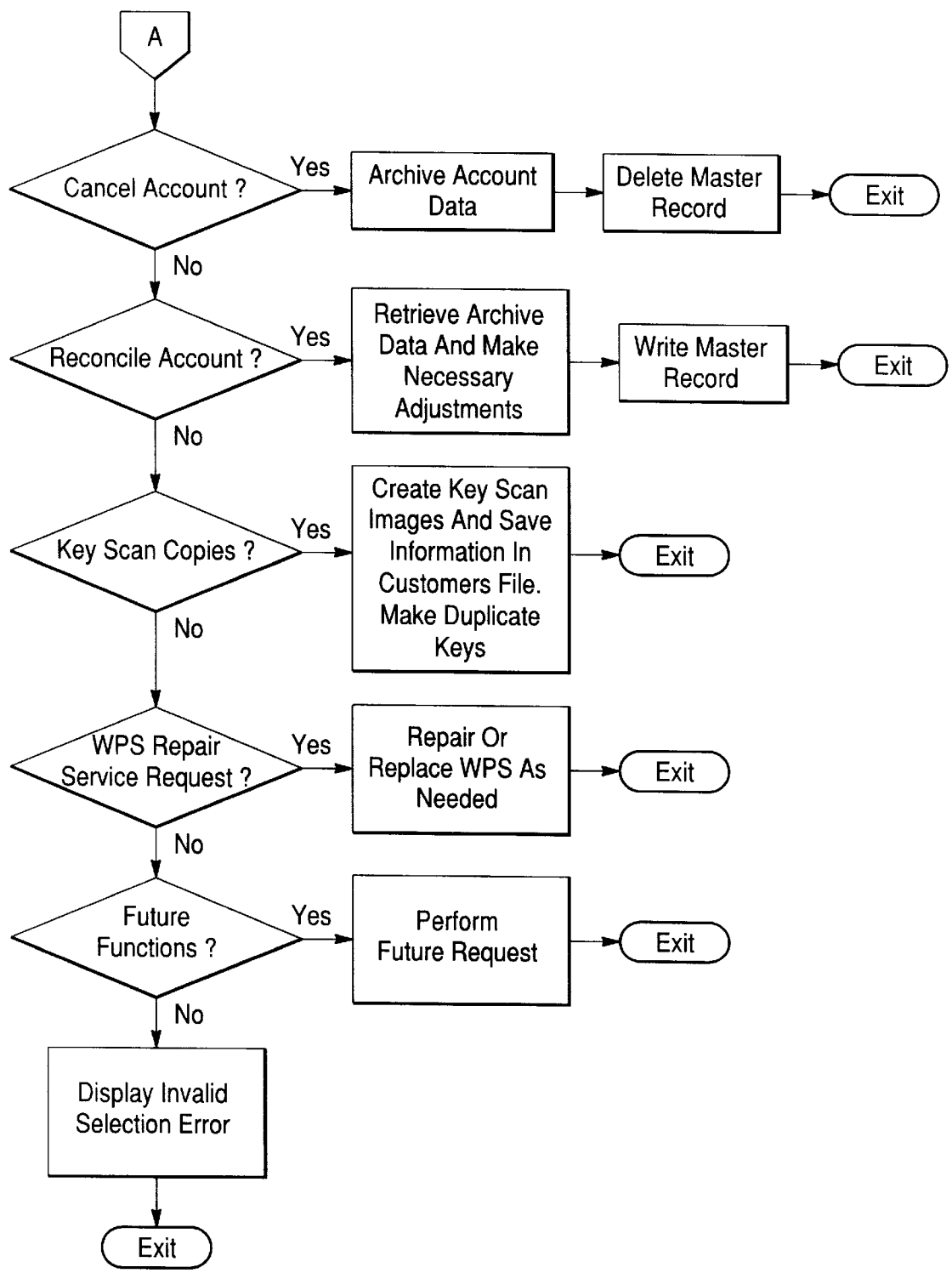
FIG. 23 is a continued block diagram of the CFWAN 114000-ACCOUNT-MAINTENANCE routine.

The CFWAN-114000-ACCOUNT MAINTENANCE routine of FIGS. 22 and 23 performs the necessary security verification procedures to control access to registered account information. After security verification, the system will display the authorized account information that is allowed for the specific authorized user. Account maintenance can be done at designed CFWAN communication sites or from remote Internet access, as will be described in more detail below.

With reference to FIG. 24, the CFWAN-120000-RANDOM-WPS-COMMUNICATION-POLLING routine periodically polls the interactive communication of selected wallet protection system 10 packages to ensure communication integrity. This routine creates a random wallet protection system 10 account-polling file from the registered accounts within the CFWAN database. Then, it will initiate a communication acknowledgement signal from the next consecutive record and pass processing control to the CFWAN-111000-WPS-SIGNAL-PROCESSING routine. The system will execute the wallet protection system 10 communication polling routines until the end of the random wallet protection system 10 account-polling file.

With reference to FIG. 24, the CFWAN-130000-FLAN-COMMUNICATIONS routine performs the interactive communication protocols between the FLANS and the CFWAN. For inbound FLAN communication, data transactions are accepted from the FLANS, and the data transactions are used as input for the CFWAN-110000-ACCOUNT-PROCESSING routine of FIGS. 9 and 10 for processing. For outbound FLAN communication, CFWAN data transactions are created and sent electronically to the selected FLANS.

Figure 26:
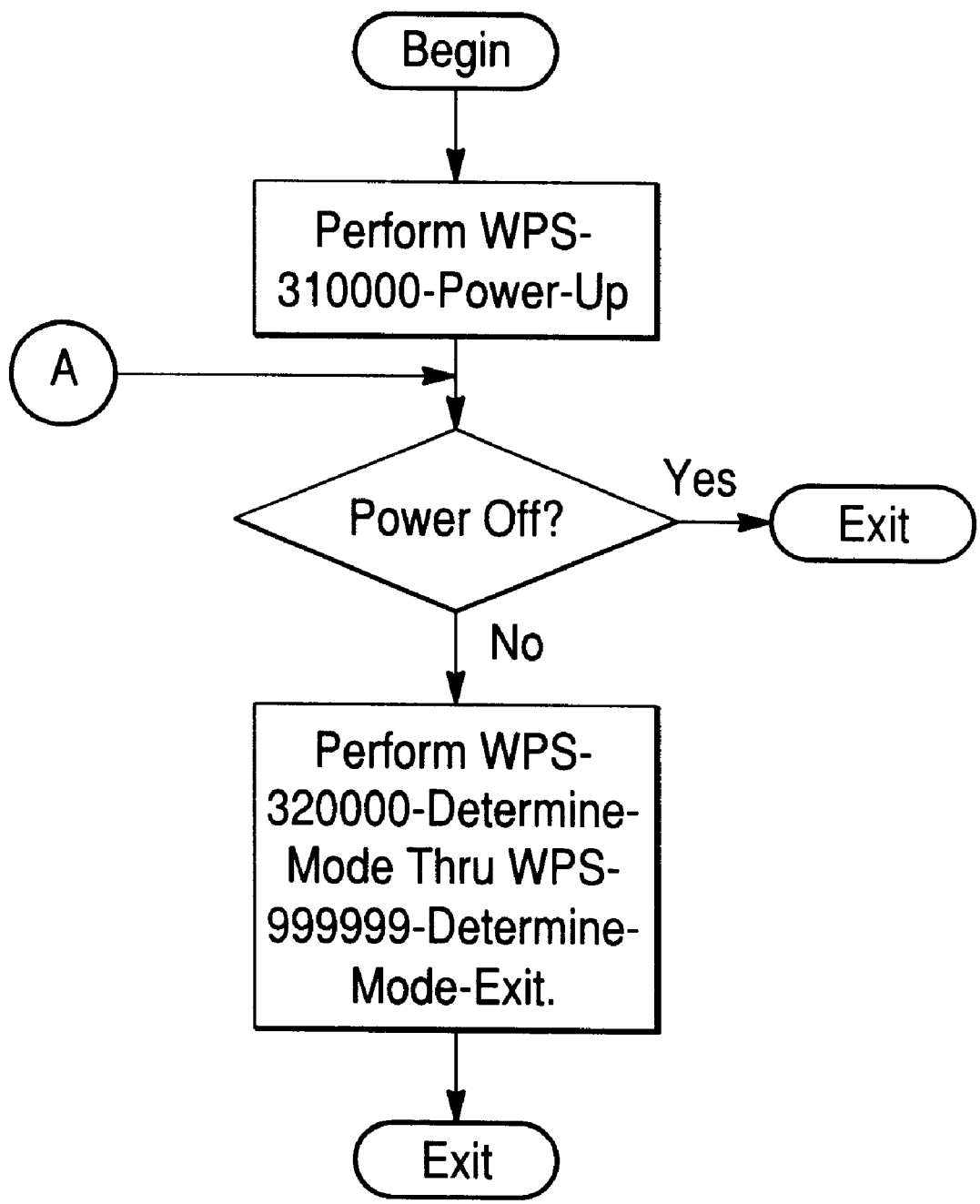
FIG. 26 is a block diagram of the WPS 300000-MAINLINE routine.
Figure 27:
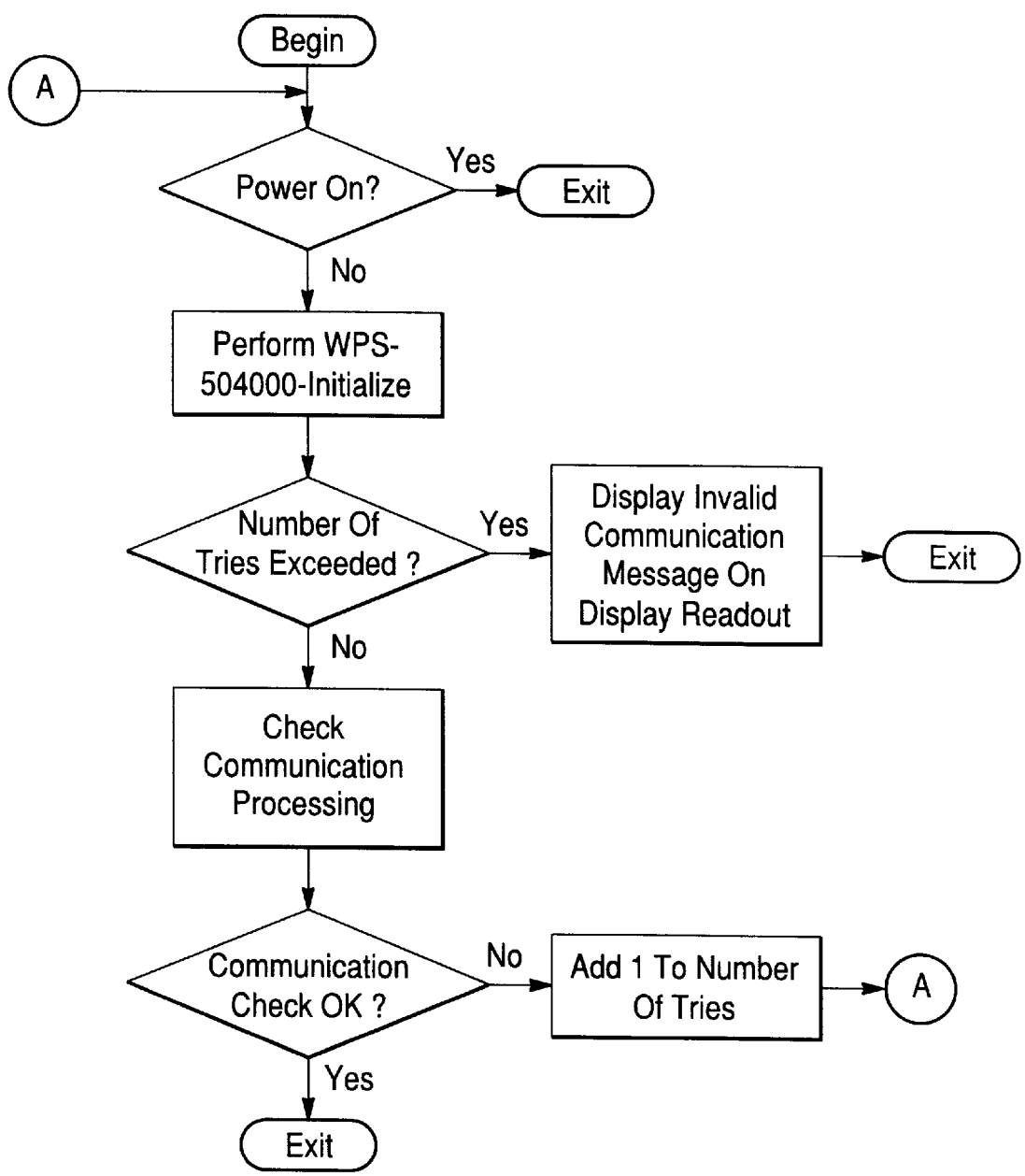
FIG. 27 is a block diagram of the WPS 310000 POWER-UP routine.

With reference to FIG. 26, the WPS-300000-MAIN-LINE is a high level flowchart pictorial that depicts the general operational process of the wallet protection system 10. After the initial WPS-310000-POWER-UP routine of FIG. 27 has been performed, the wallet protection system 10 passes control to the WPS-320000-DETERMINE-MODE routine of FIGS. 28 and 29. The WPS-320000-DETERMINE-MODE routine is a continuously cycling routine that depicts the general overall operational processes and functionality of the wallet protection system 10 and its interaction between the centralized database 12 CFWAN and associated FLANS.

The wallet protection system 10 is initiated if the power is on, as outlined in FIG. 26. If the power is on, then the device will perform the WPS-504000-INITIALIZE routine of FIG. 43. The WPS-504000-INITIALIZE routine boots up the wallet protection system 10 operating system, checks for sufficient power, formats and sends a CFWAN communication verification signal, and passes control to the WPS-330000-PROCESS-INBOUND-SIGNAL routine of FIGS. 30–32 for communication verification acknowledgement. The WPS-310000-POWER-UP routine of FIG. 27 will execute a preset number of processing cycles to confirm communication verification with the CFWAN. If communication verification cannot be obtained, the wallet protection system 10 will alert the user of a problem. If communication verification with the CFWAN has been obtained, processing control will be passed to the WPS-320000-DETERMINE-MODE routine of FIG. 28.

Figure 28:
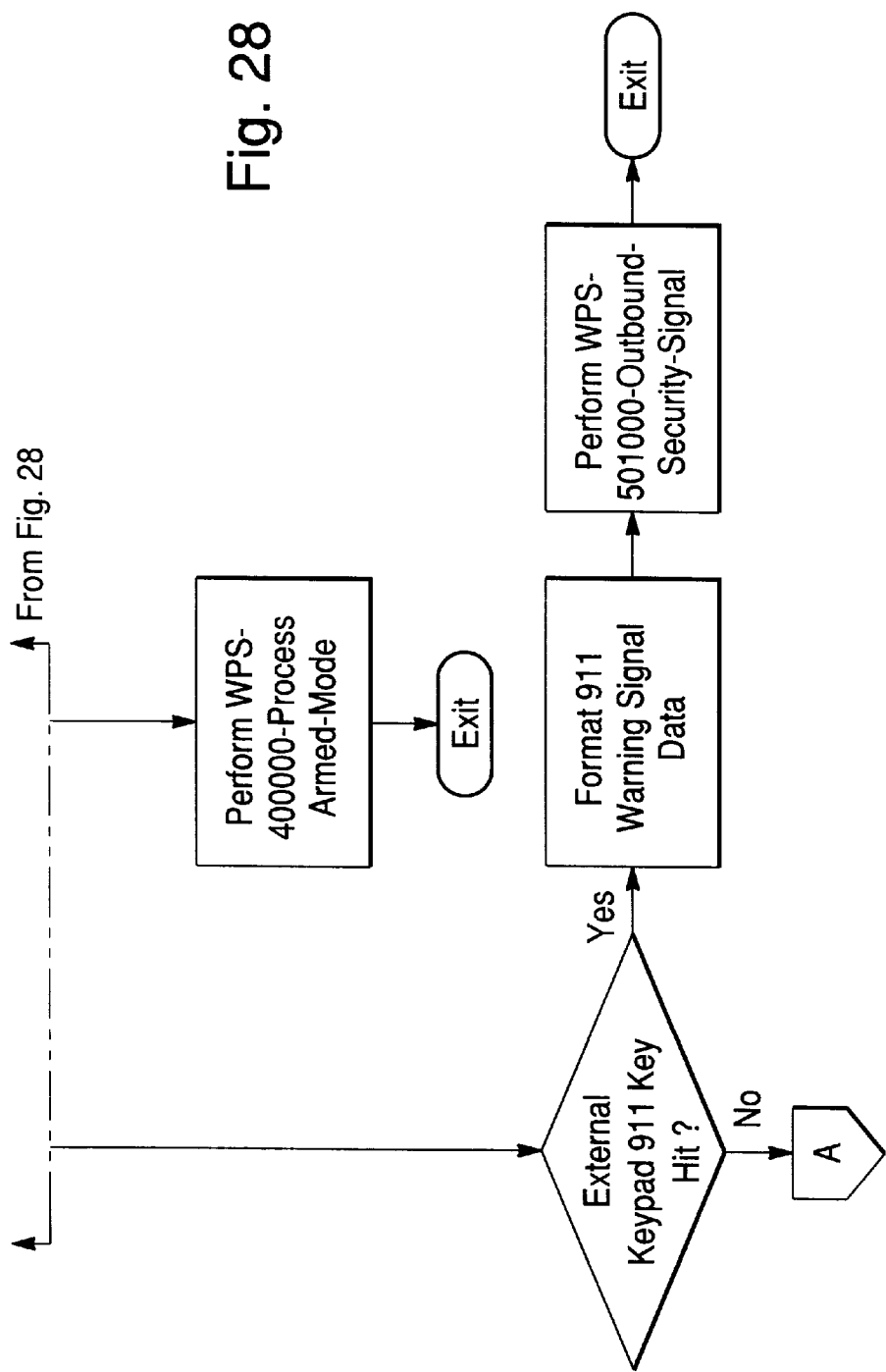
FIG. 28 is a block diagram of the WPS 320000-DETERMINE-MODE routine.
Figure 29:
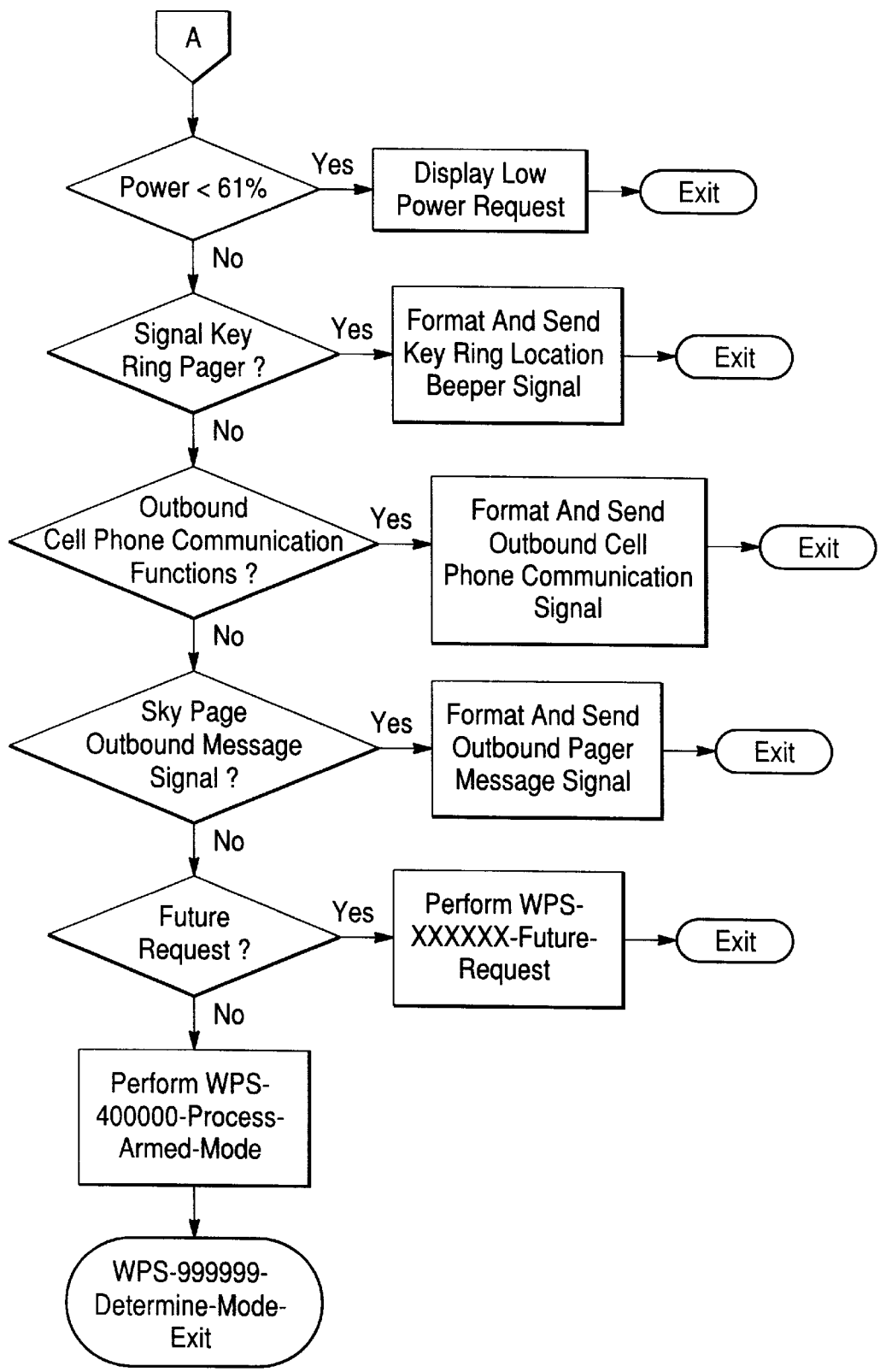
FIG. 29 is a continued block diagram of the WPS 320000-DETERMINE-MODE routine.

The WPS-320000-DETERMINE-MODE routine of FIGS. 28 and 29 is the primary routine that continuously cycles through subordinate logic routines to control the operation and functionality of the wallet protection system 10. If the wallet protection system 10 detects an inbound communication signal, it will perform the WPS-330000-PROCESS-INBOUND-SIGNAL routine of FIG. 30. If the wallet protection system is closed and not in armed mode, it performs the WPS-400000-PROCESS-ARMED-MODE routine of FIG. 35.

Figure 39:
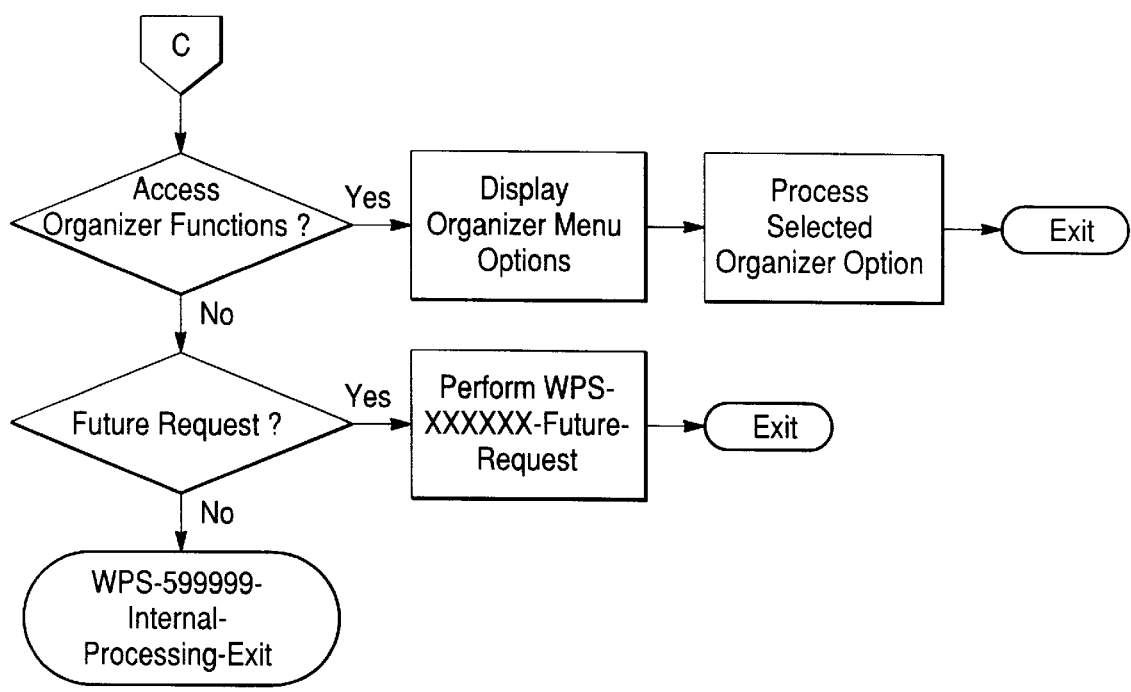
FIG. 39 is a further continued block diagram of the WPS 500000-INTERNAL-PROCESSING routine.

If the wallet protection system 10 is open, it will continuously perform the WPS-500000-INTERNAL-PROCESSING routine of FIG. 39 until the wallet protection system 10 is closed. For external access, the manual key or a valid PIN entry will disarm the device and allow for internal access. The use of the manual key will execute the WPS-450000-DISARM routine of FIG. 36 and pass control to the WPS-500000-INTERNAL-PROCESSING routine of FIG. 39 until the wallet protection system 10 is closed. After the wallet protection system 10 has been closed, processing control will return to the primary WPS-320000-DETERMINE-MODE routine of FIGS. 28 and 29, and the system 10 will reset into armed mode.

The wallet protection system 10 has external function keys for additional telecommunication capabilities and features. These additional capabilities are integrated within the primary WPS-320000-DETERMINE-MODE routine. Listed below is a description of the external function key capabilities.

As described above, an external panic button feature is incorporated in the wallet protection system 10. This feature is essentially a wireless silent 911-alarm signal that utilizes the Global Positioning Satellite (GPS) communication infrastructure for signal tracking. The wallet protection system 10 will transmit the wireless 911-alarm signal to either a telecommunications satellite or a telecommunications network base station. The signal is initiated when the user depresses a defined preset series of combination keystrokes from the recessed panic buttons. The pre-defined keystrokes incorporate an interpretation intelligence code that will give the appropriate law enforcement agencies a general idea of the emergency situation. In addition, this signal can also be initiated by keying in a designated user assigned fake access code. If the fake code is used, the wallet protection system 10 will initiate the tracking signal and function as if a legitimate access code was entered.

Figure 30:
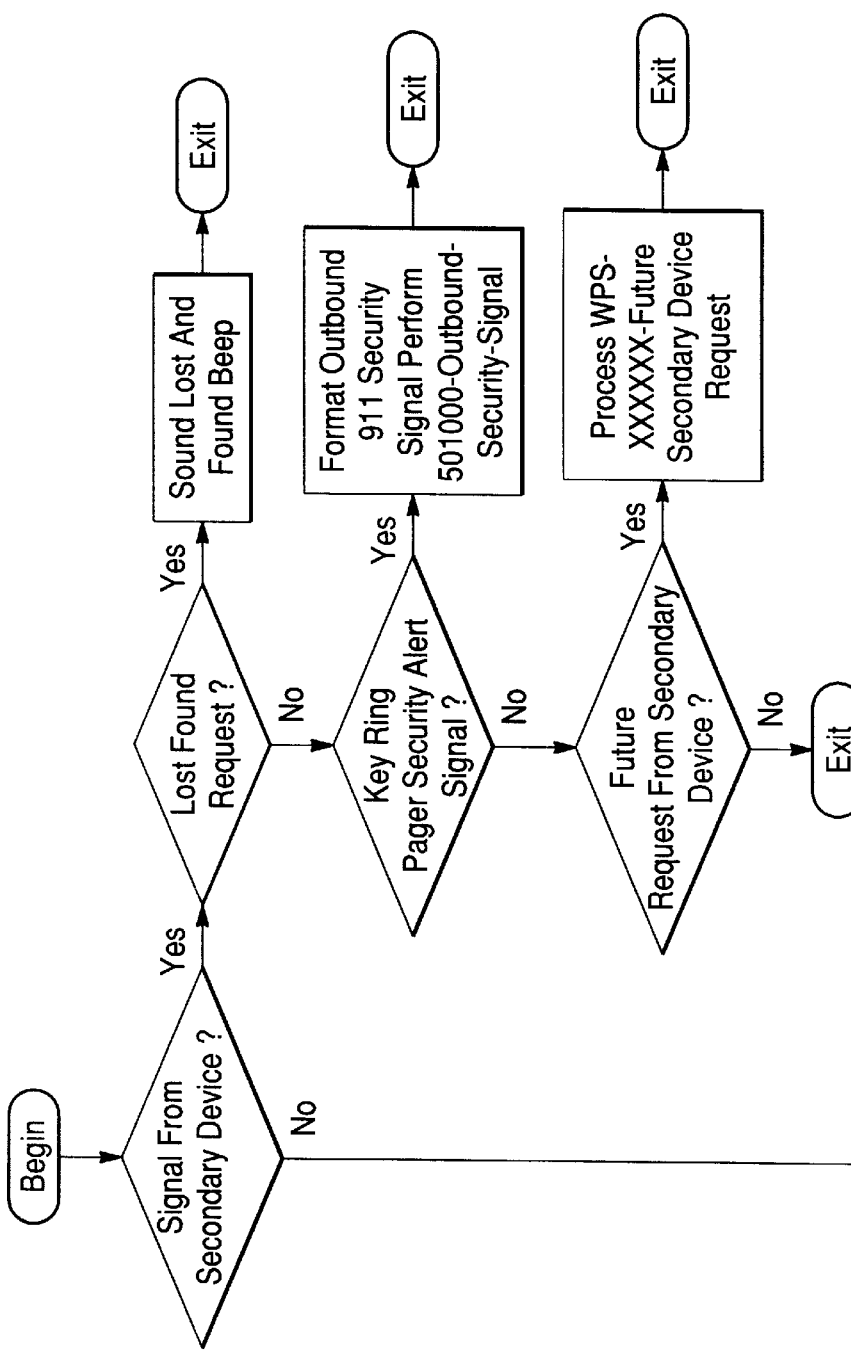
FIG. 30 is a block diagram of the WPS 330000-PROCESS-INBOUND-SIGNAL routine.
Figure 30:
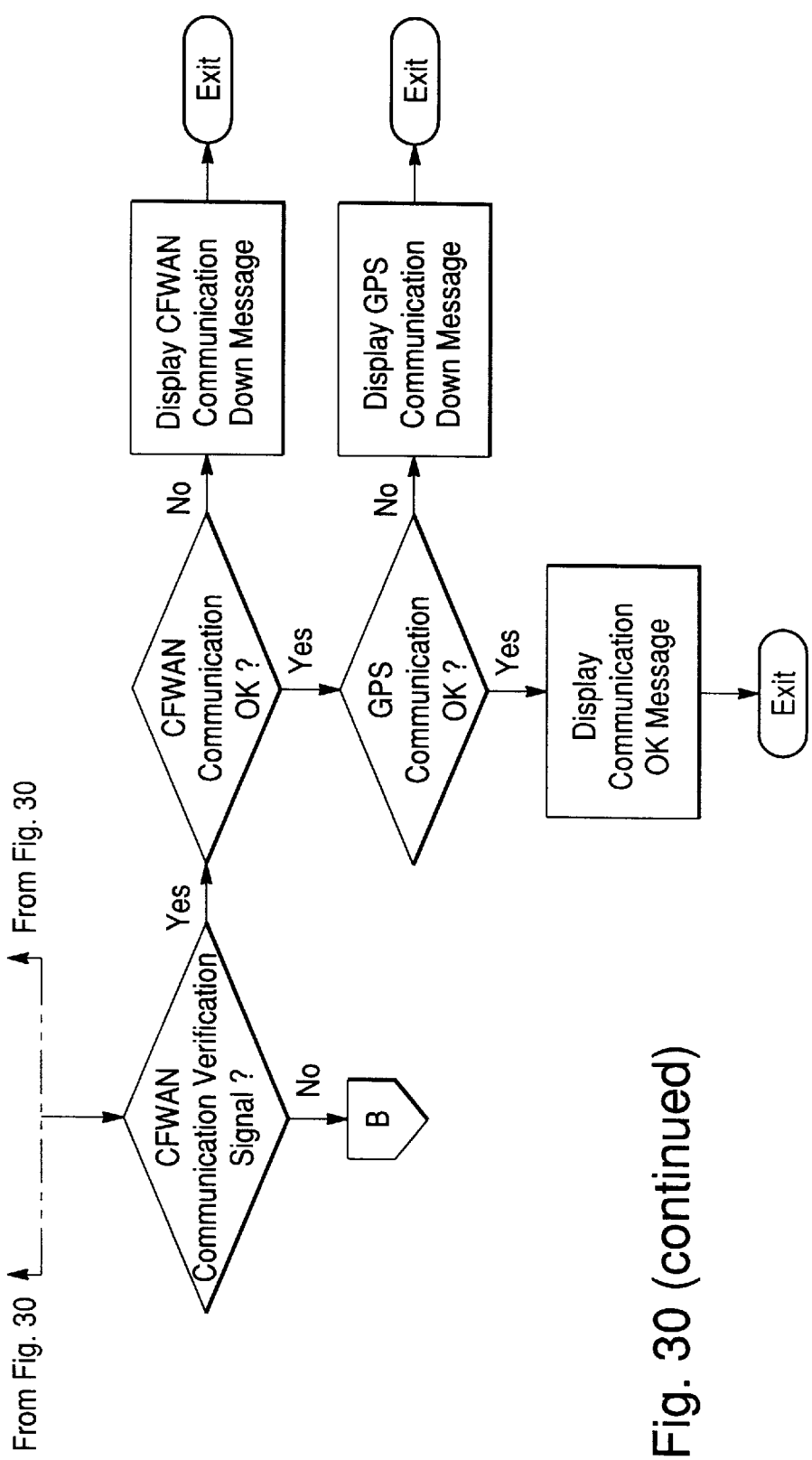
Figure 31:
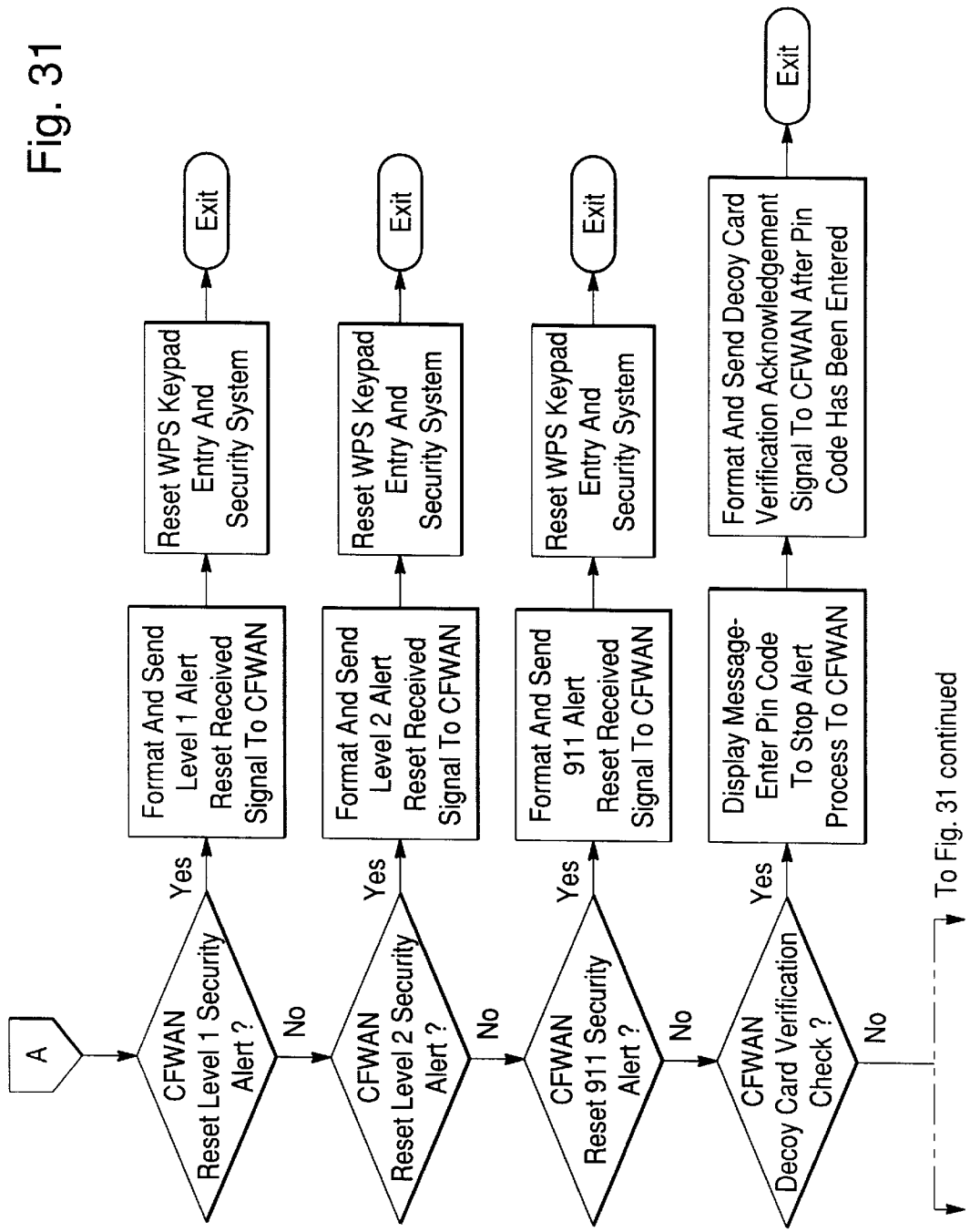
FIG. 31 is a continued block diagram of the WPS 330000-PROCESS-INBOUND-SIGNAL routine.
Figure 31:
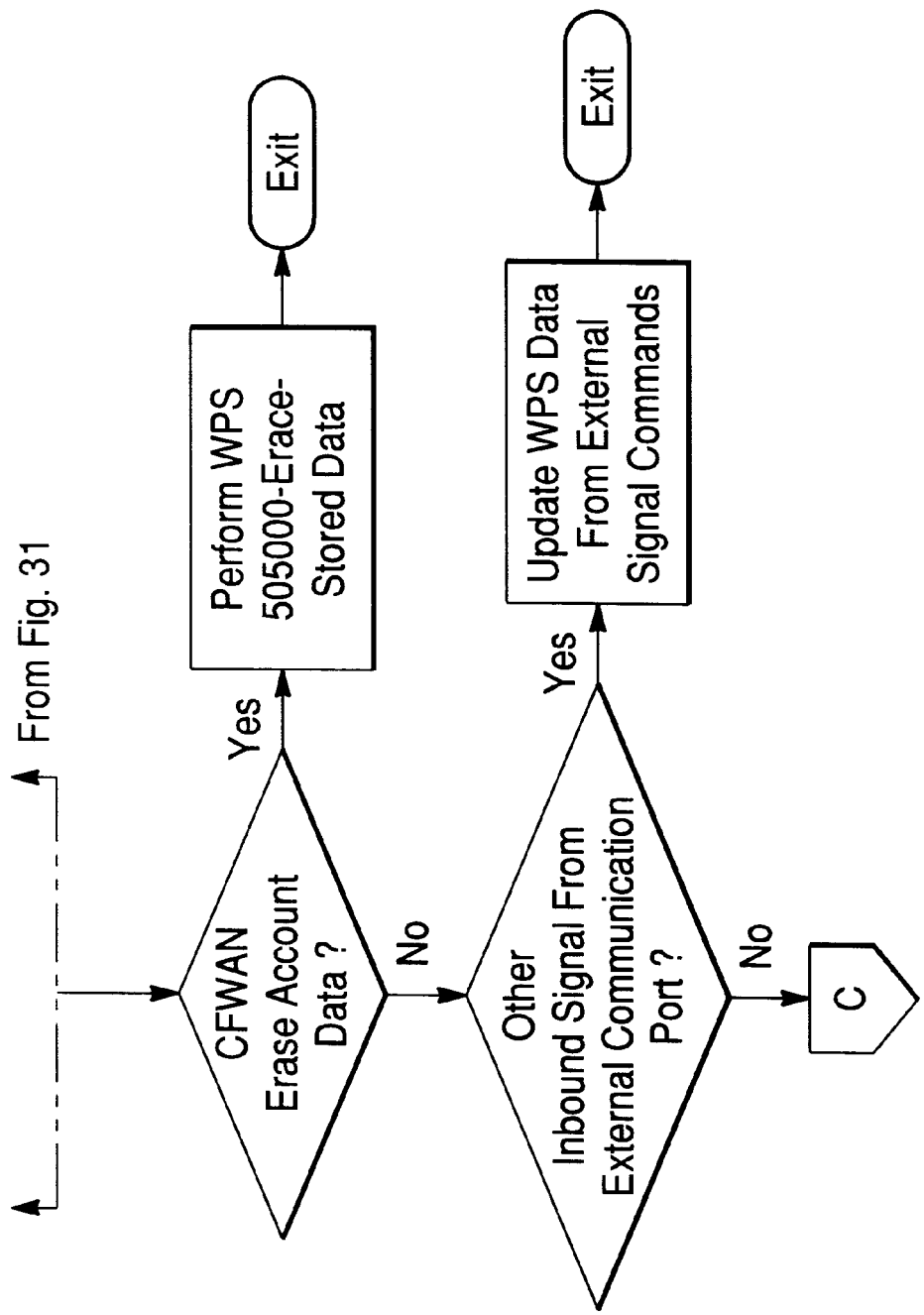
Figure 32:
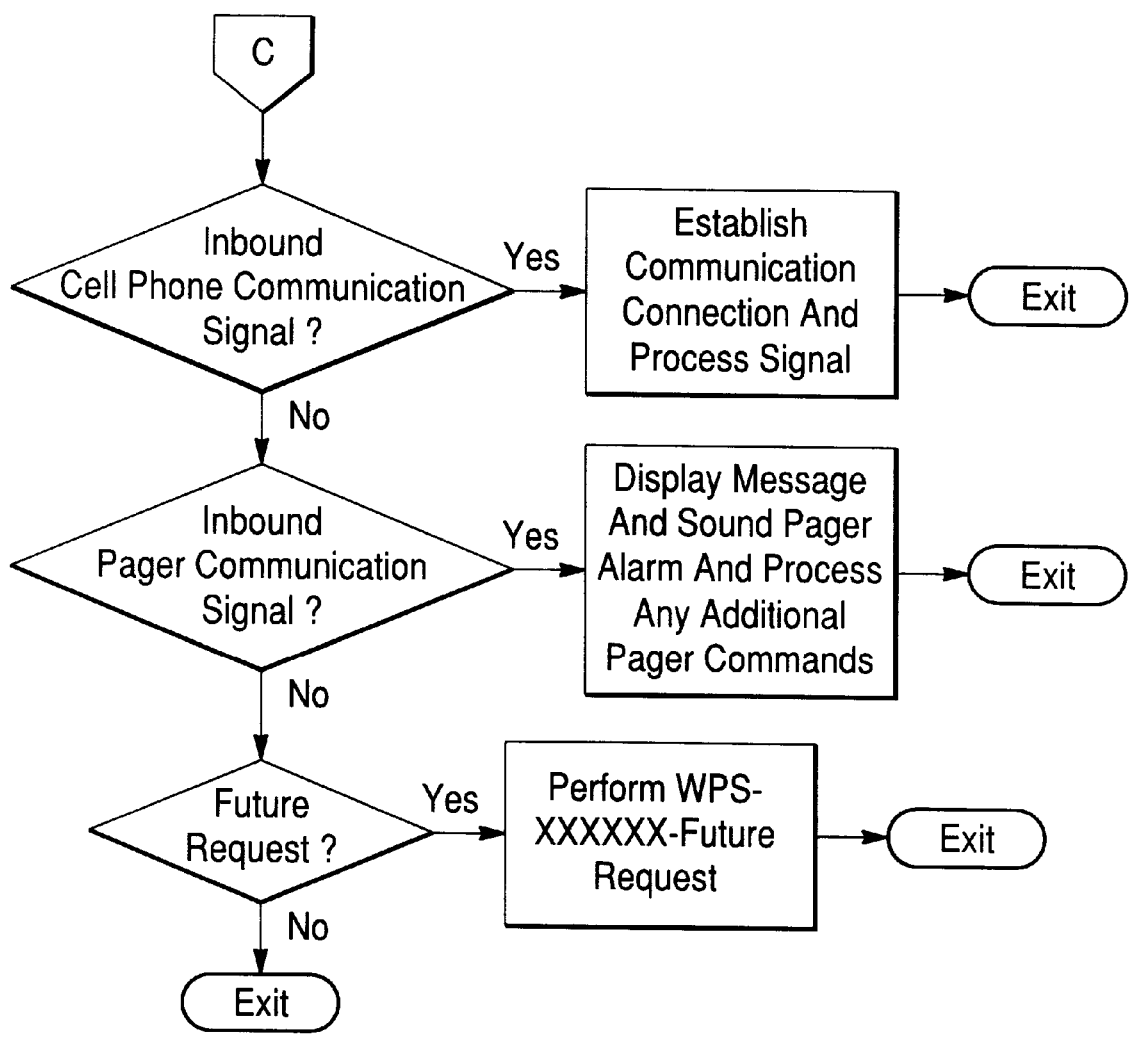
FIG. 32 is a further continued block diagram of the WPS 330000-PROCESS-INBOUND-SIGNAL routine.

The WPS-330000-PROCESS-INBOUND-SIGNAL of FIGS. 30–32 is the primary interactive communication routine to handle all inbound communication requests. This routine enables the wallet protection system 10 to communicate with the CFWAN, WPS-KEYRING-PAGER and other external telecommunication sources.

Figure 33:
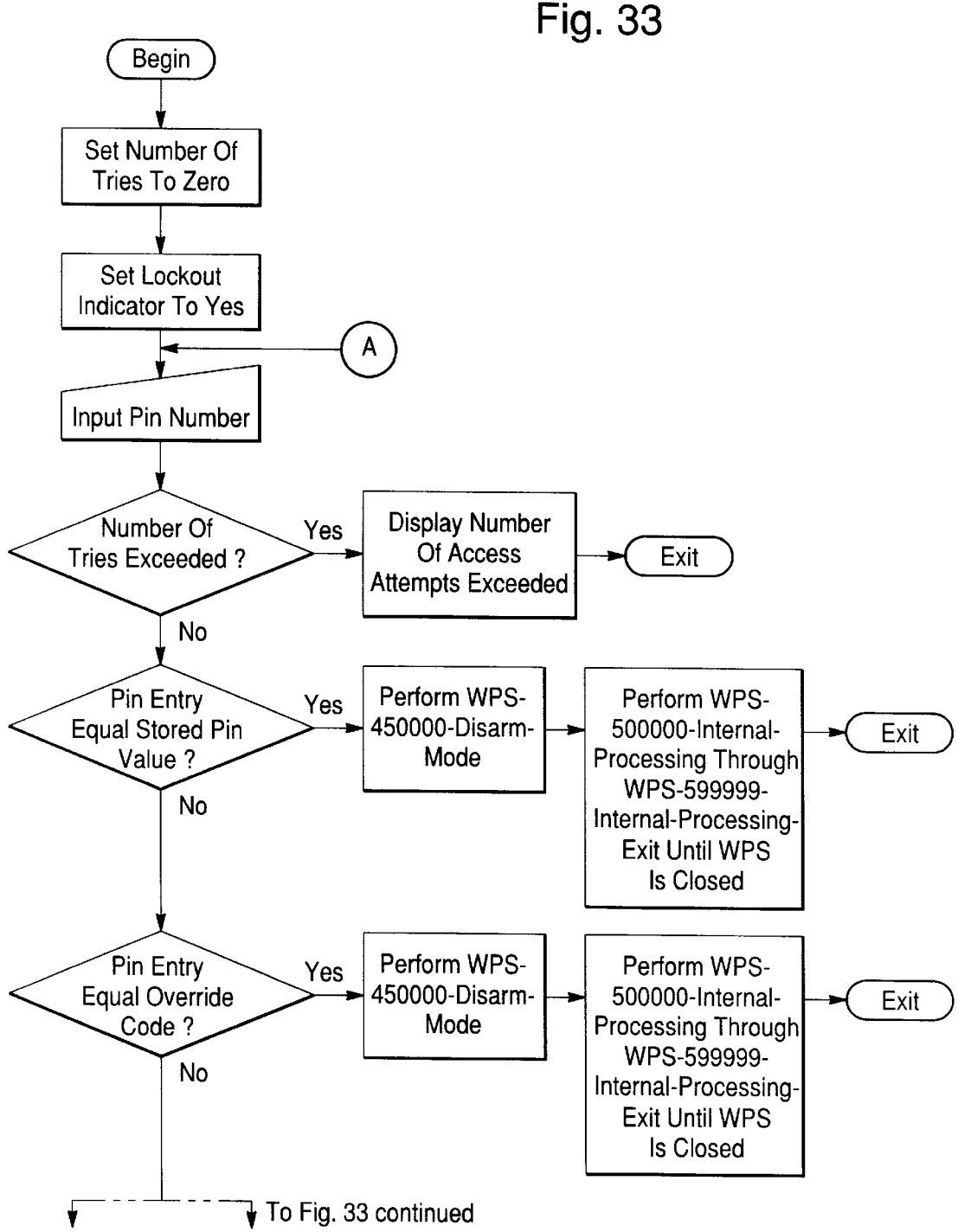
FIG. 33 is a block diagram of the WPS 340000 PROCESS-PIN routine.
Figure 33:
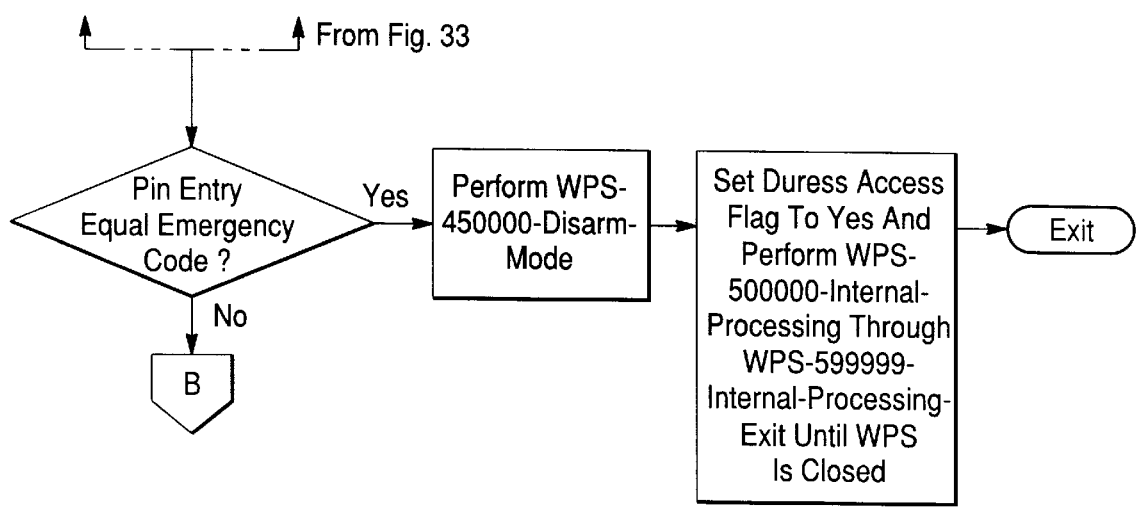
Figure 34:
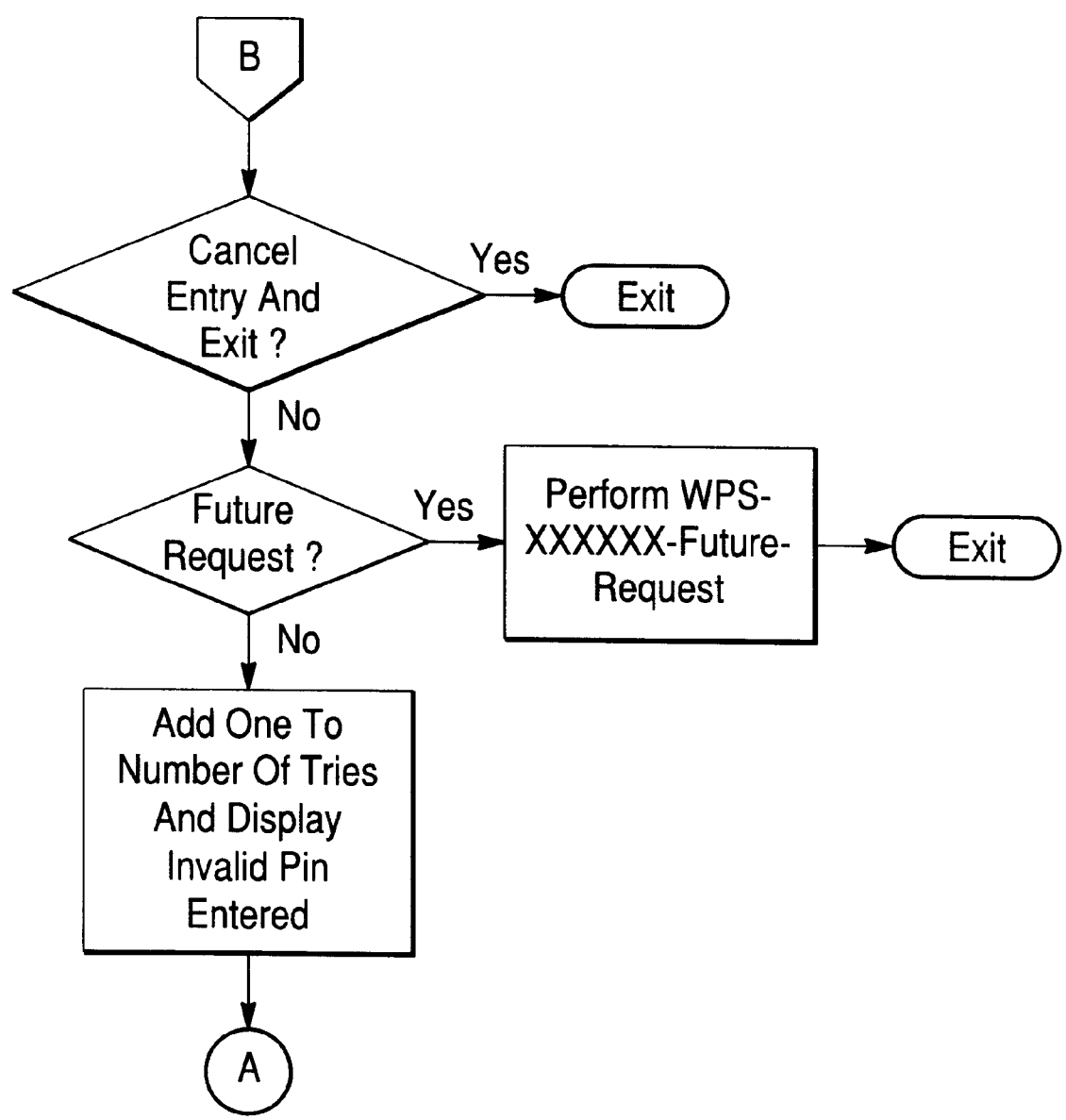
FIG. 34 is a continued block diagram of the WPS 340000 PROCESS-PIN routine.

The WPS-340000-PROCESS-PIN routine of FIGS. 33 and 34 controls internal access by invalidating the security access entry codes. The routine allows the user a preset number of tries to enter a valid entry code. After inputting the appropriate security code, the wallet protection system 10 will open and the individual will have access to the contents contained within their wallet protection system 10. If the number of tries has been exceeded, the routine resets itself and returns processing control to the WPS-320000-DETERMINE-MODE.

Additionally, the routine prompts the user to input their personal identification number (PIN). After the PIN has been entered, the routine will process the PIN data. If the number of tries has been exceeded, the routine will alert the user and reset itself and pass processing control over the WPS-320000-DETERMINE-MODE routine of FIGS. 28 and 29. If a valid PIN entry has been entered, the routine will perform the WPS-450000-DISARM-MODE routine of FIG. 36 and pass processing control to the WPS-500000-INTERNAL-PROCESSING routine of FIGS. 37–39.

If the security alert PIN entry has been entered, the routine will set a special duress access flag to 'yes' and perform the WPS-450000-DISARM-MODE and pass control to the WPS-500000-INTERNAL-PROCESSING routine. The duress access flag will silently set off the security processing alarm and still allow the user access to their device as if no emergency situation has occurred. If the cancel entry option is used, the routine will reset itself and pass control to the WPS-320000-DETERMINE-MODE routine. If an invalid entry has been entered, the routine will add 1 to the number of access tries to notify the user to input a valid access code.

Figure 36:
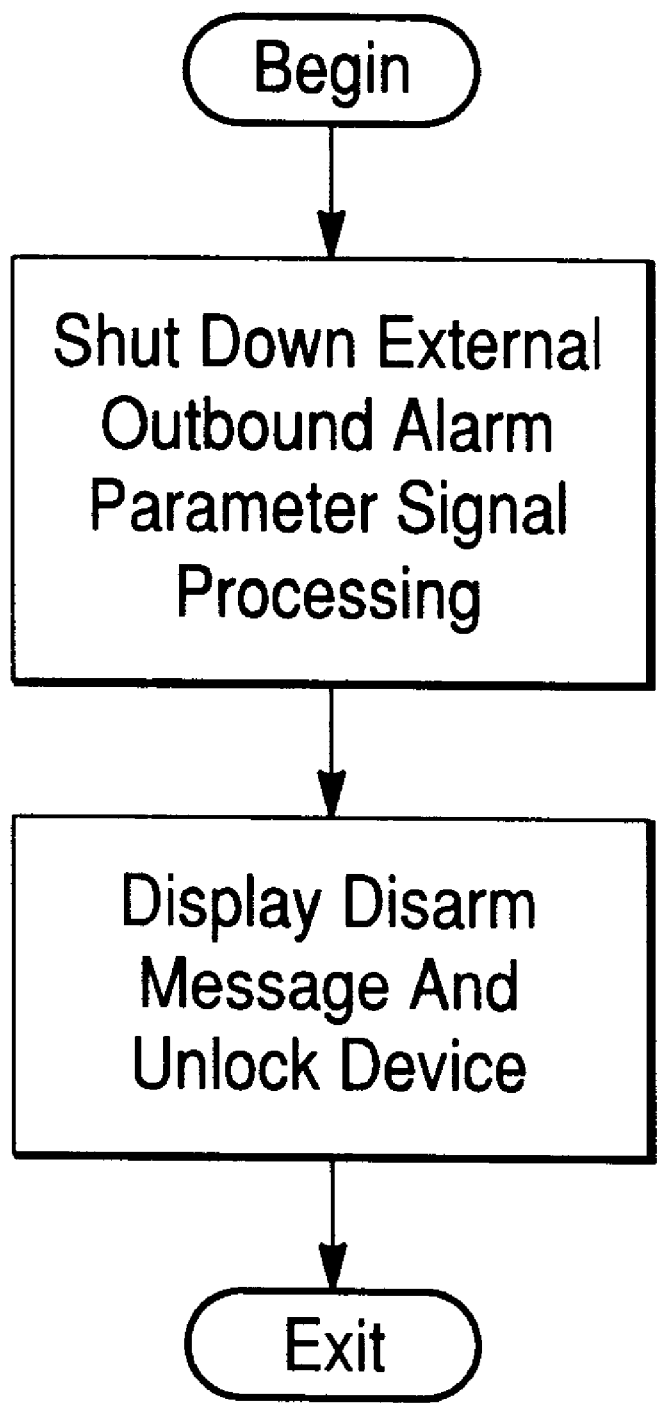
FIG. 36 is a block diagram of the WPS 450000-DISARM-MODE routine.
Figure 37:
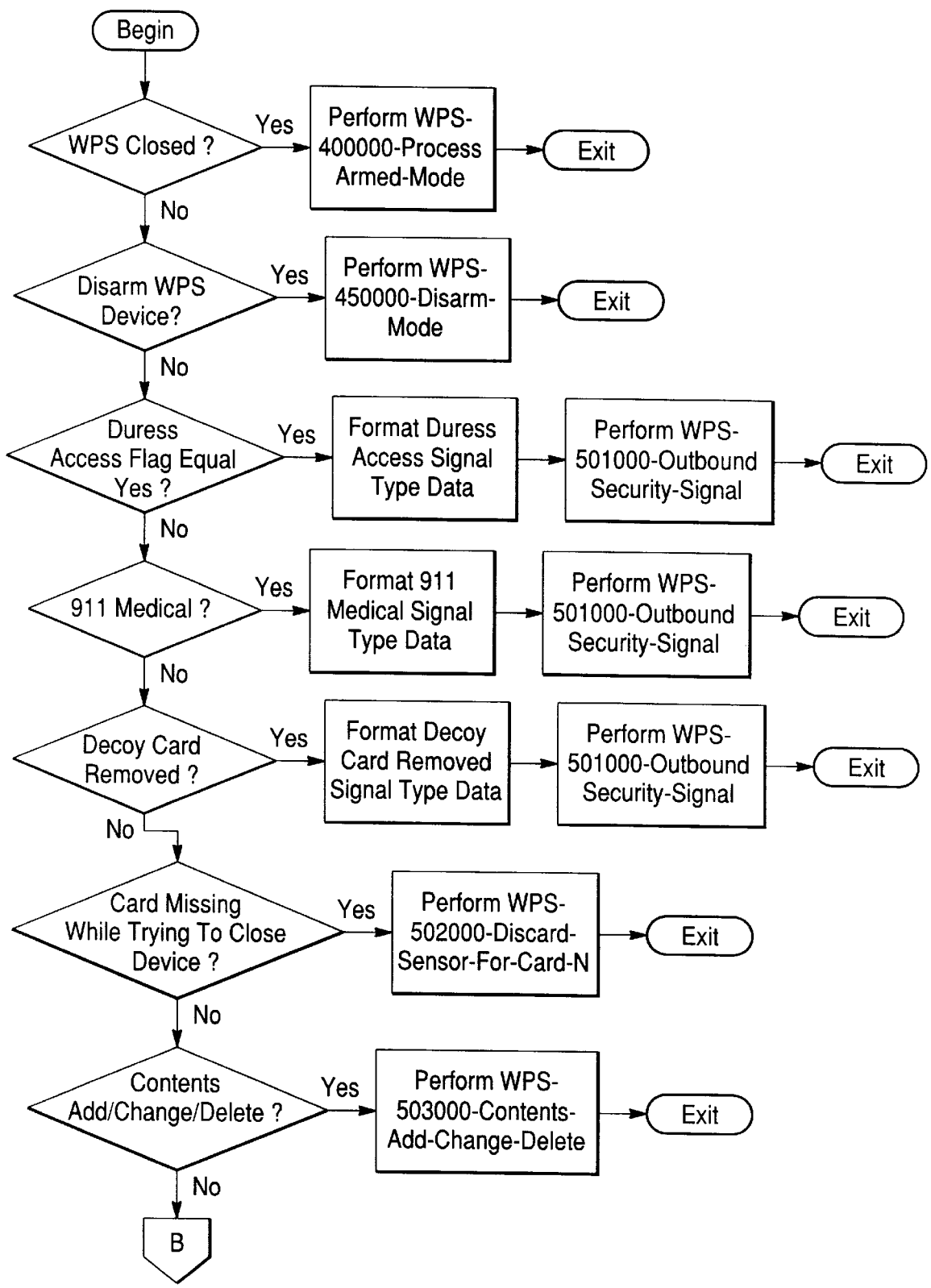
FIG. 37 is a block diagram of the WPS 500000-INTERNAL-PROCESSING routine.
Figure 38:
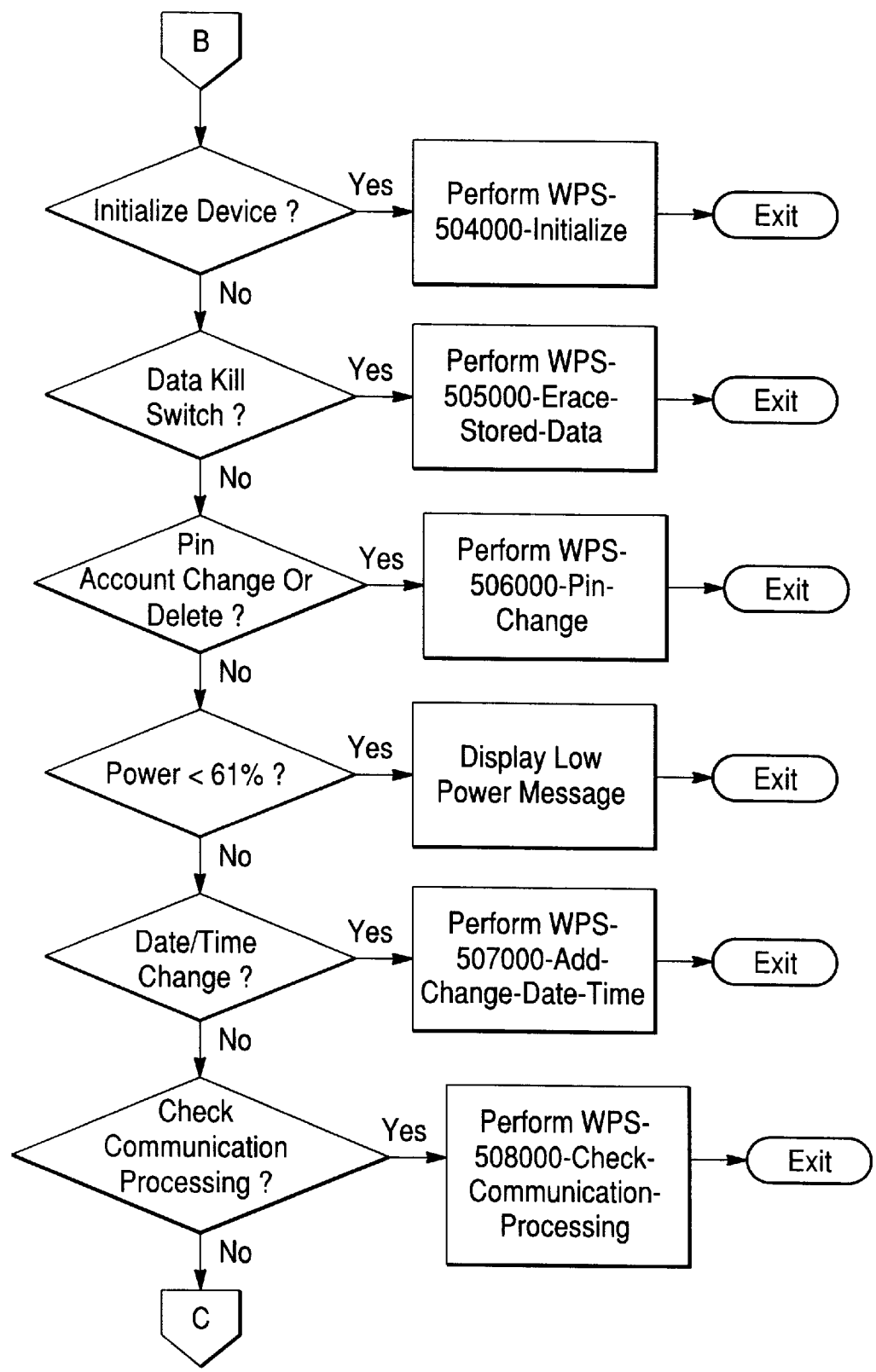
FIG. 38 is a continued block diagram of the WPS 500000-INTERNAL-PROCESSING routine.

The WPS-450000-DISARM-MODE routine of FIG. 36 is designed to deactivate the protective external security parameters of the wallet protection system 10. This will enable the device to be opened without sending an external access violation security signal and allow the user to have access to the contents within the wallet protection system 10 device. It should be noted that even though the external security parameter has been deactivated, the internal security parameters are still active and controlled by the WPS-500000-INTERNAL-PROCESSING routine of FIGS. 37 and 39.

The WPS-500000-INTERNAL-PROCESSING routine is the primary routine that continuously cycles through subordinate logic routines to control the operation and functionality of the wallet protection system 10. Some of these features are manually initiated by the internal menu options or function keys within the wallet protection system 10 device. The definitions of the wallet protection system 10 operational routines are listed below.

Figure 35:
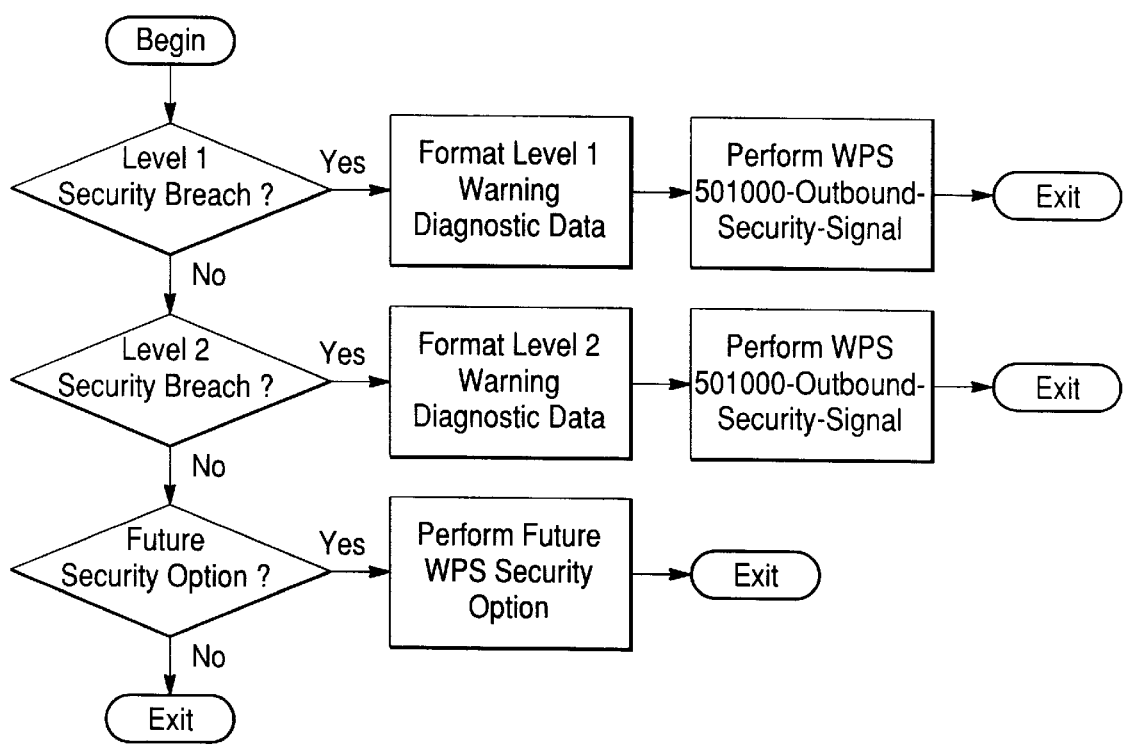
FIG. 35 is a block diagram of the WPS 400000-PROCESS-ARMED-MODE routine.

If the wallet protection system 10 device has been closed, the WPS-400000-PROCESS-ARMED-MODE routine of FIG. 35 is performed and the routine returns control to the WPS-320000-DETERMINE-MODE routine. The external disarm function can be initiated from the menu options internally within the wallet protection system 10. This option is designed as a preventative step to control any security signal misfiring due to any unforeseen wallet protection system 10 device opening and closing problems.

Figure 40:
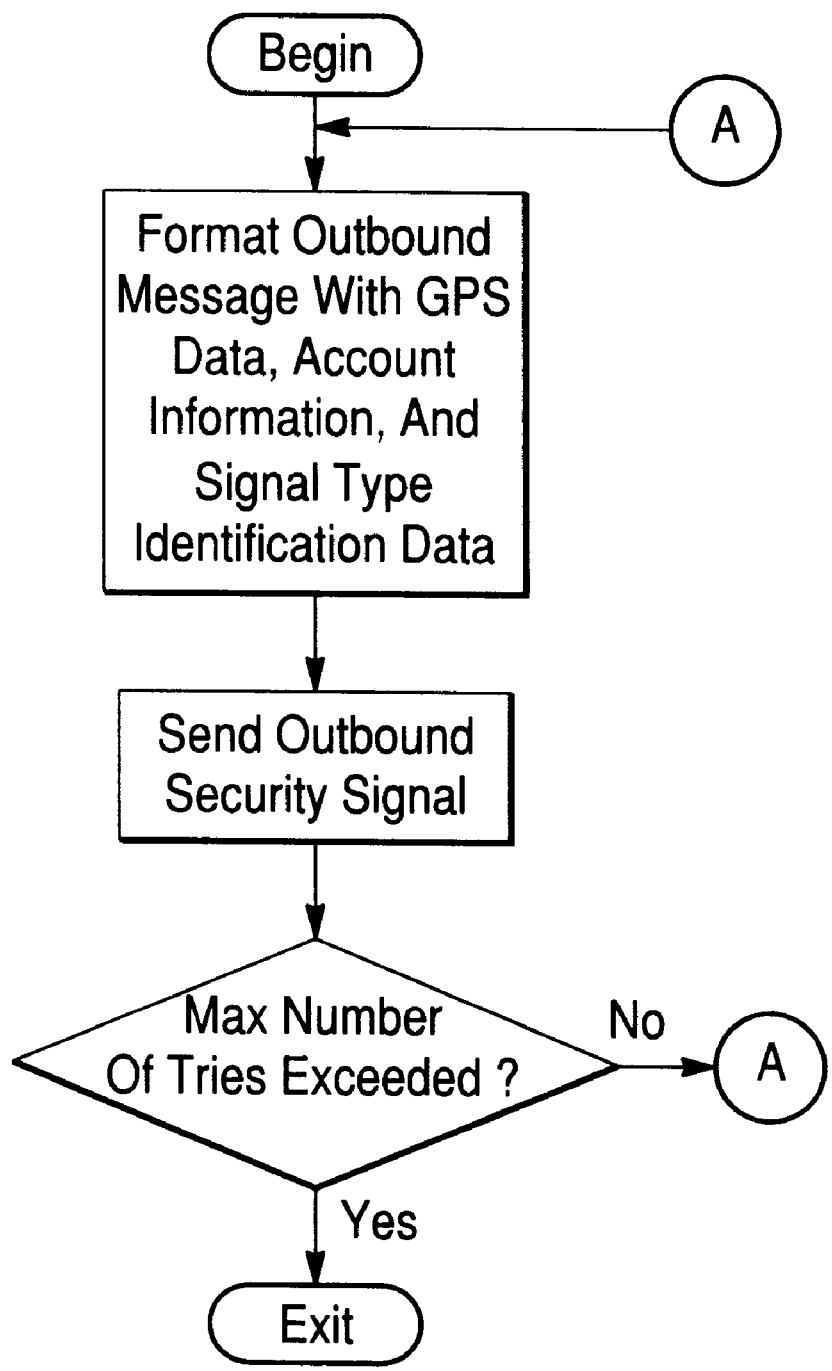
FIG. 40 is a block diagram of the WPS 501000-OUTBOUND-SECURITY-SIGNAL routine.
Figure 41:
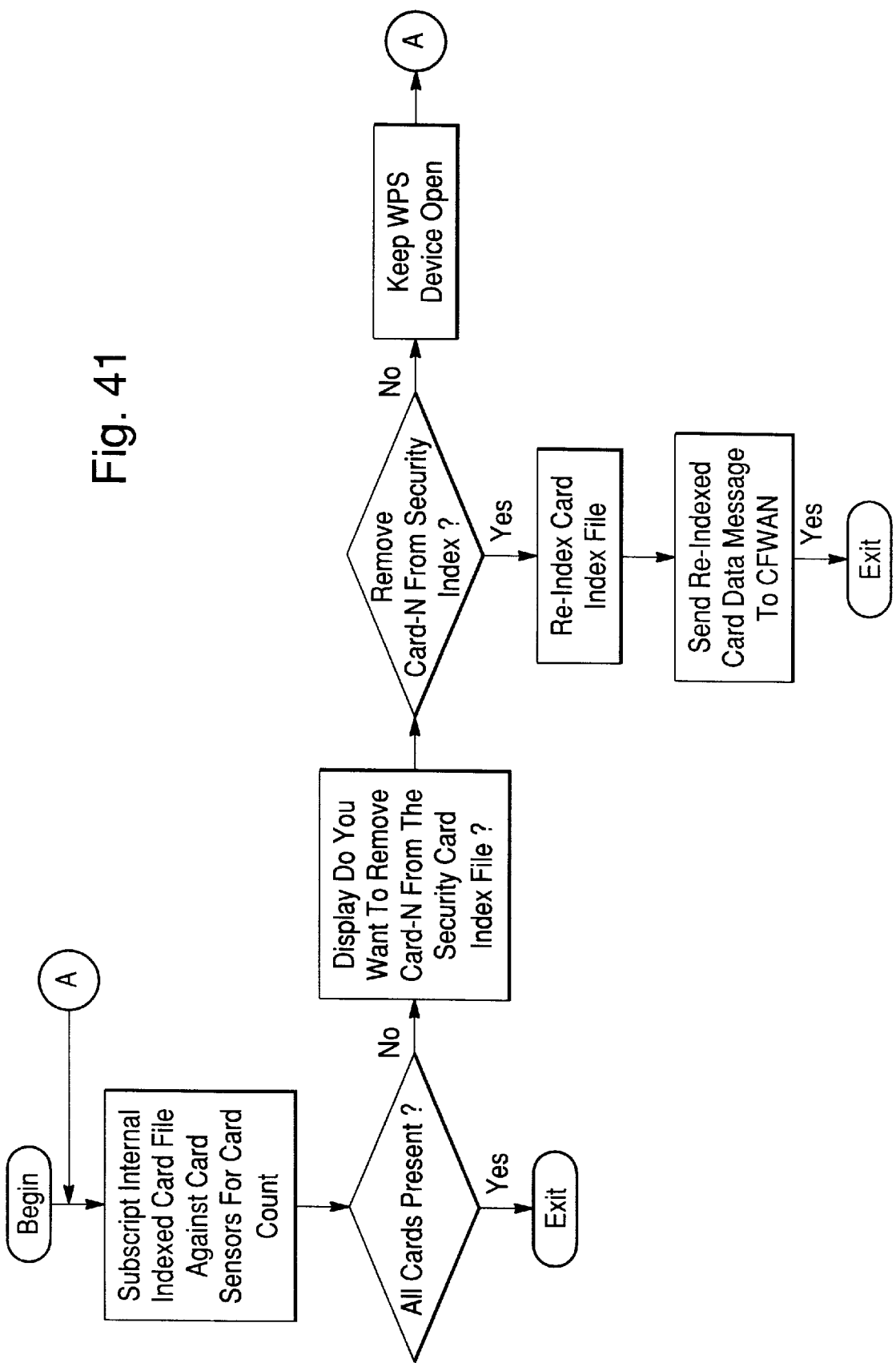
FIG. 41 is a block diagram of the WPS 502000-DISCARD-SENSOR-FOR-CARD-N routine.

If the duress access flag has been detected, the routine will format a duress access signal and execute the WPS-501000-OUTBOUND-SECURITY-SIGNAL routine of FIG. 40. It should be noted that the wallet protection system 10 device will function normally while sending this duress signal to the CFWAN.

If the send 911 medical signal option has been initiated, the routine will formal a 911 medical signal and execute the WPS-501000-OUTBOUND-SECURITY-SIGNAL routine of FIG. 40. It should be noted that the wallet protection system 10 device will function normally while sending this 911 medical signal to the CFWAN.

If an unauthorized individual was able to gain access to an open wallet protection system 10, removal of a decoy card will instruct the routine to format a decoy card removal signal and execute the WPS-501000-OUTBOUND-SECURITY-SIGNAL routine of FIG. 40. It should be noted that the wallet protection system 10 device will function normally while sending this decoy card removal signal to the CFWAN. In addition, certain interactive communication security processing protocols will be initiated by both the CFWAN and the wallet protection system 10 to check if the decoy card was removed by accident. If the card has been removed by accident, features within the interactive communication security processing protocols will allow the user to return the decoy card back to its designated slot and discontinue any further CFWAN and wallet protection system 10 security activities.

As described above, the wallet protection system 10 credit card holder 130 contains contact sensors 140 that sense the presence or absence of a credit card. If the credit card is not returned to its designated slot within the wallet protection system 10 and the user tries to close the wallet protection system 10, the wallet protection system 10 will alert the user that a card is missing by executing the WPS-502000-DISCARD-SENSOR-FOR-CARD-N routine of FIG. 41. The user will either put the card back in the appropriate card holder slot to close the device, or the user will key in an override code using the external alphanumeric keypad to close the device.

Figure 42:
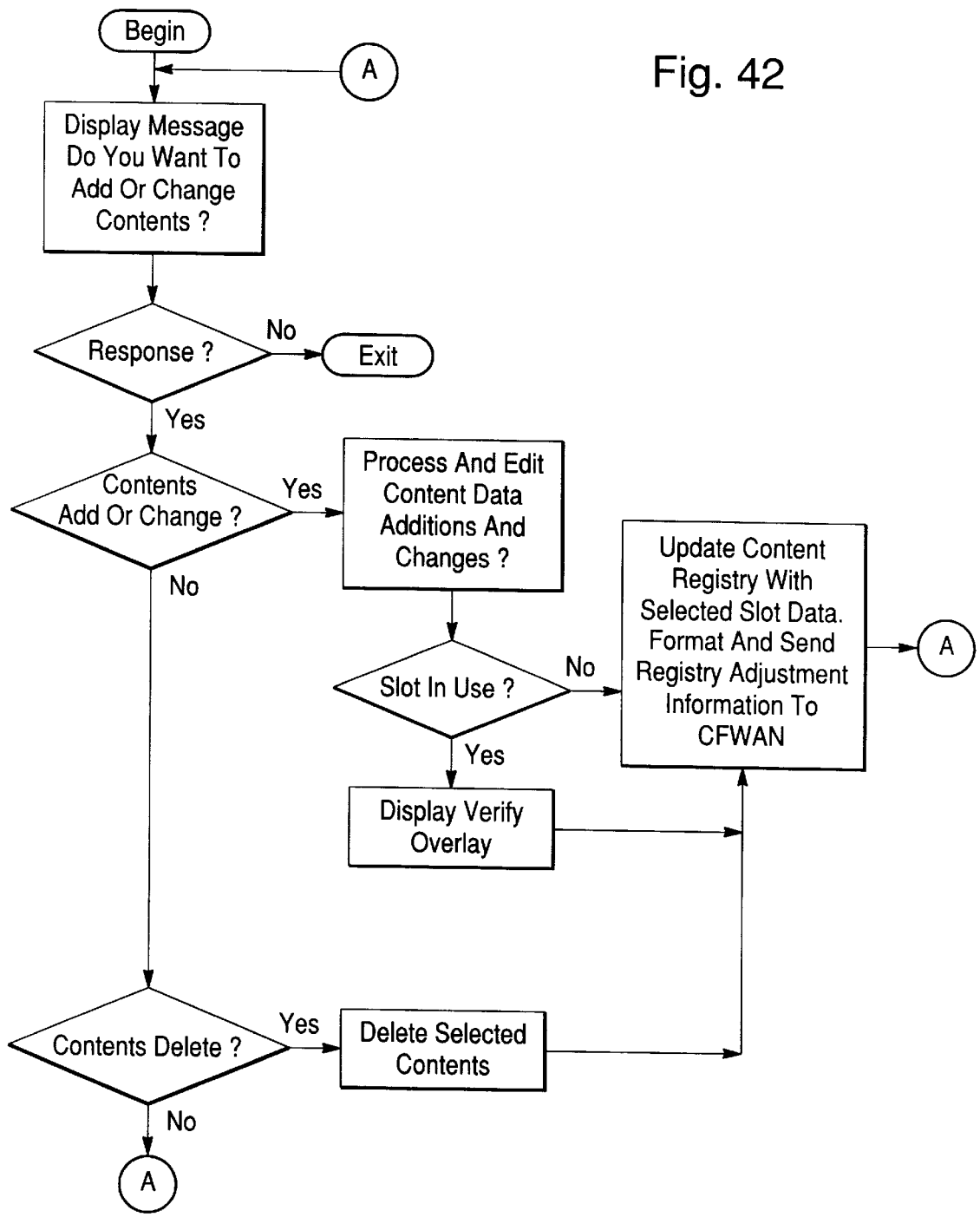
FIG. 42 is a block diagram of the WPS 503000-CONTENTS-ADD-CHANGE-DELETE routine.
Figure 43:
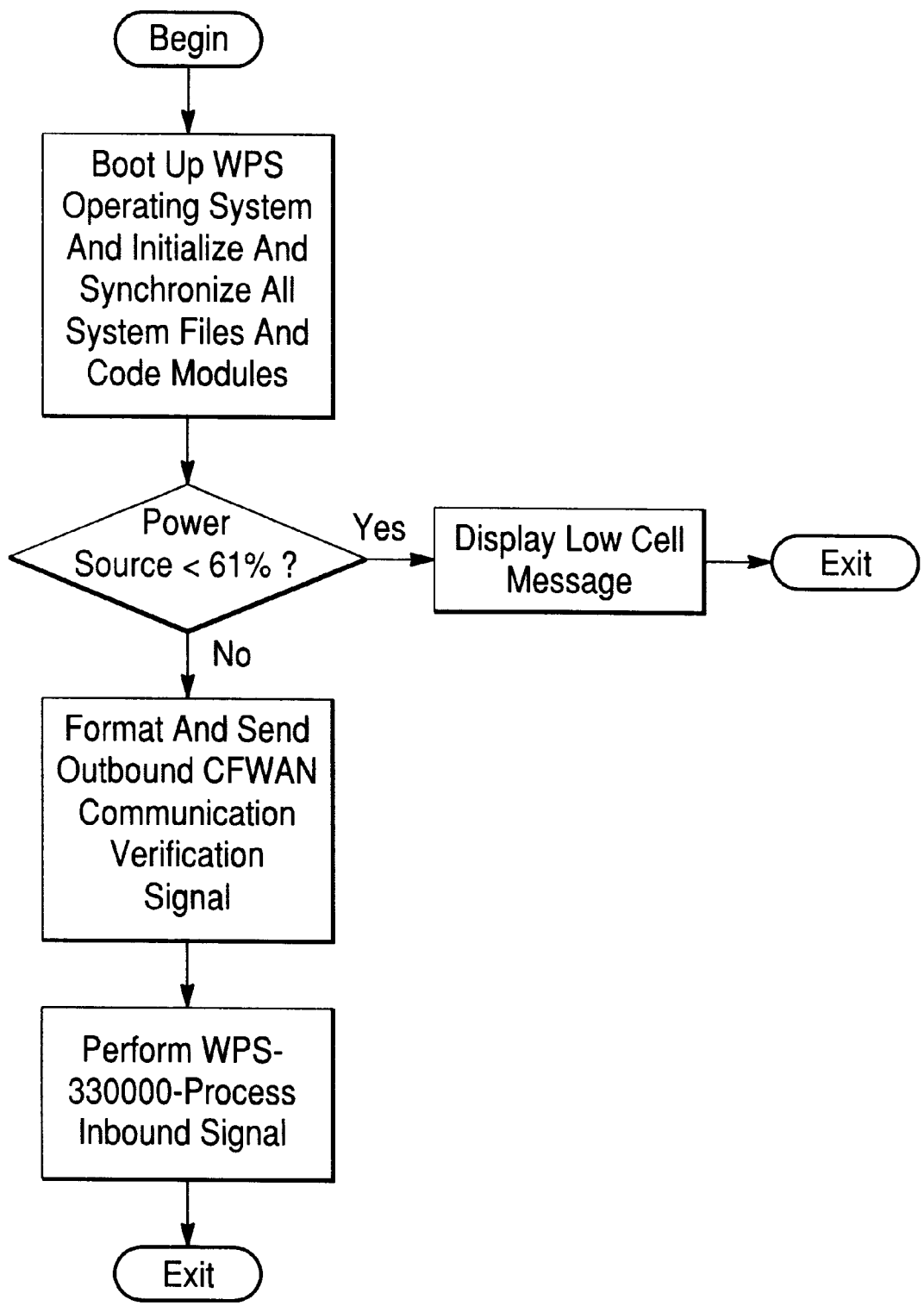
FIG. 43 is a block diagram of the WPS 504000-INITIALIZE routine.

If the contents add/change/delete function is initiated, the system will perform the WPS-503000-CONTENTS-ADD-CHANGE-DELETE routine of FIG. 42. This will allow the user the ability to reorganize their content registry at their discretion. If the initialize device function is initiated, the system will perform the WPS-504000-INITIALIZE routine of FIG. 43 to reinitialize the communication and operational properties of the wallet protection system 10.

Figure 44:
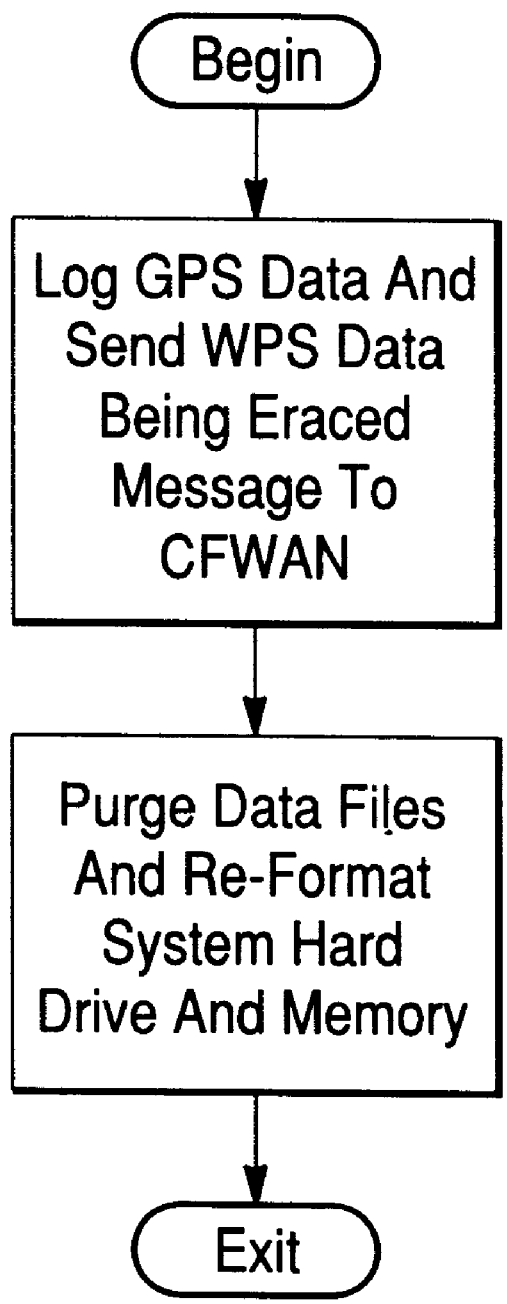
FIG. 44 is a block diagram of the WPS 505000-ERACE-STORED-DATE routine.
Figure 45:
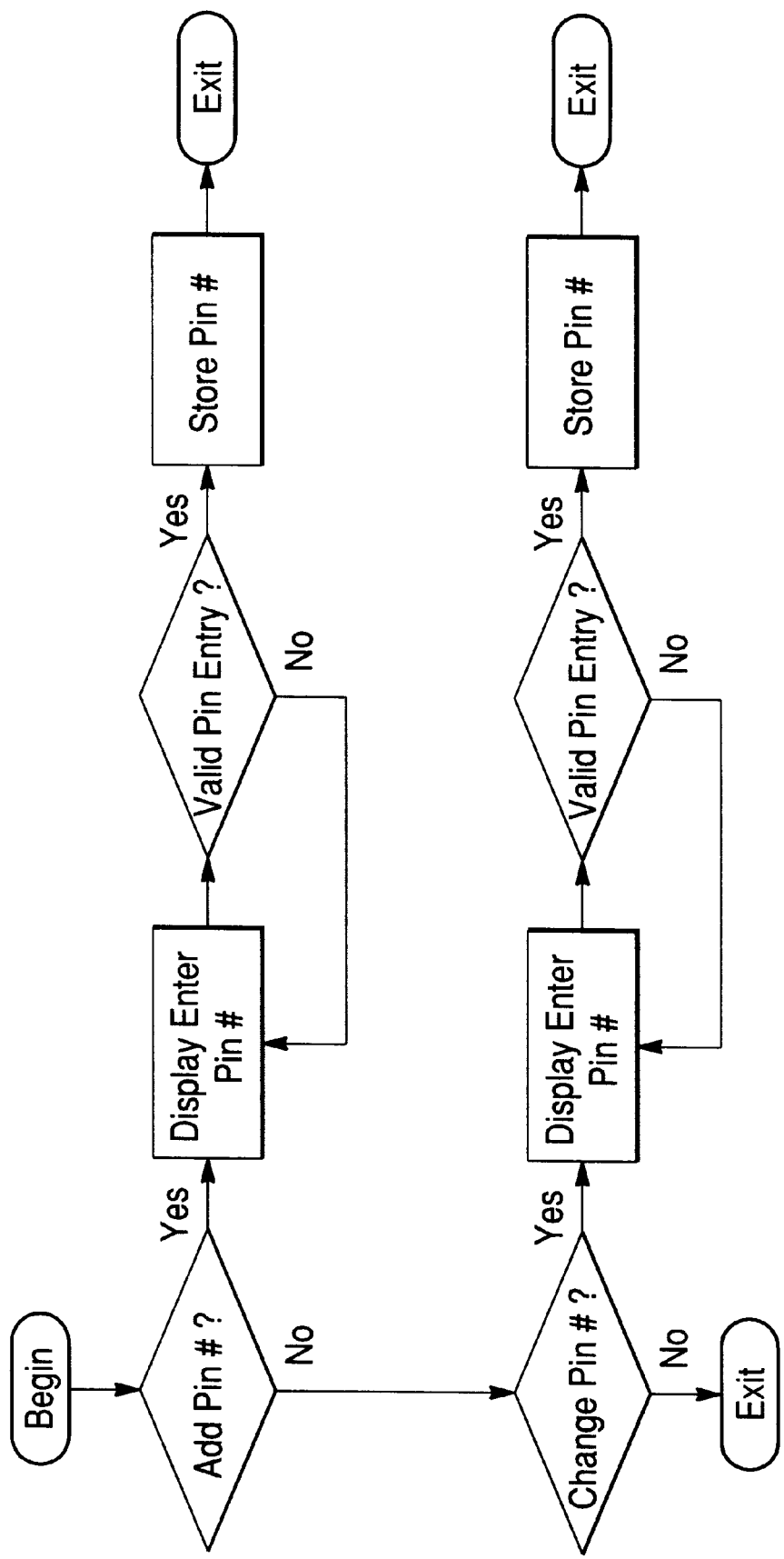
FIG. 45 is a block diagram of the WPS 506000-PIN-CHANGE routine.
Figure 46:
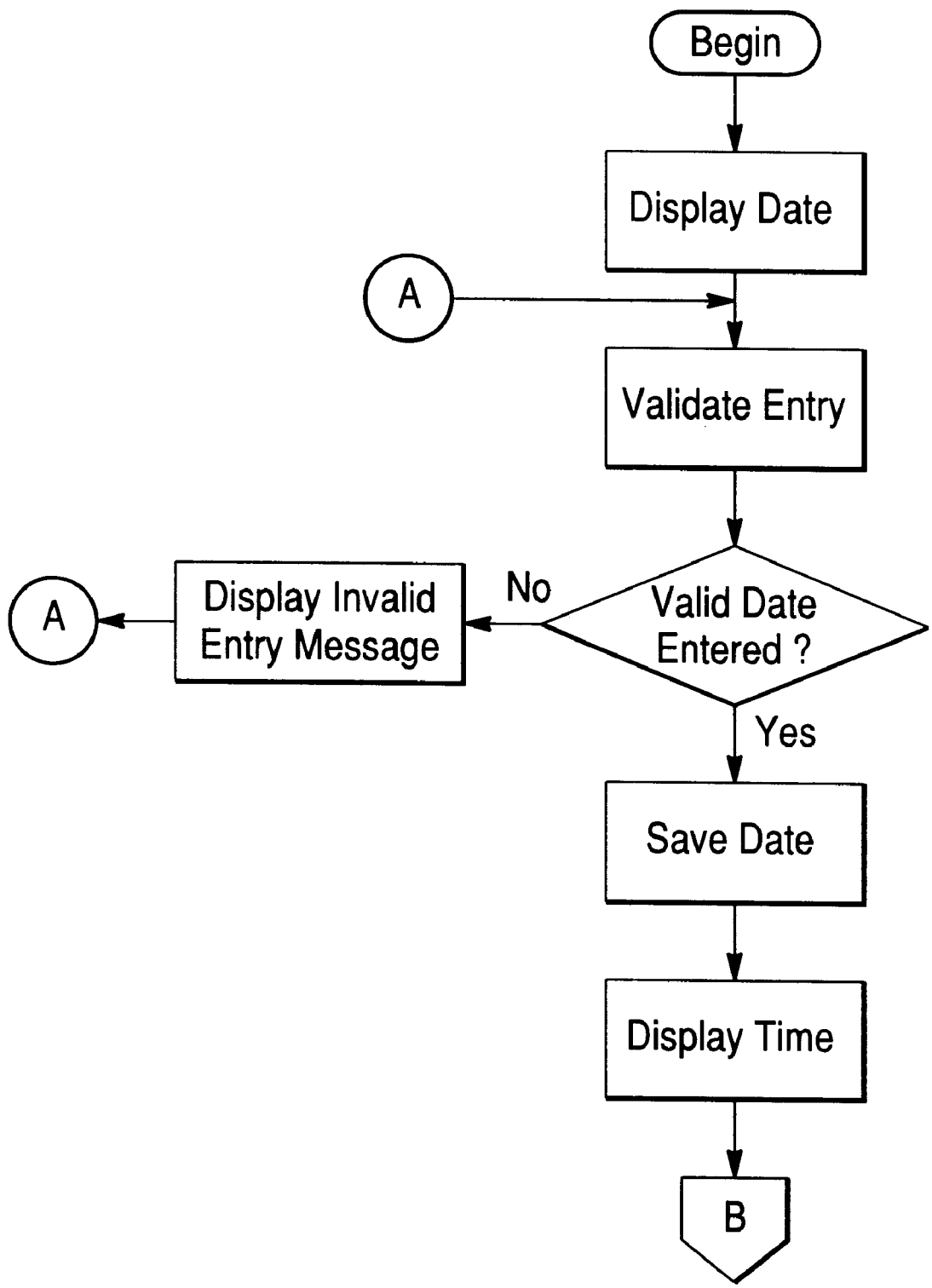
FIG. 46 is a block diagram of the WPS 407000-ADD-CHANGE-DATE-TIME routine.
Figure 47:
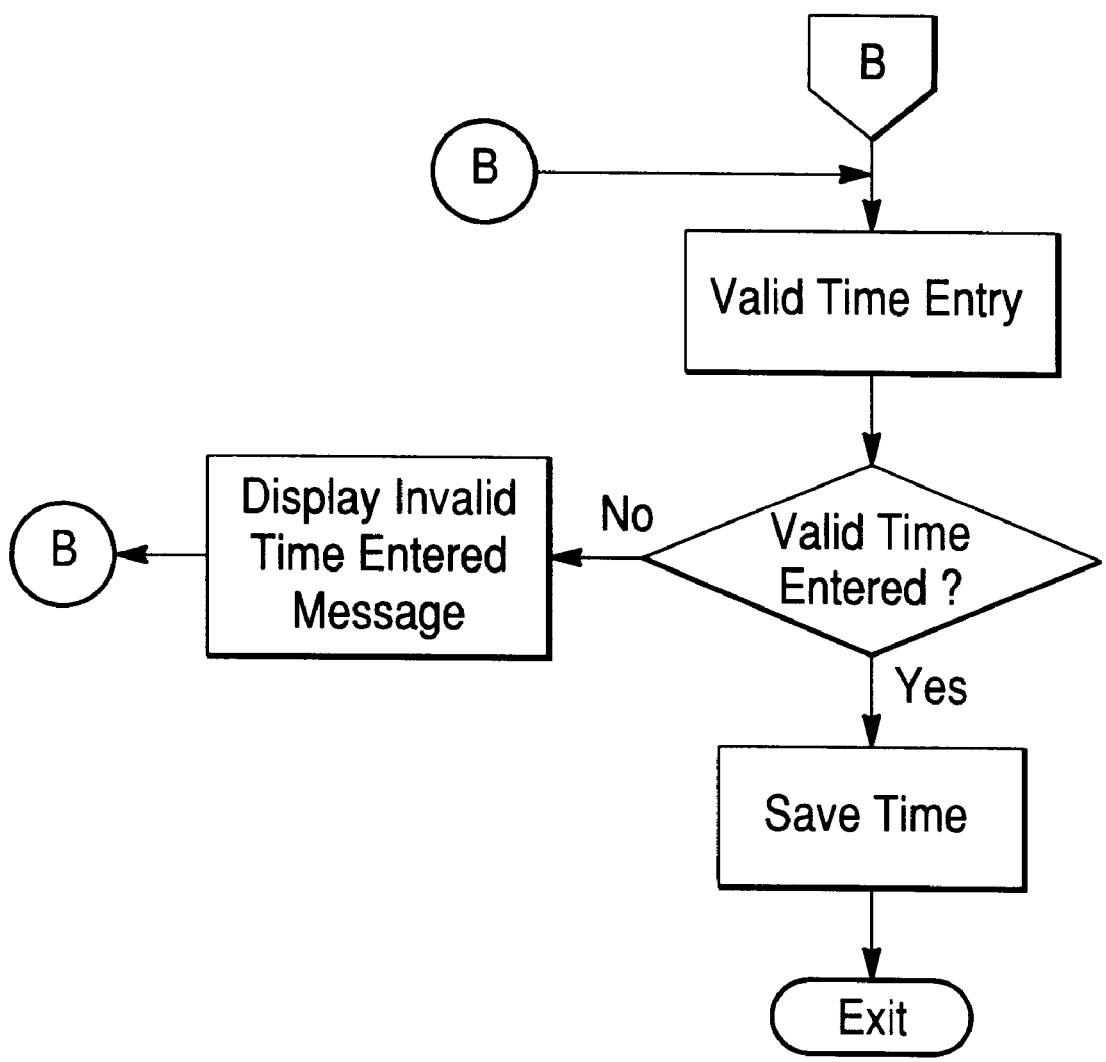
FIG. 47 is a continued block diagram of the WPS 507000-ADD-DATE-TIME routine.

If the data kill switch function is initiated, the system will perform the WPS-505000-ERACE-STORED-DATA routine of FIG. 44 to send a security signal to the CFWAN and destroy the data files contained within the wallet protection system 10. This is a special feature of data protection that can be activated by both external and internal security processing controls. If the change PIN function is initiated, the system will perform the WPS-506000-PIN-CHANGE routine of FIG. 45. This will allow the user to modify their PIN access codes at their discretion. Similarly, if the change date/time function is initiated, the system will perform the WPS-507000-ADD-CHANGE-DATE-TIME routine of FIGS. 46 and 47.

Figure 48:
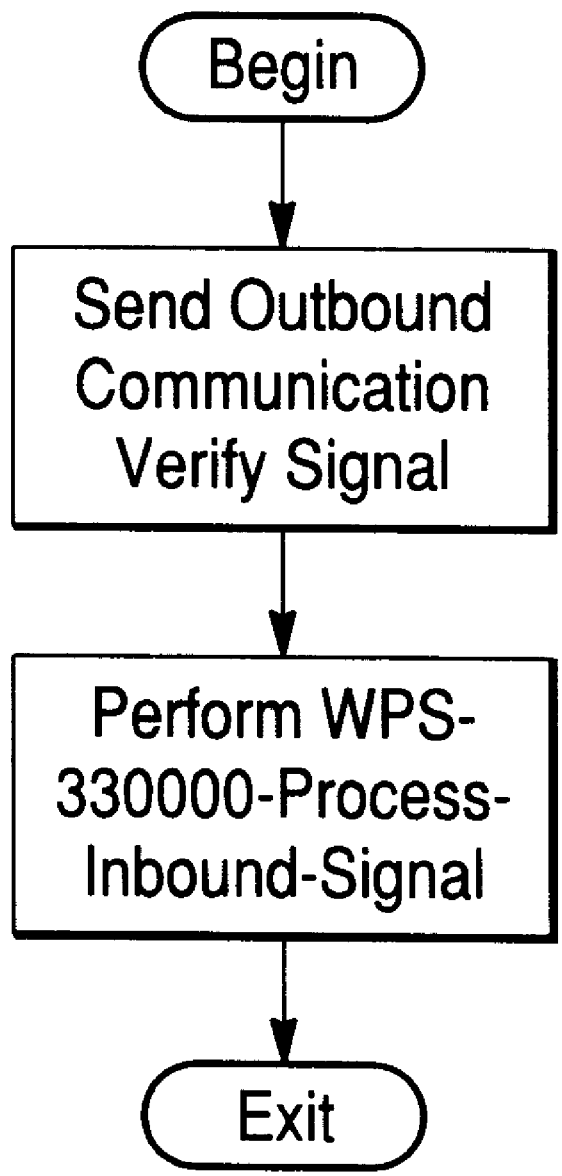
FIG. 48 is a block diagram of the WPS 508000-CHECK-COMMUNICATION-PROCESSING routine.

If the check communication function is initiated, the system will perform the WPS-508000-CHECK-COMMUNICATION-PROCESSING routine of FIG. 48. If the organizer functions are initiated, the system will display the organizer menu options and process the selected option.

Figure 49:
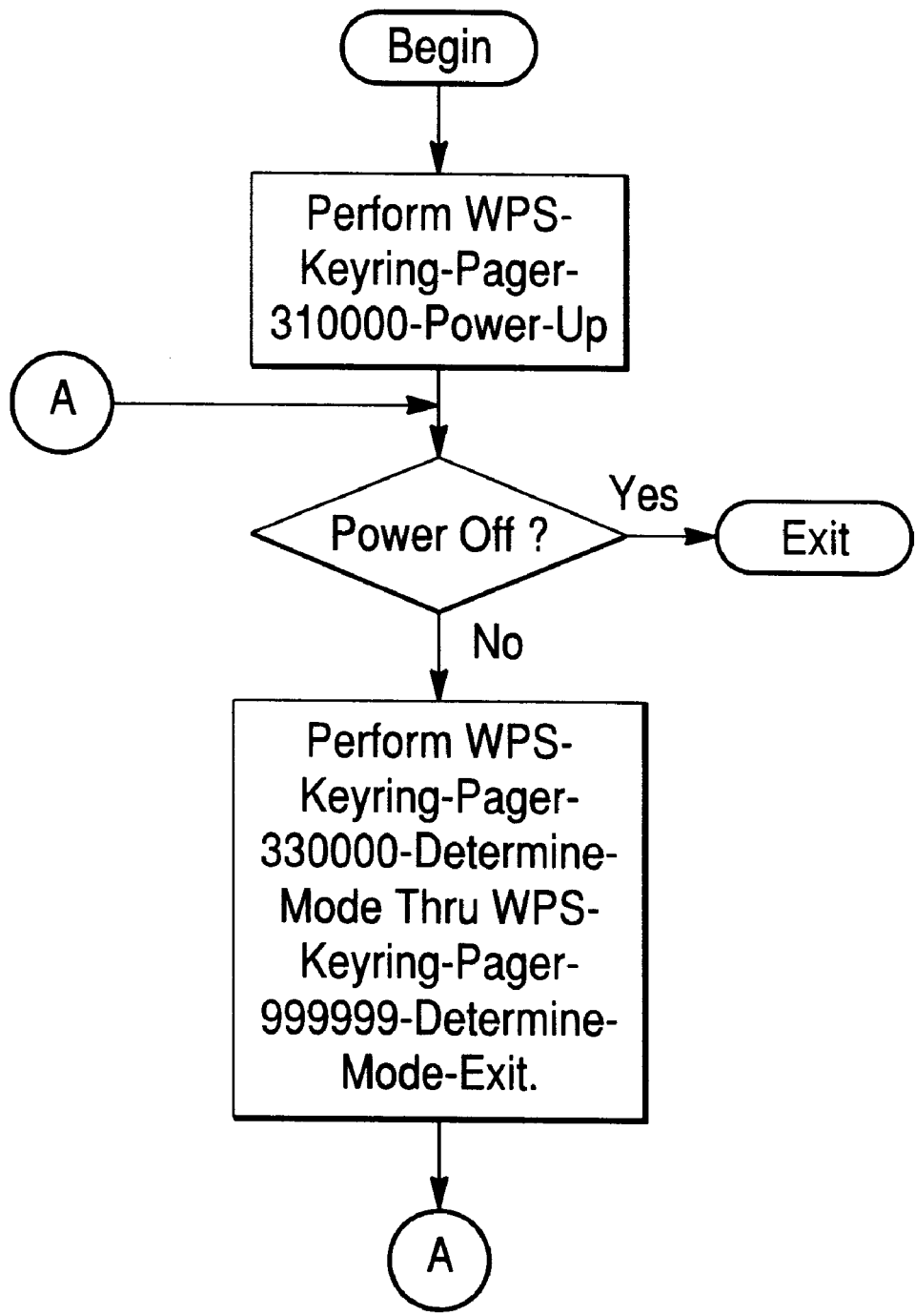
FIG. 49 is a block diagram of the WPS KEYRING-PAGER-300000-MAIN-LINE routine.
Figure 50:
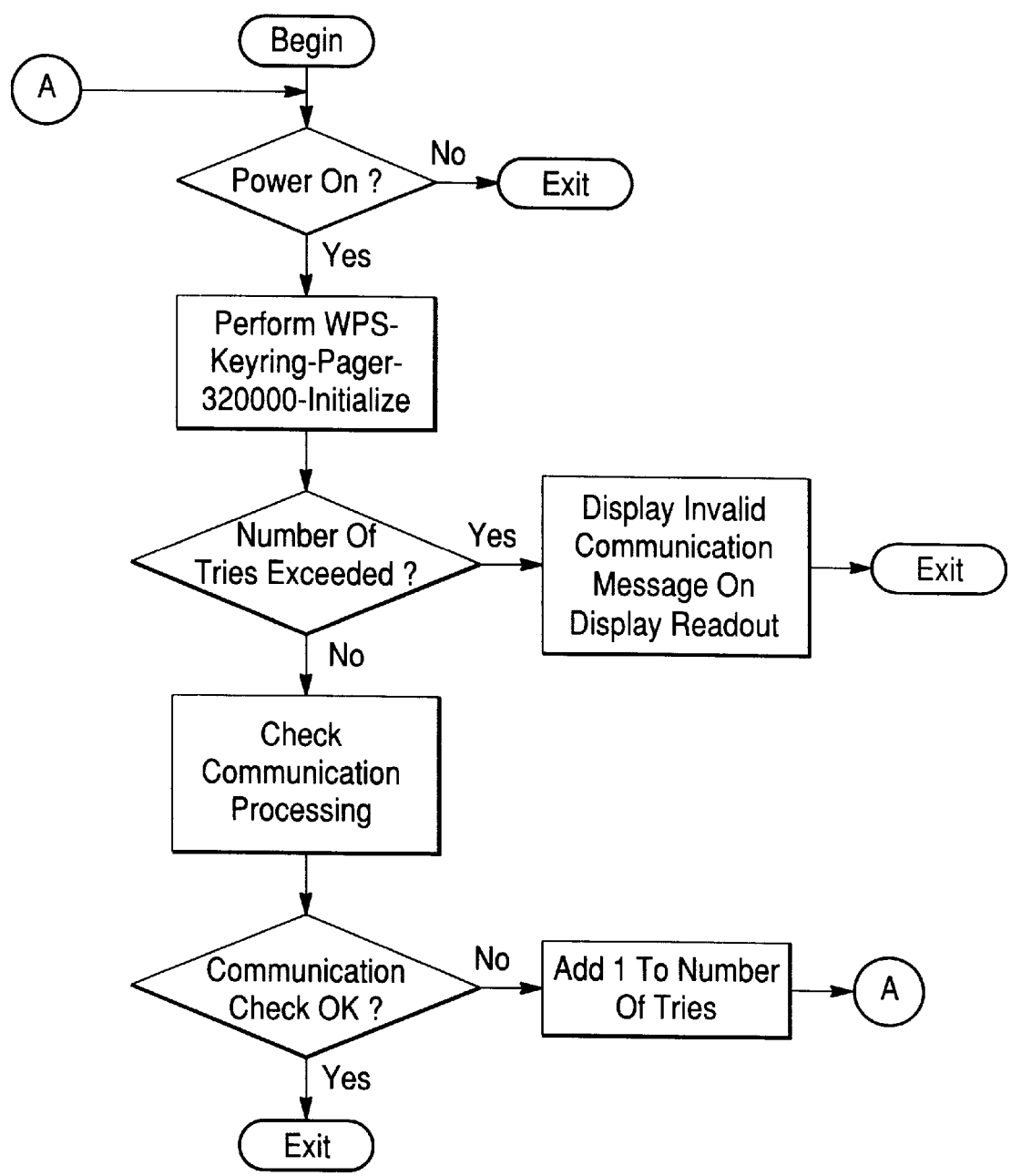
FIG. 50 is a block diagram of the WPS KEYRING-PAGER-310000-POWER-UP routine.
Figure 51:
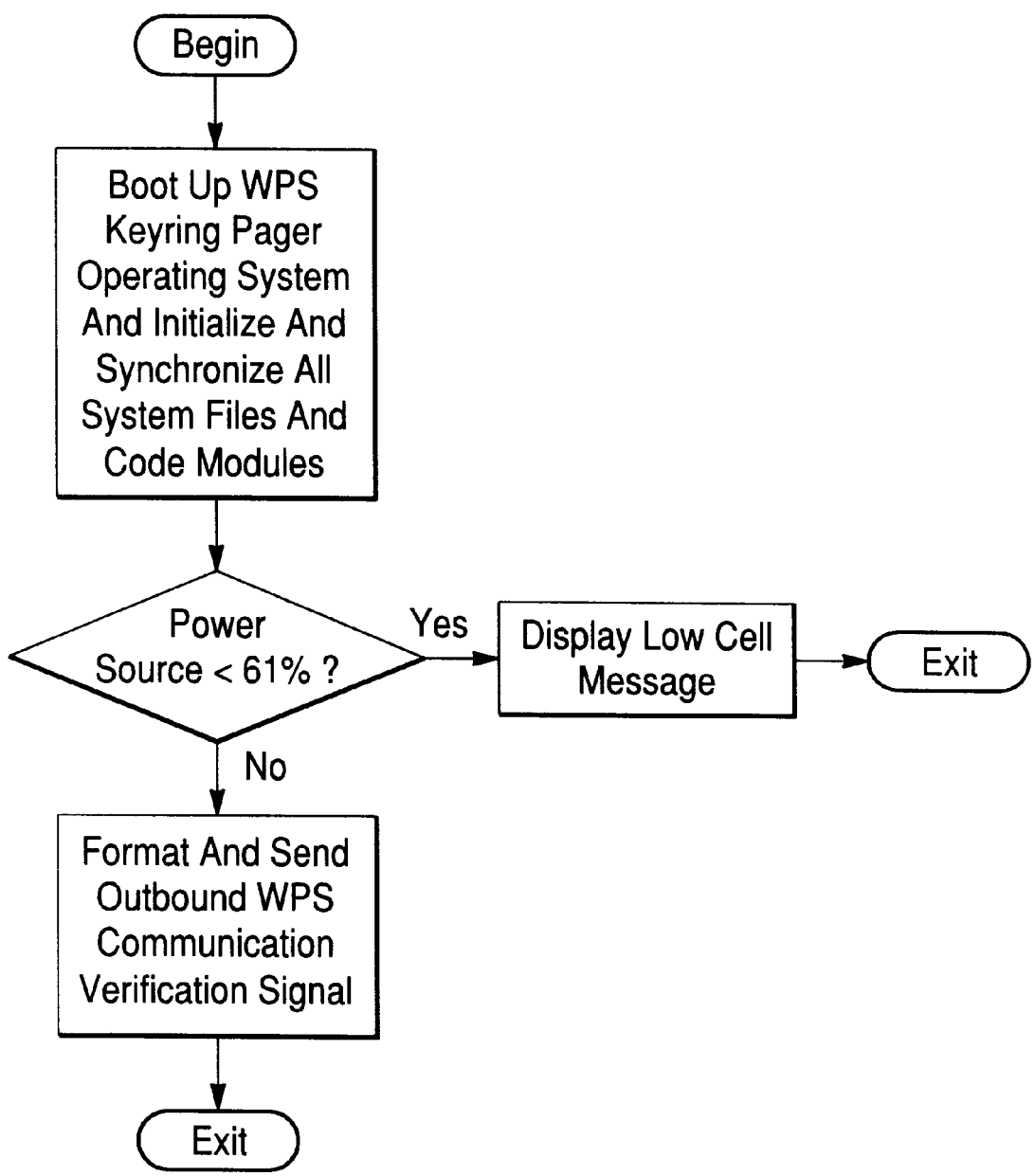
FIG. 51 is a block diagram of the WPS KEYRING-PAGER-320000-INITIALIZE routine.
Figure 52:
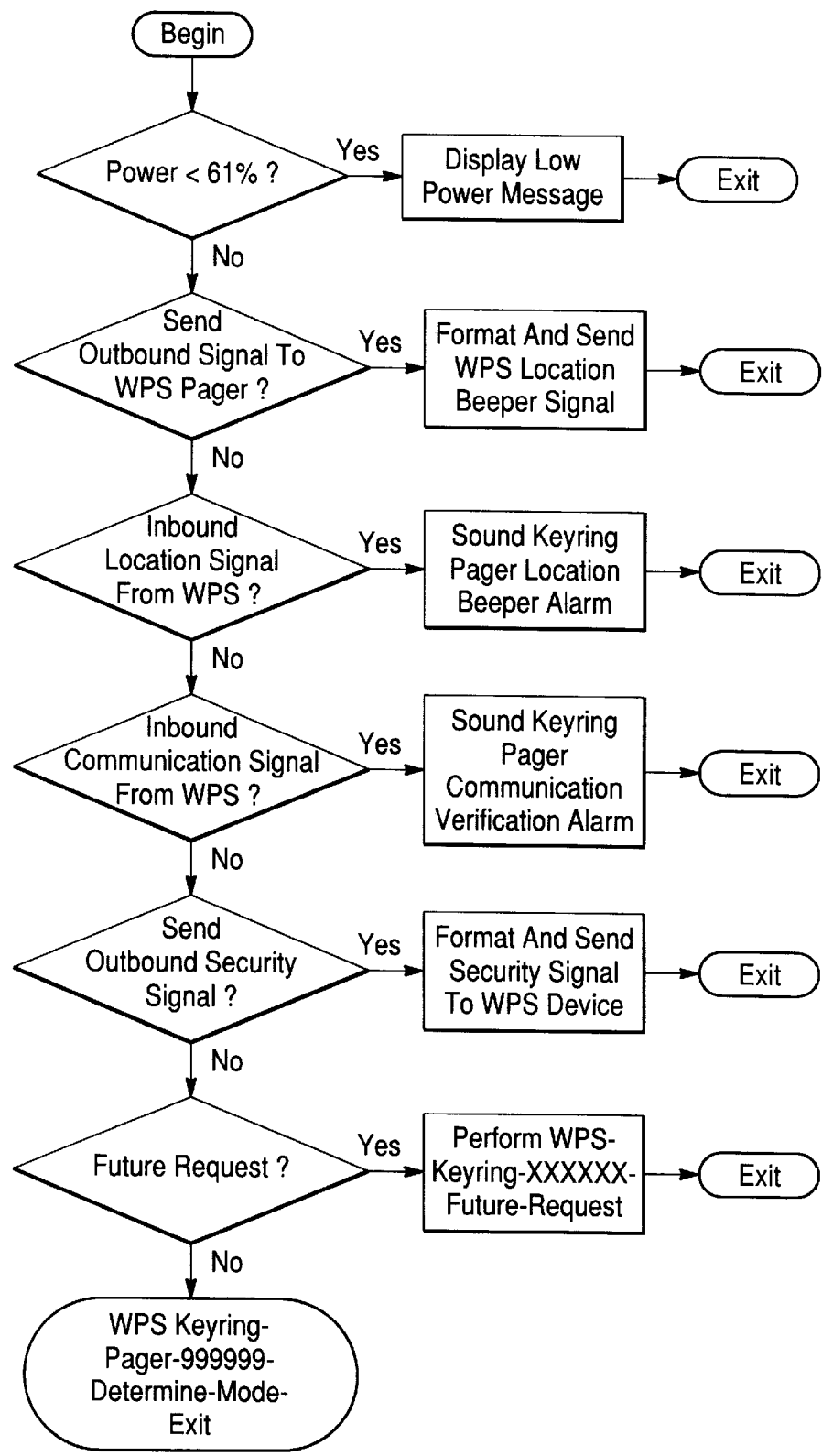
FIG. 52 is a block diagram of the WPS KEYRING-PAGER-330000-DETERMINE MODE routine.

The WPS-KEYRING-PAGER-300000-MAIN-LINE routine of FIG. 49 is a high-level flowchart pictorial that depicts the general operational processes of the WPS-KEYRING-PAGER device. After the initial WPS-KEYING-PAGER-310000-POWER-UP routine of FIG. 50 has been performed, the WPS-KEYRING-PAGER operating system passes control to the WPS-KEYRING-PAGER-330000-DETERMINE-MODE routine of FIG. 52. The WPS-KEYRING-PAGER-330000-DETERMINE-MODE routine is a continuously cycling routine that depicts the general overall operational processes and functionality of the WPS-KEYRING-PAGER and its interaction with the associated wallet protection system 10 device.

It is evident from the above disclosures that modifications of the present invention can readily be made that are within the scope thereof, without departing from the spirit of the invention or sacrificing the principal advantages thereof.

I claim:

1. A wallet protection system for protecting credit cards, comprising:
   a selectively openable casing having a thickness, said casing including sensor means disposed within said thickness of said casing, said sensor means for sensing a predetermined pressure applied to aid casing;
   electronic circuitry operatively connected to said means for transmitting an electrical charge;
   means for holding said cards, said holding means disposed in said casing;
   a wireless communication device operatively associated with said sensor means for sending a wireless disabling signal to a predetermined location for deactivating the cards when the predetermined pressure is sensed by said sensor means, said communication device including a transmitter operatively connected to an antenna for transmitting the disabling signal to the predetermined location; and
   a power source operatively connected to said wireless communication device and sensor means for powering said sensor means and said wireless communication device.

2. The system of claim 1, wherein said casing includes an upper portion and a lower portion hingedly connected.

3. The system of claim 2, wherein said upper portion includes an inner surface and outer surface, said outer surface including an external electronic keypad for selectively opening said casing.

4. The system of claim 3, further comprising a keypad cover plate hingedly connected to said casing for covering said external electronic keypad, and a set of opposing locking portions for removably securing said cover place to said keypad.

5. The system of claim 2, further comprising a waterproof seal disposed between said upper and upper portions, said seal including water sensing means of operatively connected to said wireless communication device for sending a wireless disabling signal to a predetermined location for deactivating the cards when the predetermined amount of water is sensed by the water sensor means.

6. The system of claim 1, further comprising first and second communication devices, said first communication device disposed on said upper portion and said communication device disposed on said lower portion.

7. The system of claim 6, wherein said first and second communication devices are each disposed on a set of notched guide rails disposed in said upper and bottom portions respectively, and are movable along said rails.

8. The system of claim 7, further comprising a main antenna disposed in a hinge of said casing and a conductive circuit operatively connecting said main antenna to said first and second communication devices for transmitting the disabling signal to said main antenna.

9. The system of claim 1, wherein said sensing means includes an electronic sheathing embedded within said casing, said sheathing including a set of contact plates for sensing the predetermined pressure, said contact plates operably connected to said electronic circuitry for transmitting an electrical charge to said wireless communication device when said contact plates are in contact.

10. The system of claim 1, wherein said sensor means is made from a semi-fragile glass fiber optics.

11. The system of claim 1, wherein said holding means including sensors for sensing the absence of the card and means for preventing said casing from locking when the card is absent from said holding means.

12. The system of claim 11, wherein said holding means includes a base support, at least two card supports for supporting a credit card, each said card support including a contact sensor, said contact sensors operatively associated with a contact relay for transmitting an electrical charge to an alarm when said casing is closed and the card is not contained between said card supports.

13. The system of claim 12, wherein said contact relay is operatively connected to said wireless communication device for sending a wireless communication to the predetermined location.

14. The system of claim 11, wherein said holding means are operatively connected to a central processing unit for programming said holding means.

15. The system of claim 1, wherein said casing is made from a high impact resistant material.

16. The system of claim 15, wherein said high impact resistant material includes a honey-combed like structure.

17. The system of claim 1, further comprising a central processing unit, a liquid crystal display, and a keypad disposed in an internal surface of said casing for controlling communication abilities of the system.

18. The system of claim 1, further comprising a silent alarm panic button disposed on said casing and operatively associated with said wireless communication device for sending an alarm signal to a predetermined location upon activation of said button.

19. The system of claim 18, further comprising a silent alarm reset button disposed on said casing and operatively associated with said silent alarm button for resetting said silent alarm button.

20. The system of claim 1, further comprising a power meter display light disposed on said casing and operatively associated with said power source for determining when said power source falls below a predetermined level.

21. The system of claim 1, further comprising a thin lead sheathing disposed about said sensor sheathing for preventing x-ray views of contents of the system.

22. The system of claim 1, further comprising a key lock disposed on said casing for selectively opening said casing.

23. The system of claim 22, further comprising an external electronic keypad operably associated with said key lock for selectively releasing said key lock when a predetermined security code is entered on said keypad.

24. The system of claim 1, wherein said wireless communication device includes a receiver for receiver signals from the predetermined location.

25. The system of claim 1, further comprising a cell phone and interactive pager.

26. A method of protecting registered personal items, comprising the steps of:

provopriding a wallet protection system for housing credit cards including a wireless communication device;

registering the credit cards in a database;

linking the registered credit cards of the database by wireless communication to the wireless communication device of the wallet protection system; and sending a disabling signal from the wireless communication device to the database upon sensing of a predetermined pressure applied to the wallet protection system thereby causing the registered credit cards to be deactivated.

27. The method of claim 26, further comprising the steps of:

establishing a communication link between the database and designated financial institutions; and deactivating the credit cards by notifying designed financial institutions.

28. The method of claim 26, further comprising the step of scanning personal keys into the database for duplication.

29. The method of claim 27, further comprising the step of providing a decoy card to be placed in the wallet protection system.

30. The method of claim 29, further comprising the step of sending a disabling signal from the wireless communication device to the database upon removal of the decoy card from a designated location in the wallet protection system.

31. The method of claim 26 further comprising the step of issuing a secondary device for sending a disabling signal to the database.

32. The method of claim 26, further comprising the step of linking the wireless communication device to a global positioning satellite.

33. The method of claim 26, further comprising the step of linking the wireless communication device to law enforcement agencies.

* * * * *